Figure 45:
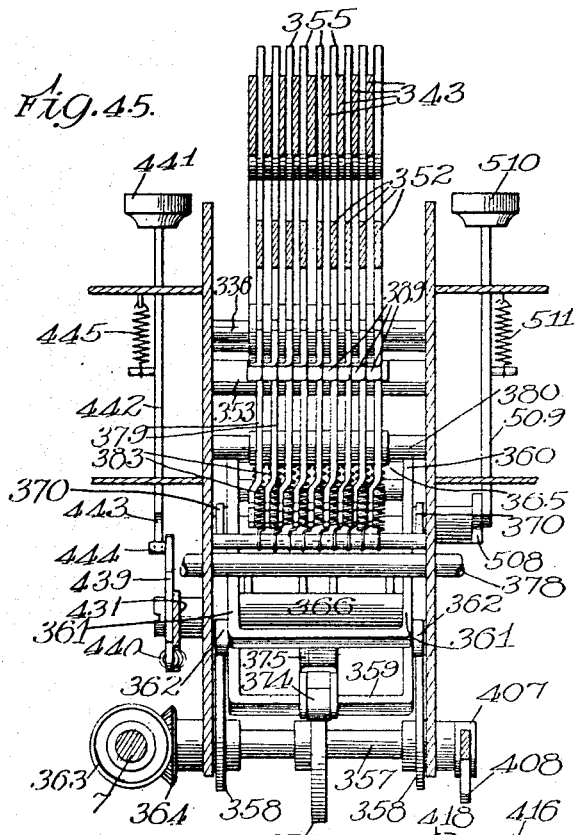

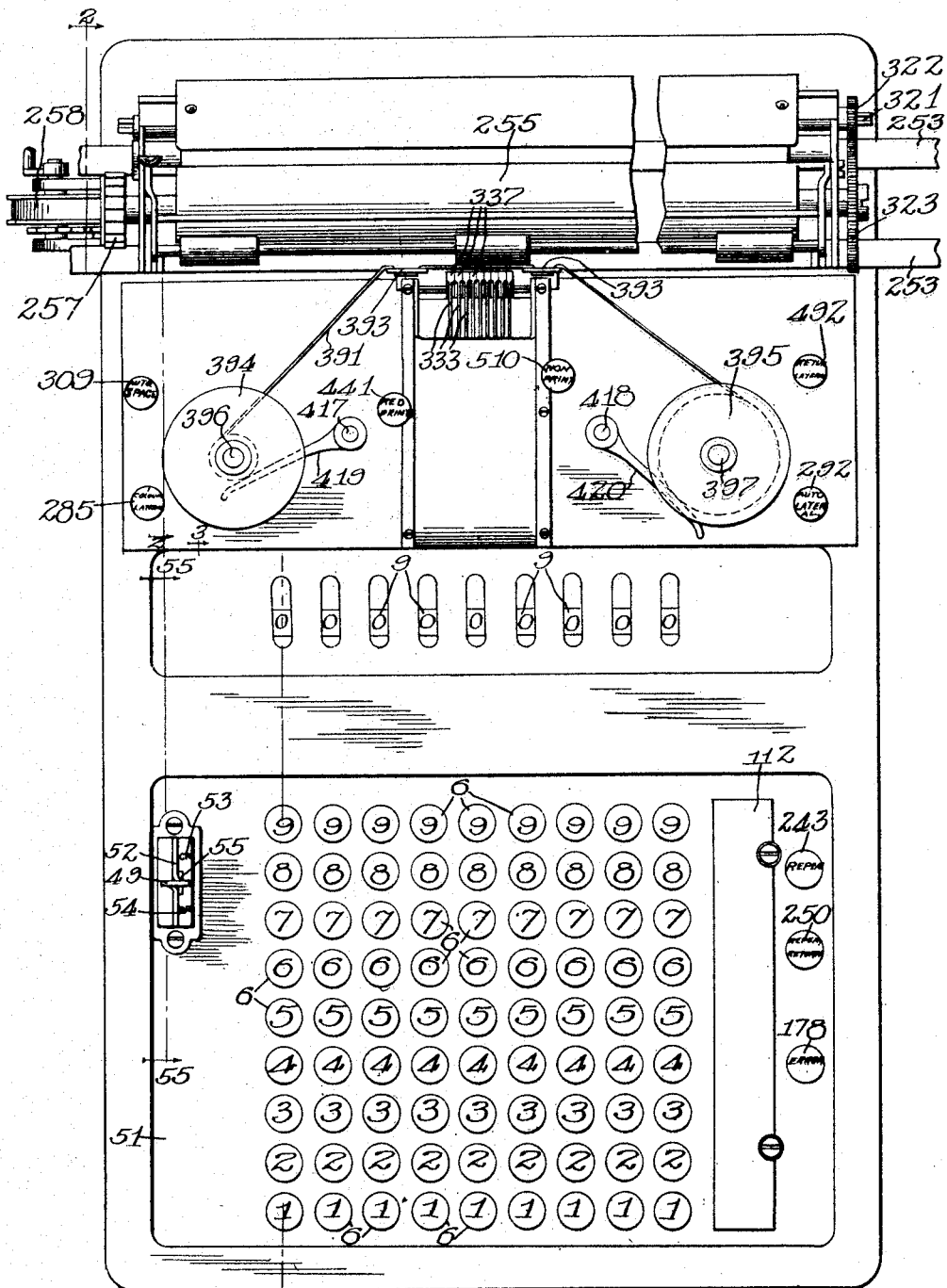

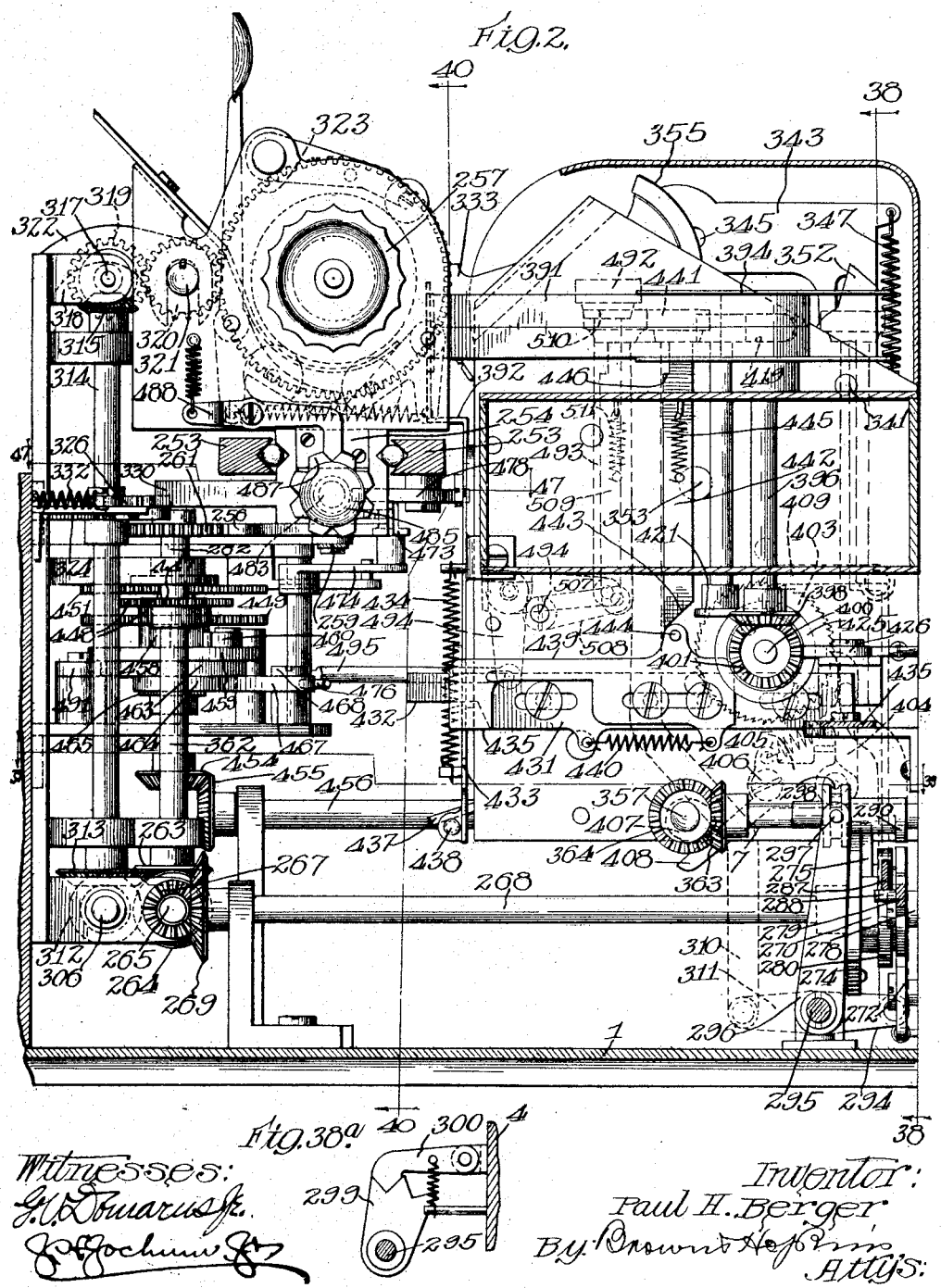

P. H. BERGER.
CALCULATING MACHINE.
APPLICATION FILED APR. 13, 1911.
1,208,271.
Patented Dec. 12, 1916.
24 SHEETS—SHEET 3.
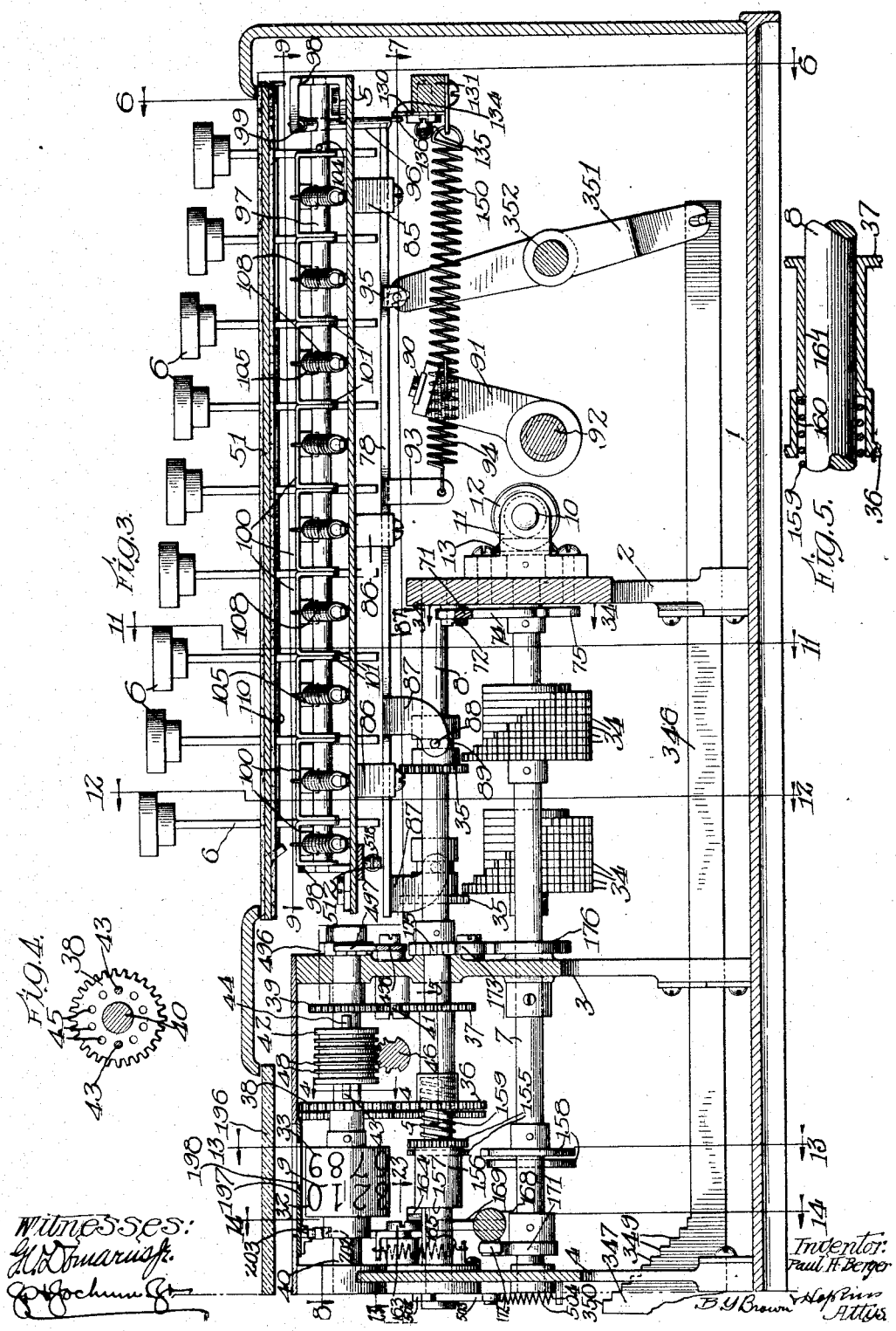

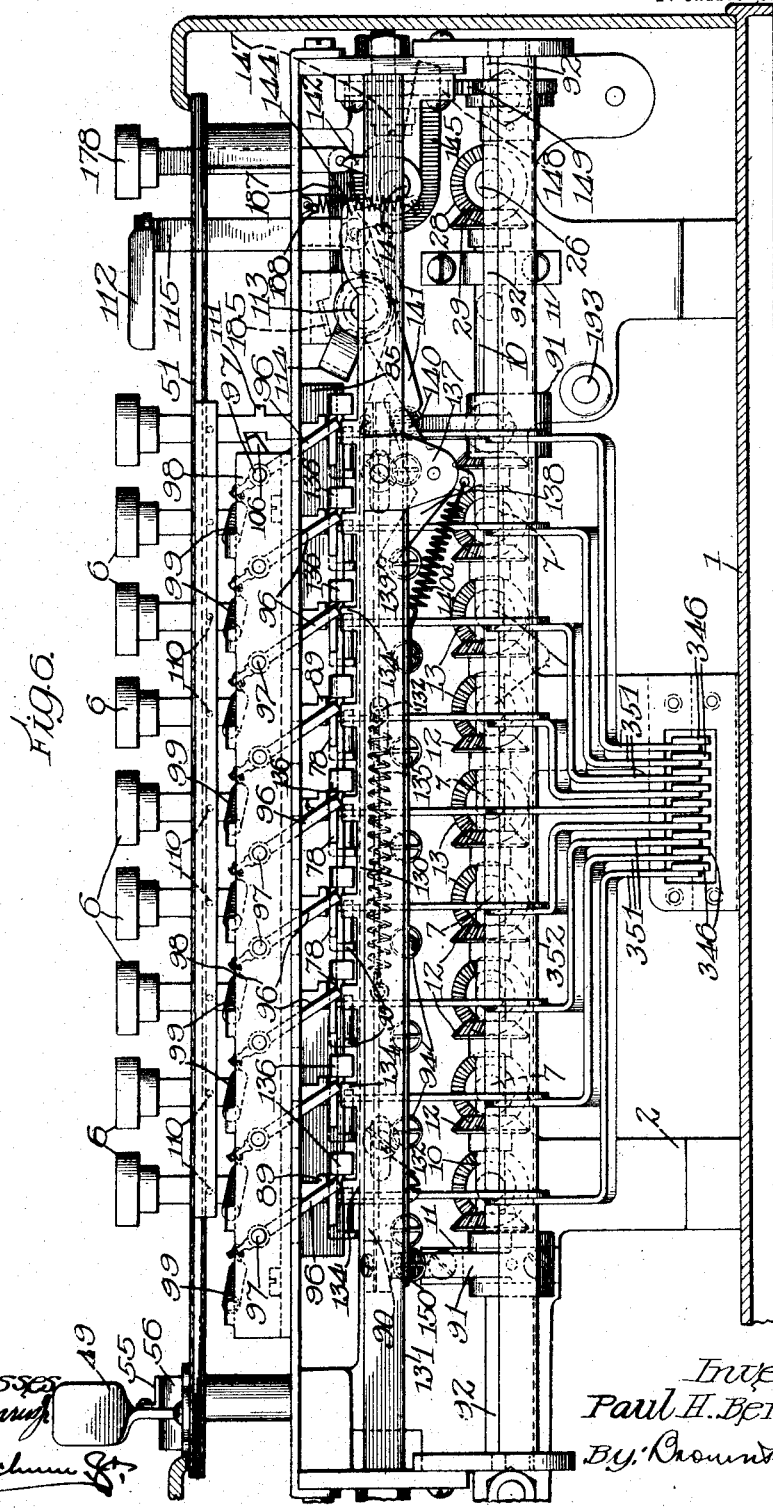

P. H. BERGER.
CALCULATING MACHINE.
APPLICATION FILED APR. 13, 1911.
1,208,271.
Patented Dec. 12, 1916.
24 SHEETS—SHEET 5.
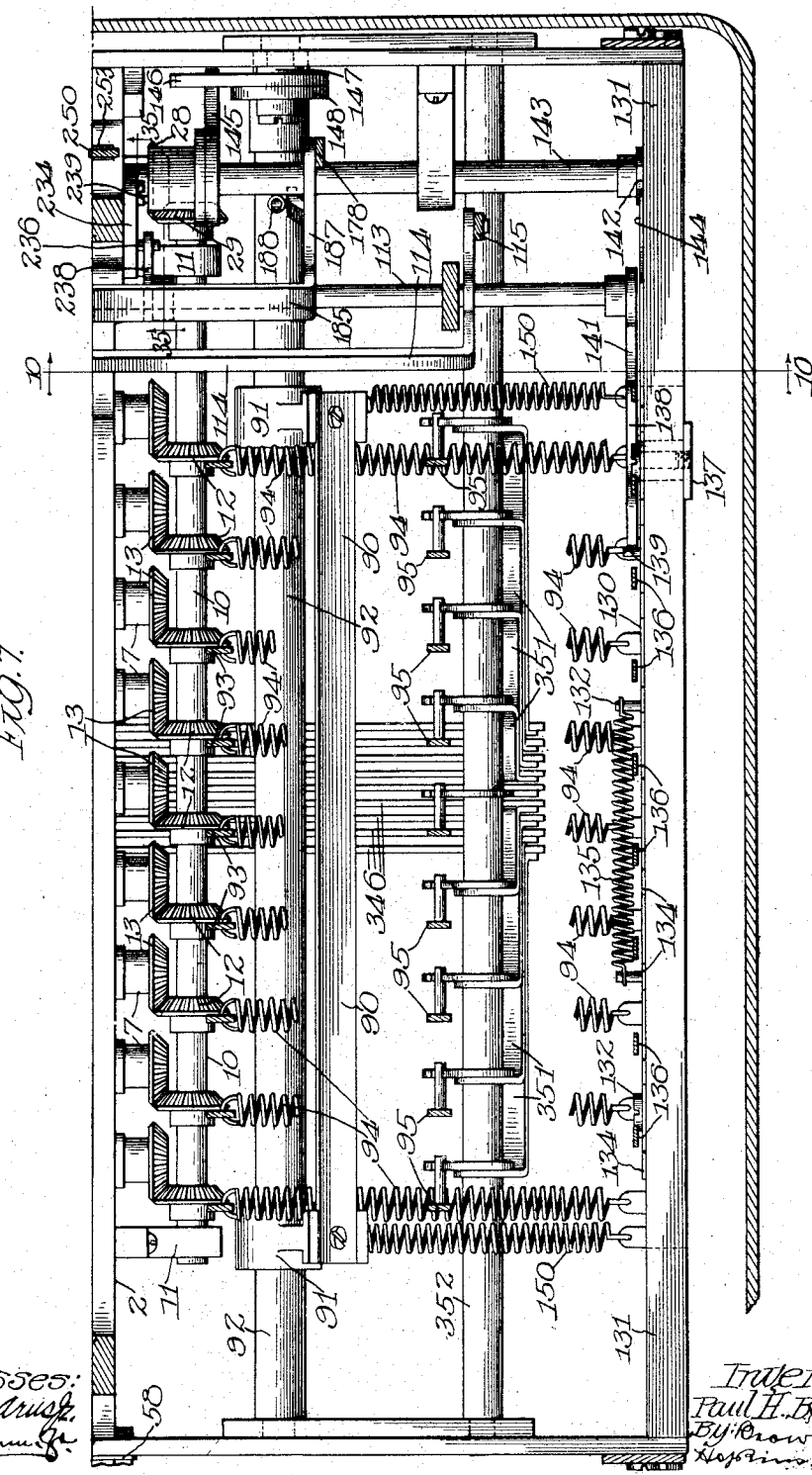

P. H. BERGER.
CALCULATING MACHINE.
APPLICATION FILED APR. 13, 1911.
1,208,271.
Patented Dec. 12, 1916.
24 SHEETS—SHEET 6.
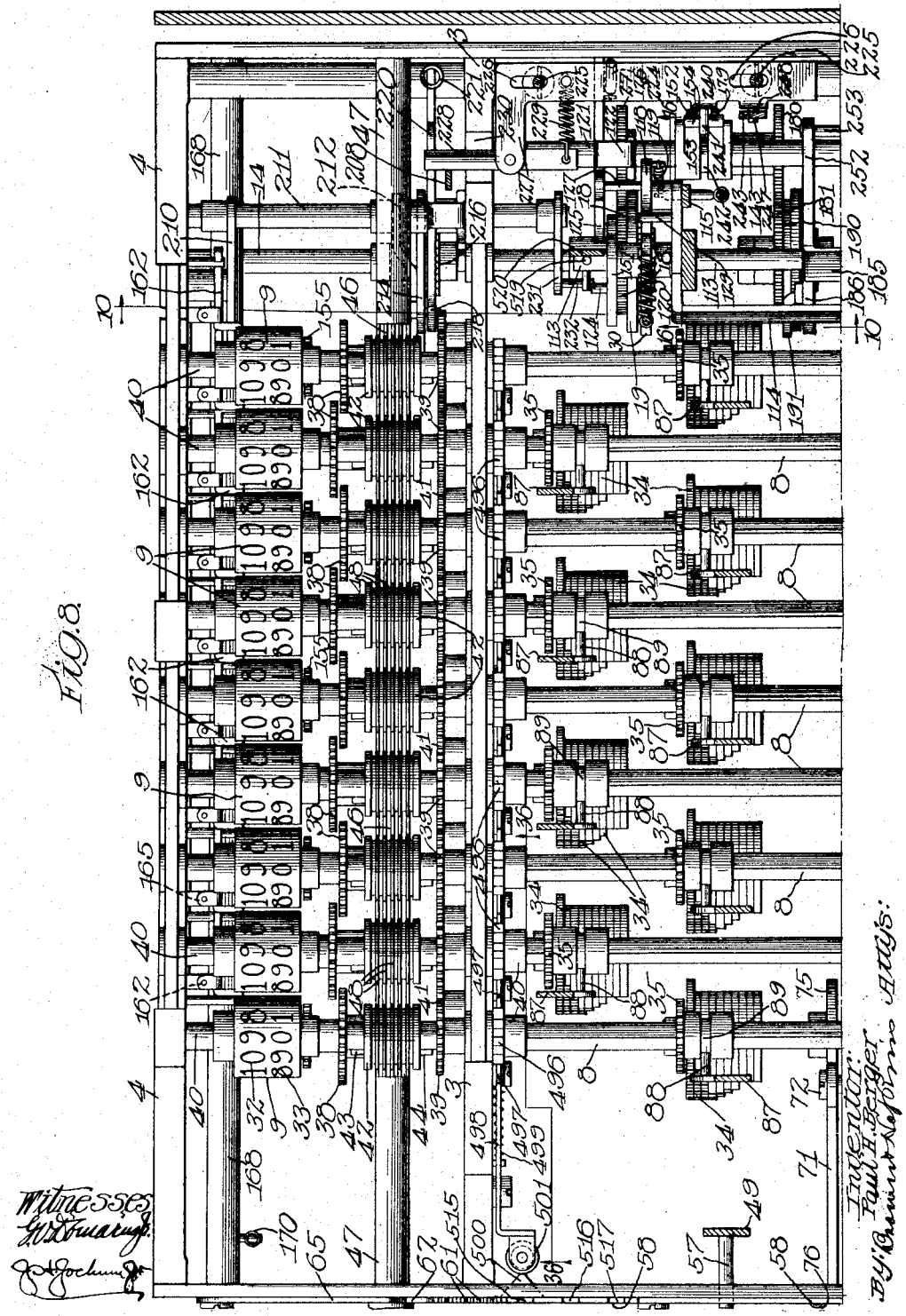

P. H. BERGER.
CALCULATING MACHINE.
APPLICATION FILED APR. 13, 1911.
1,208,271.
Patented Dec. 12, 1916.
24 SHEETS—SHEET 7.
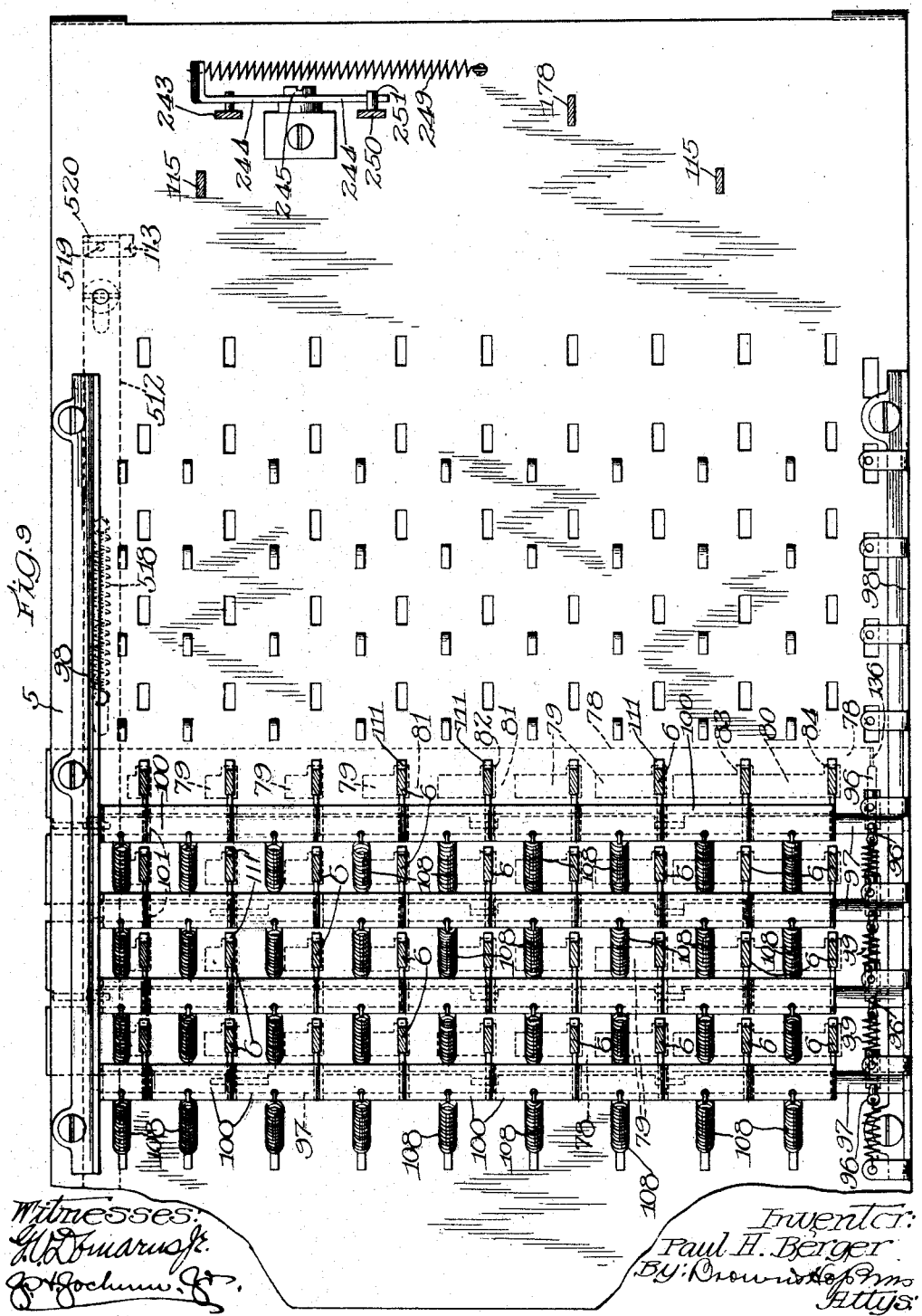

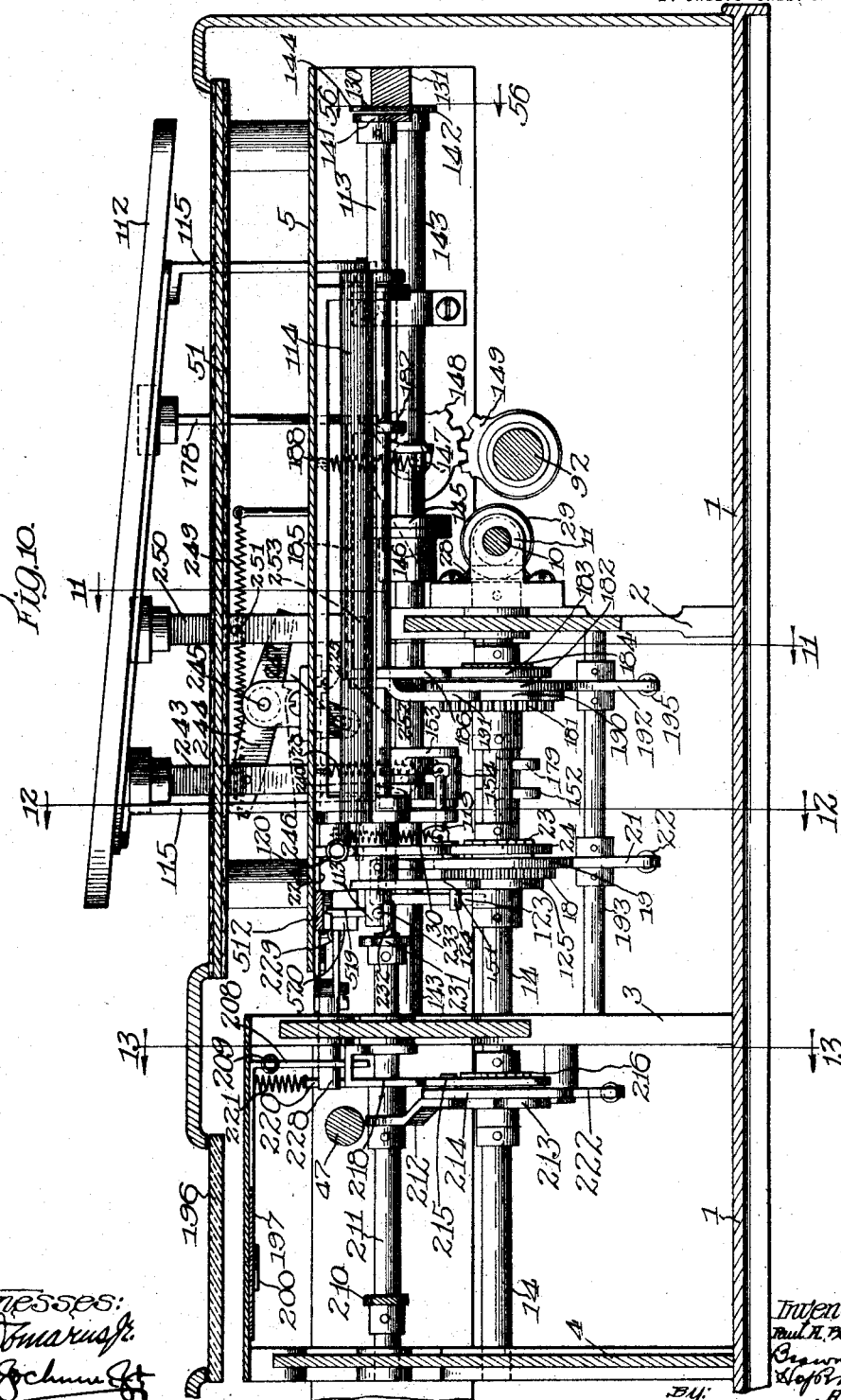

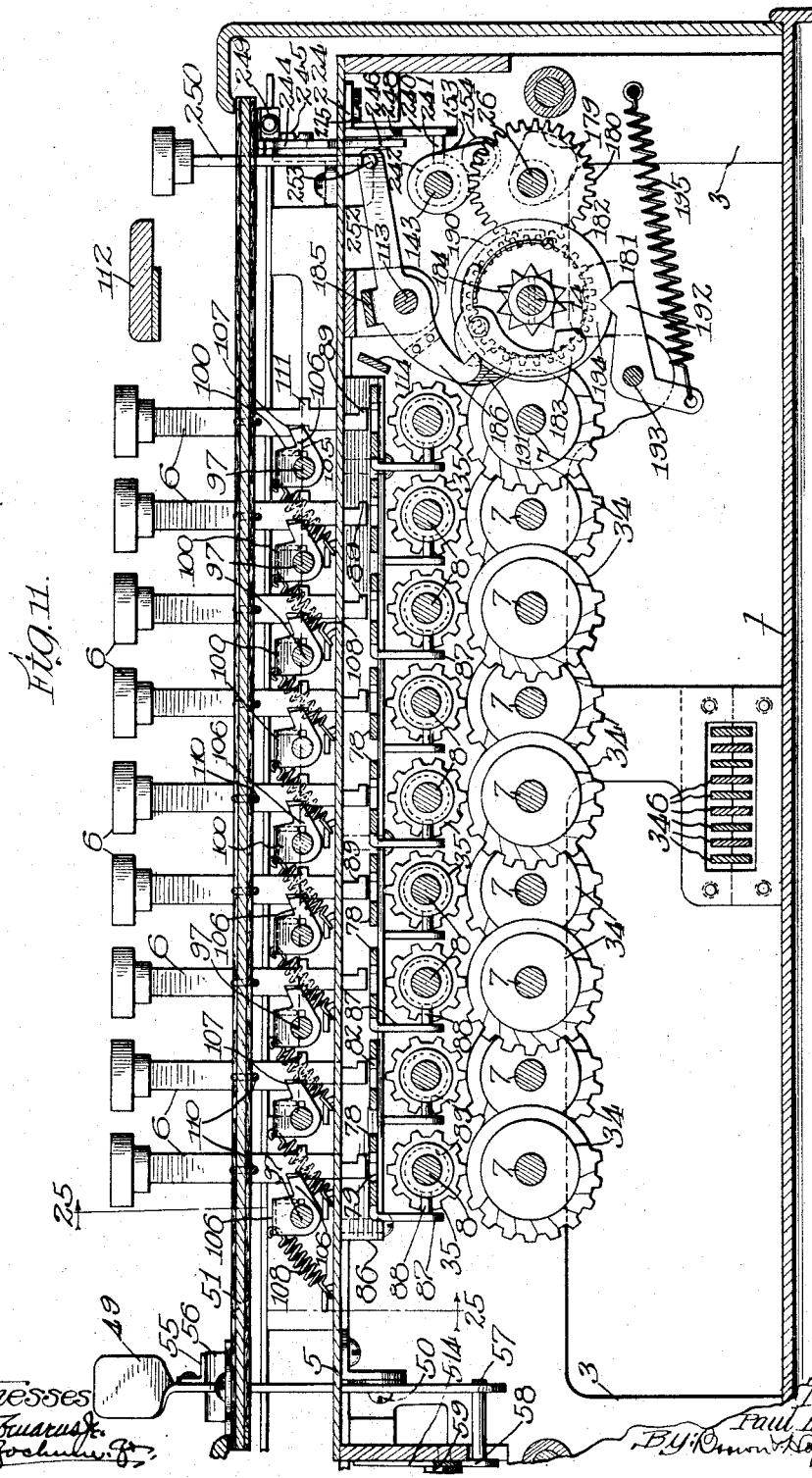

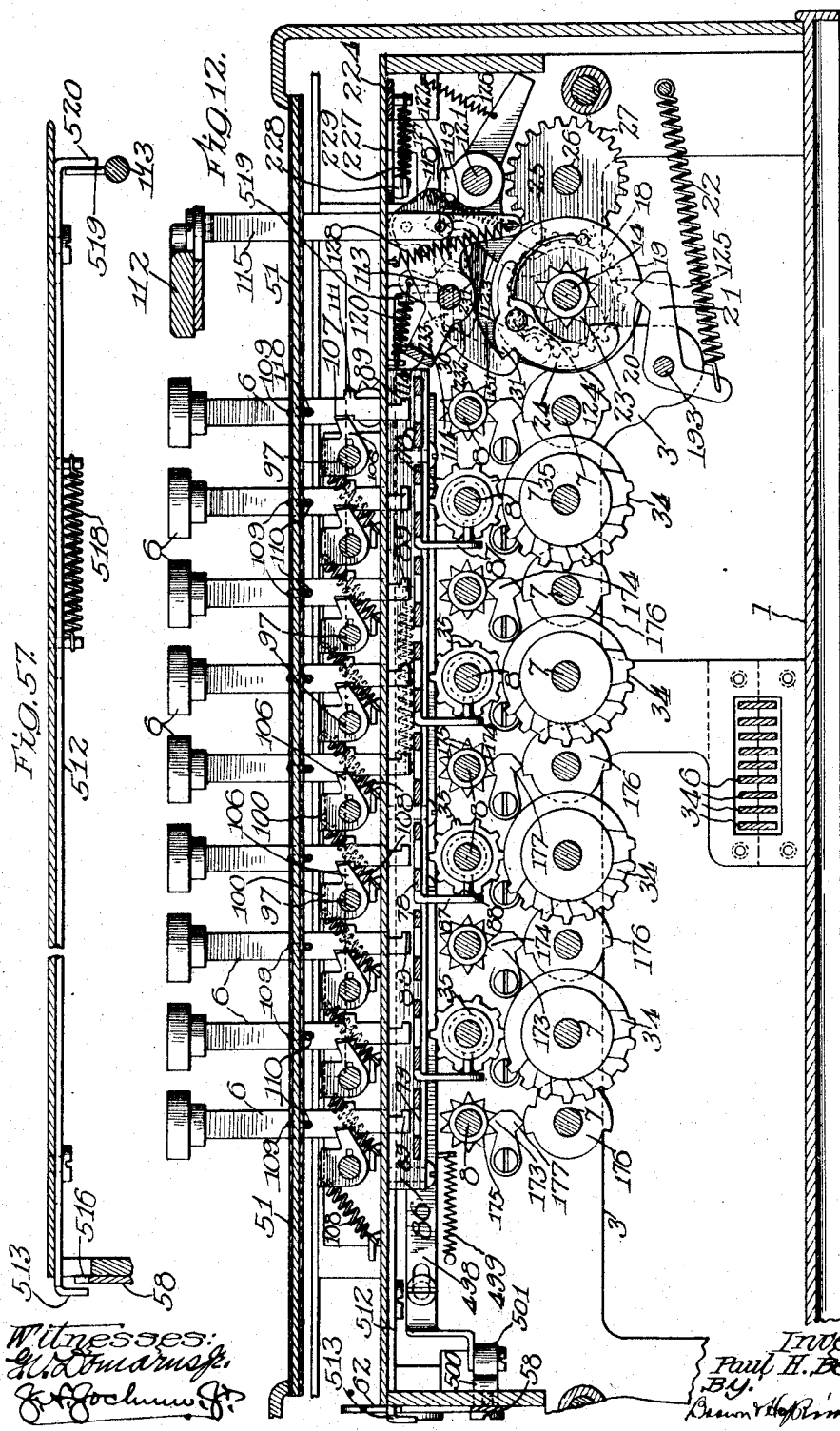

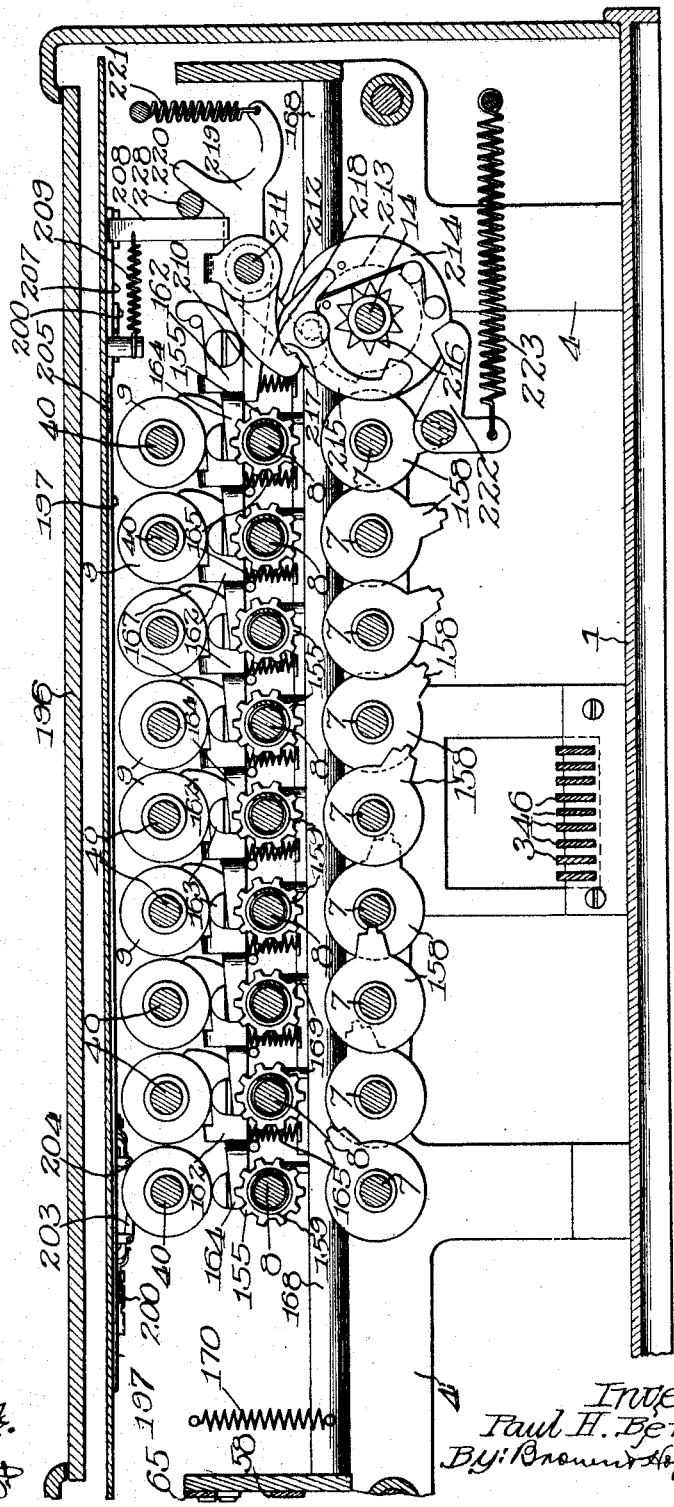

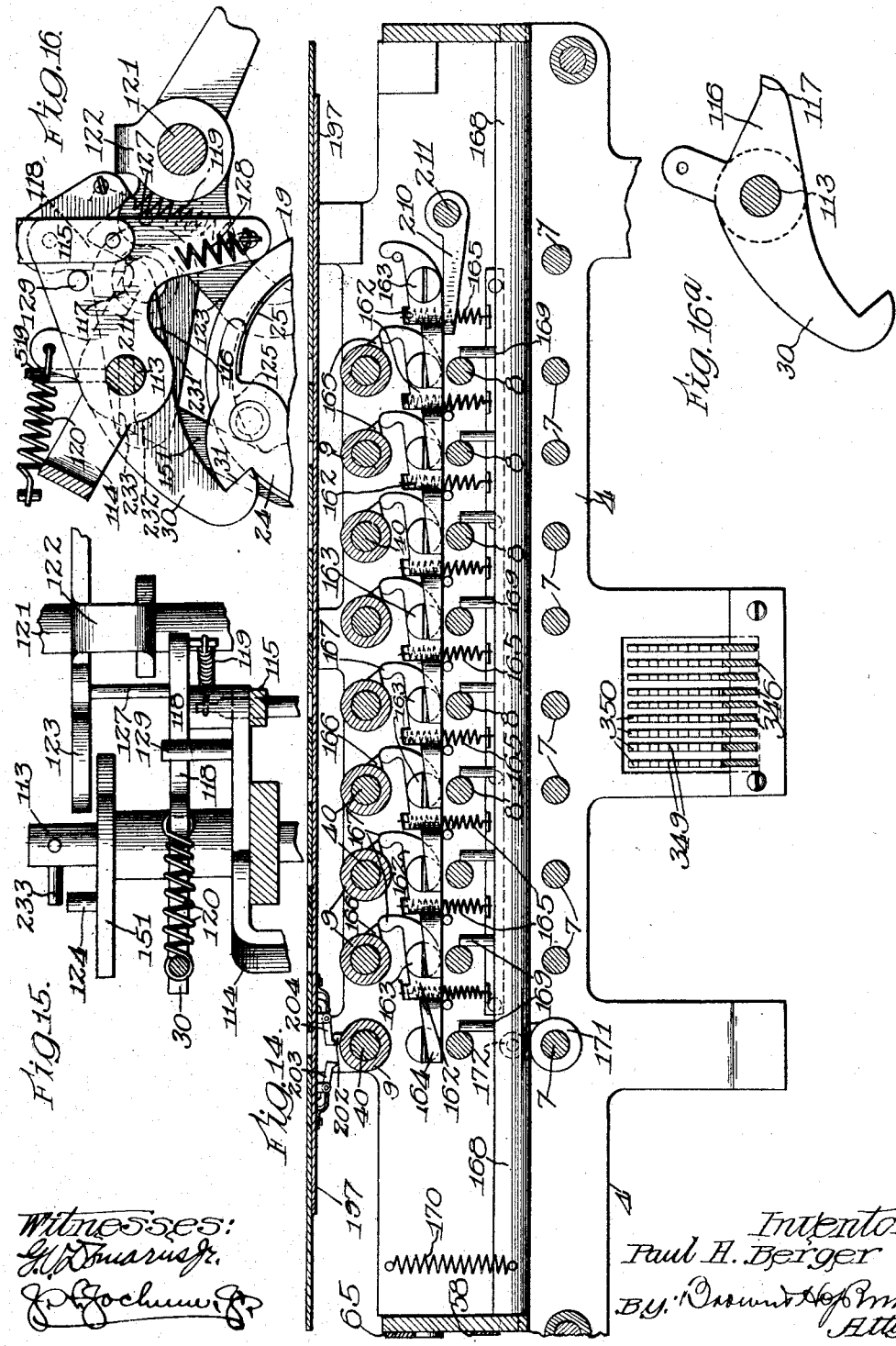

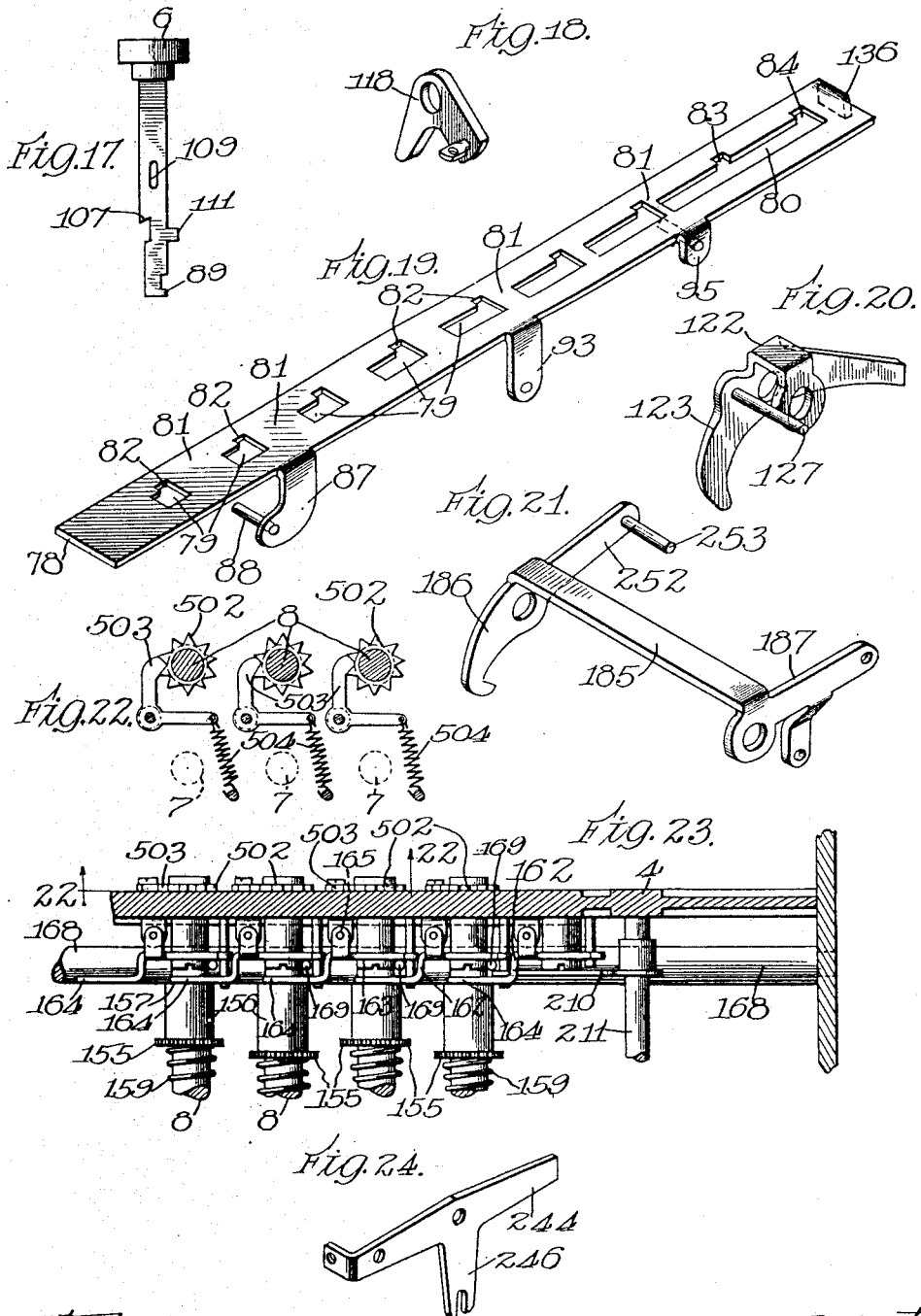

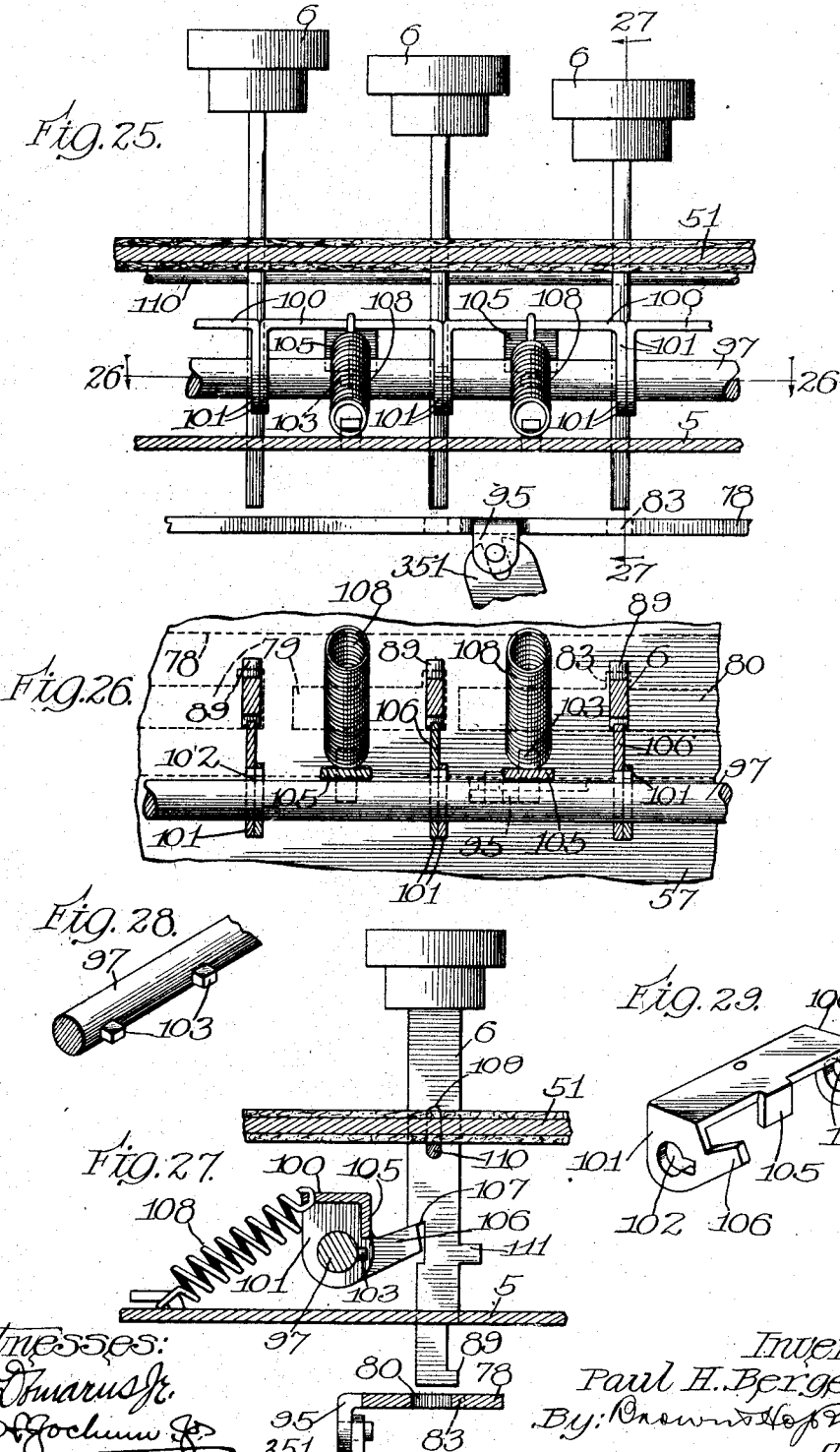

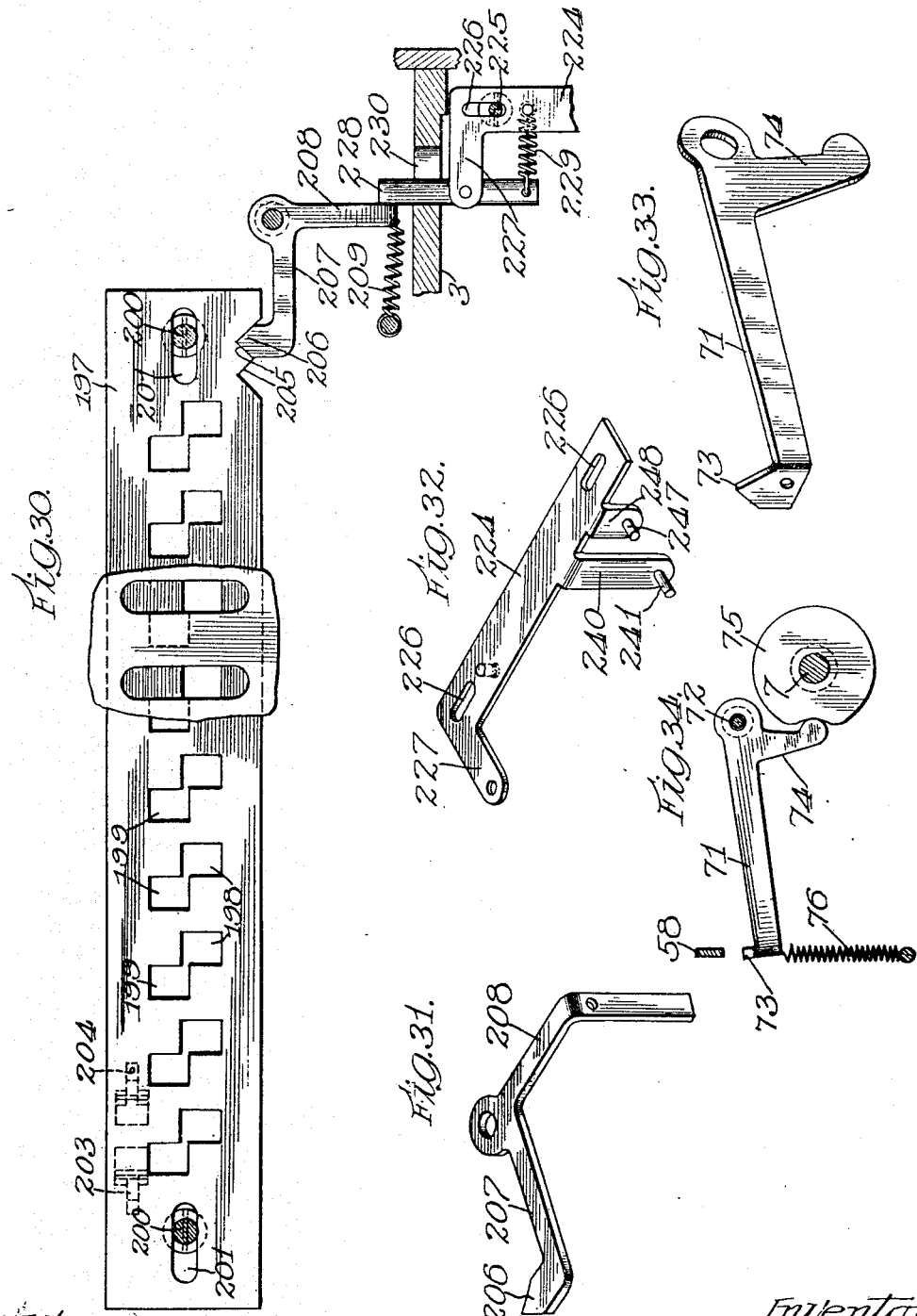

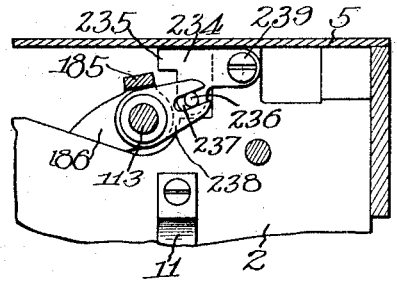
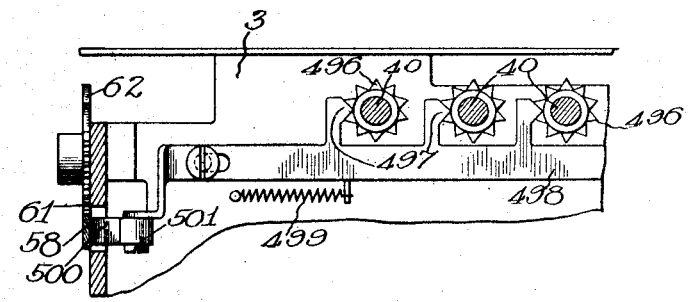
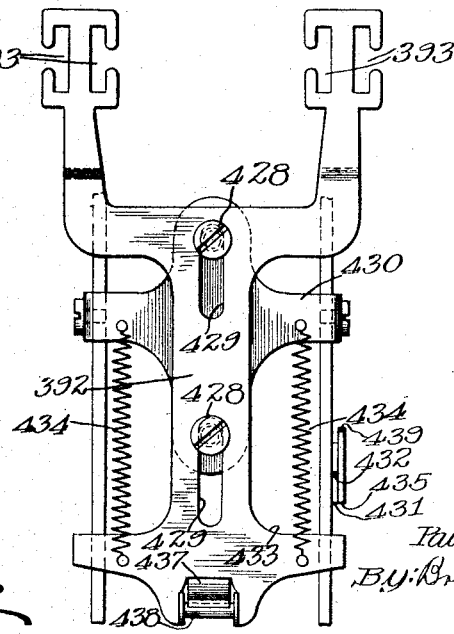

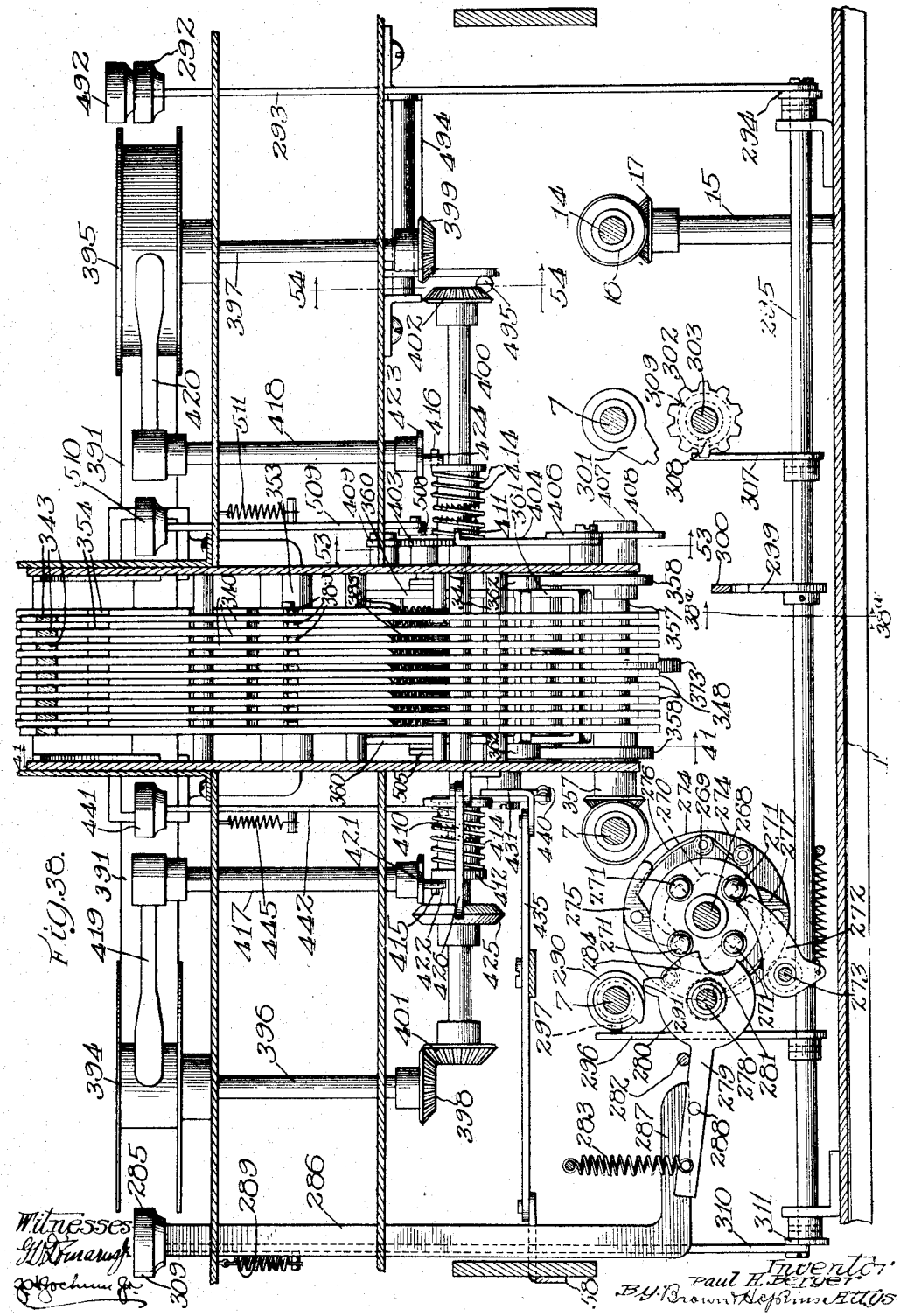

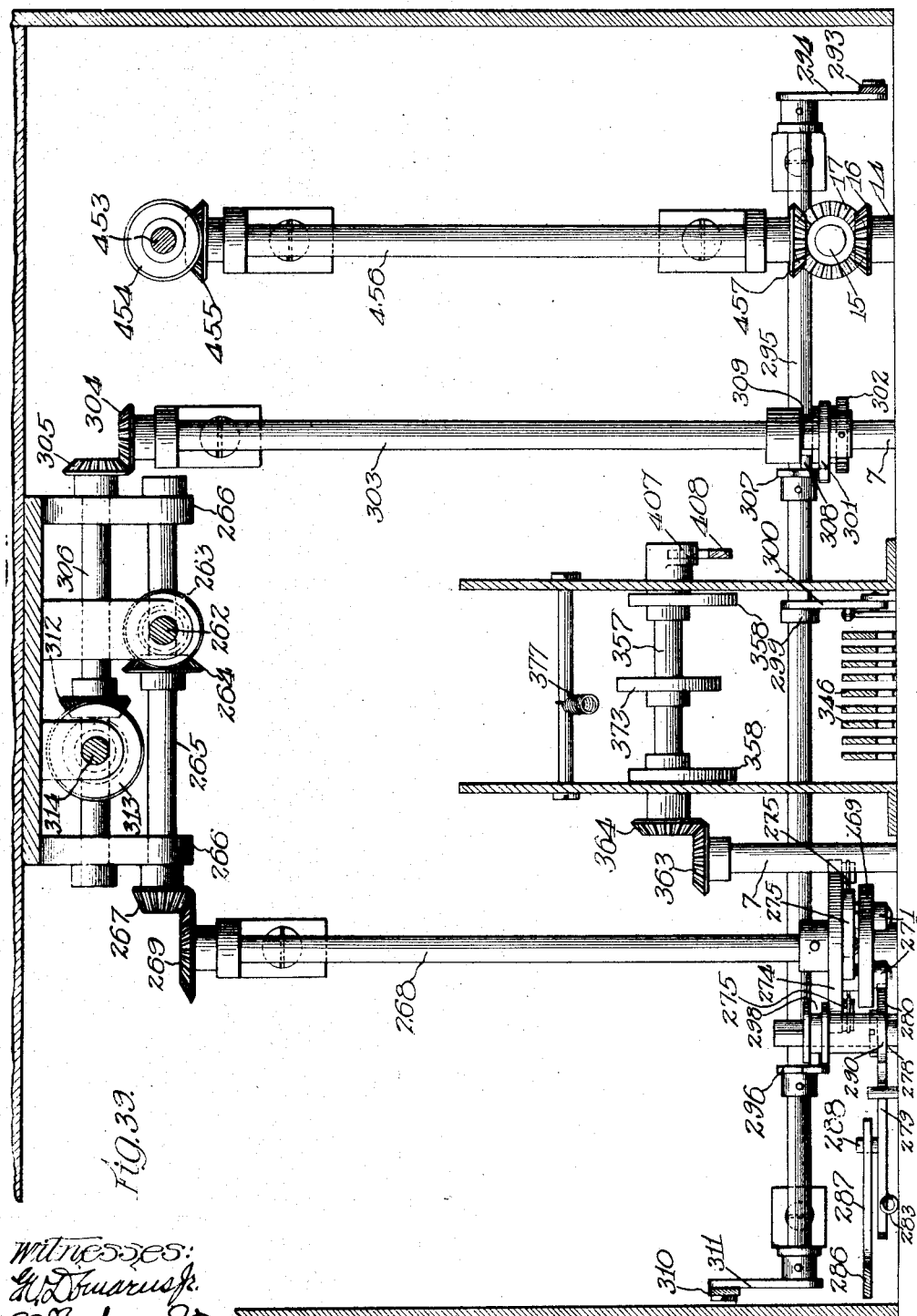

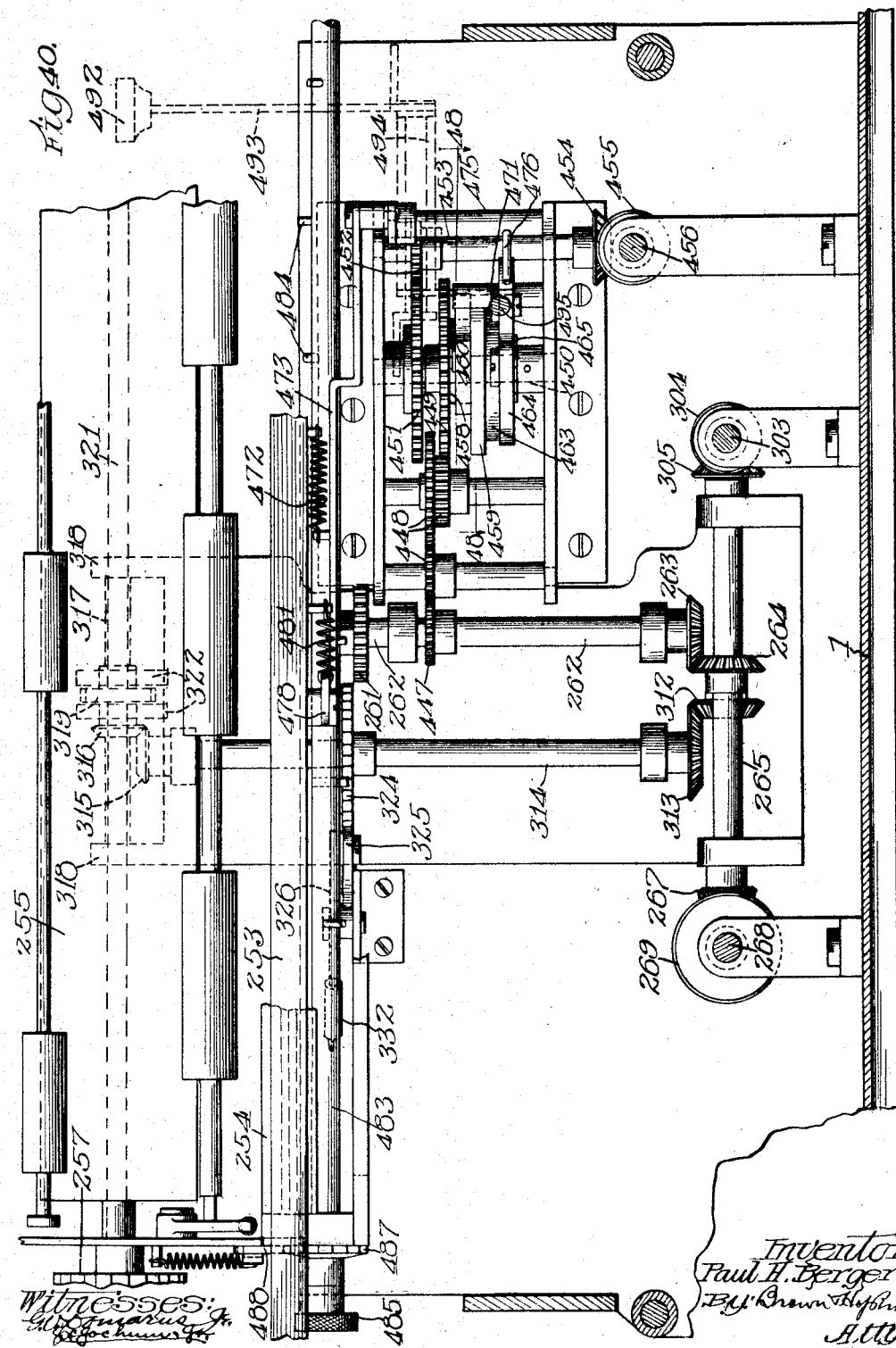

P. H. BERGER.
CALCULATING MACHINE.
APPLICATION FILED APR. 13, 1911.
1,208,271.
Patented Dec. 12, 1916.
24 SHEETS—SHEET 20.
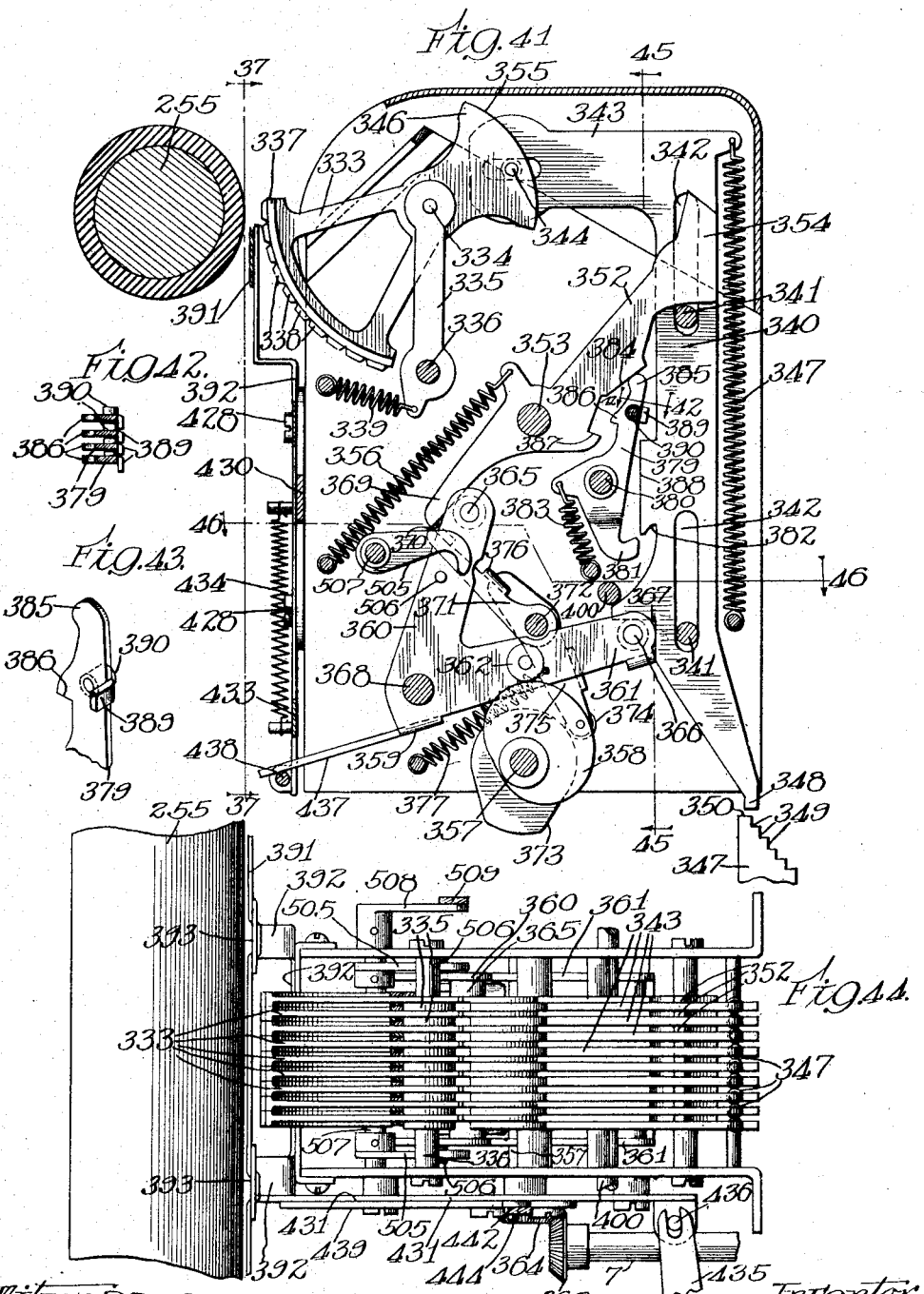

P. H. BERGER.
CALCULATING MACHINE.
APPLICATION FILED APR. 13, 1911.

1,208,271.

Patented Dec. 12, 1916.
24 SHEETS—SHEET 21.

Witnesses:
Inventor:
Paul H. Berger
By Brown and Hopkins
Attys

P. H. BERGER.
CALCULATING MACHINE.
APPLICATION FILED APR. 13, 1911.

1,208,271.

Patented Dec. 12, 1916.
24 SHEETS—SHEET 22.

Witnesses:

Inventor:
Paul H. Berger,
By Brown & ...
Attys.

P. H. BERGER.
CALCULATING MACHINE.
APPLICATION FILED APR. 13, 1911.
1,208,271.
Patented Dec. 12, 1916.
24 SHEETS—SHEET 23.
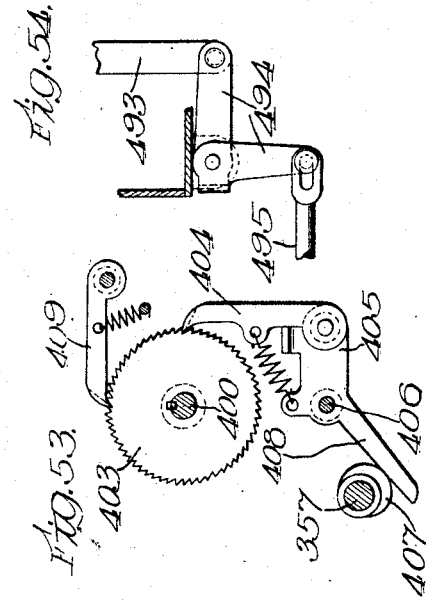
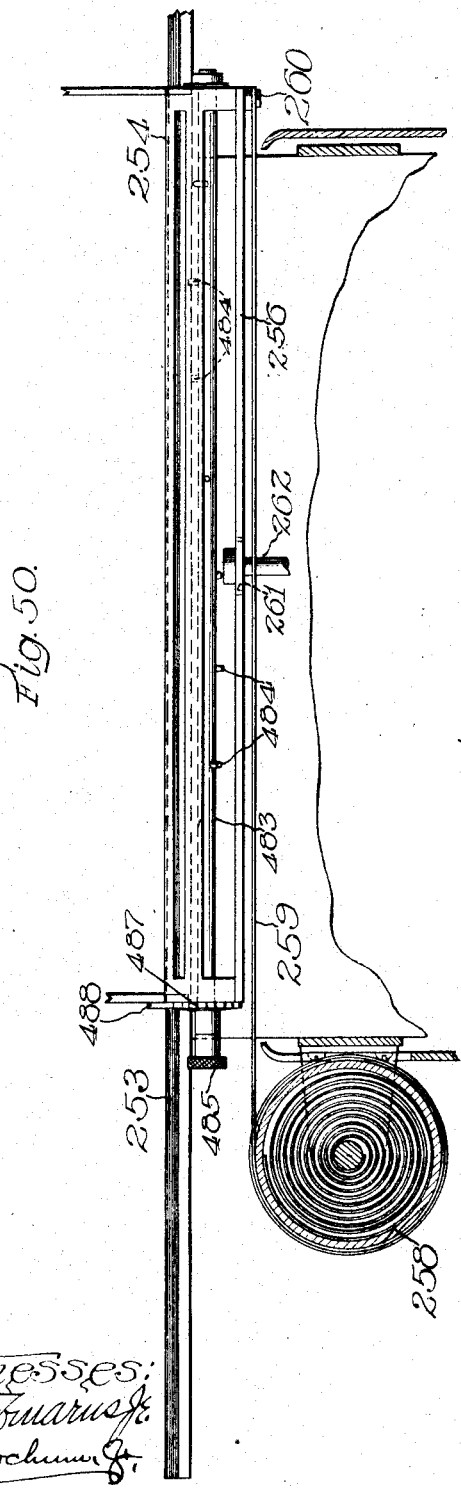
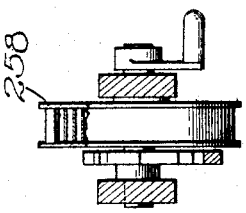
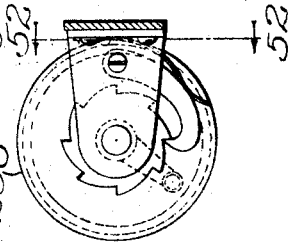
Witnesses:
Inventor:
Paul H. Berger
By: Brown & Hopkins
Attys.

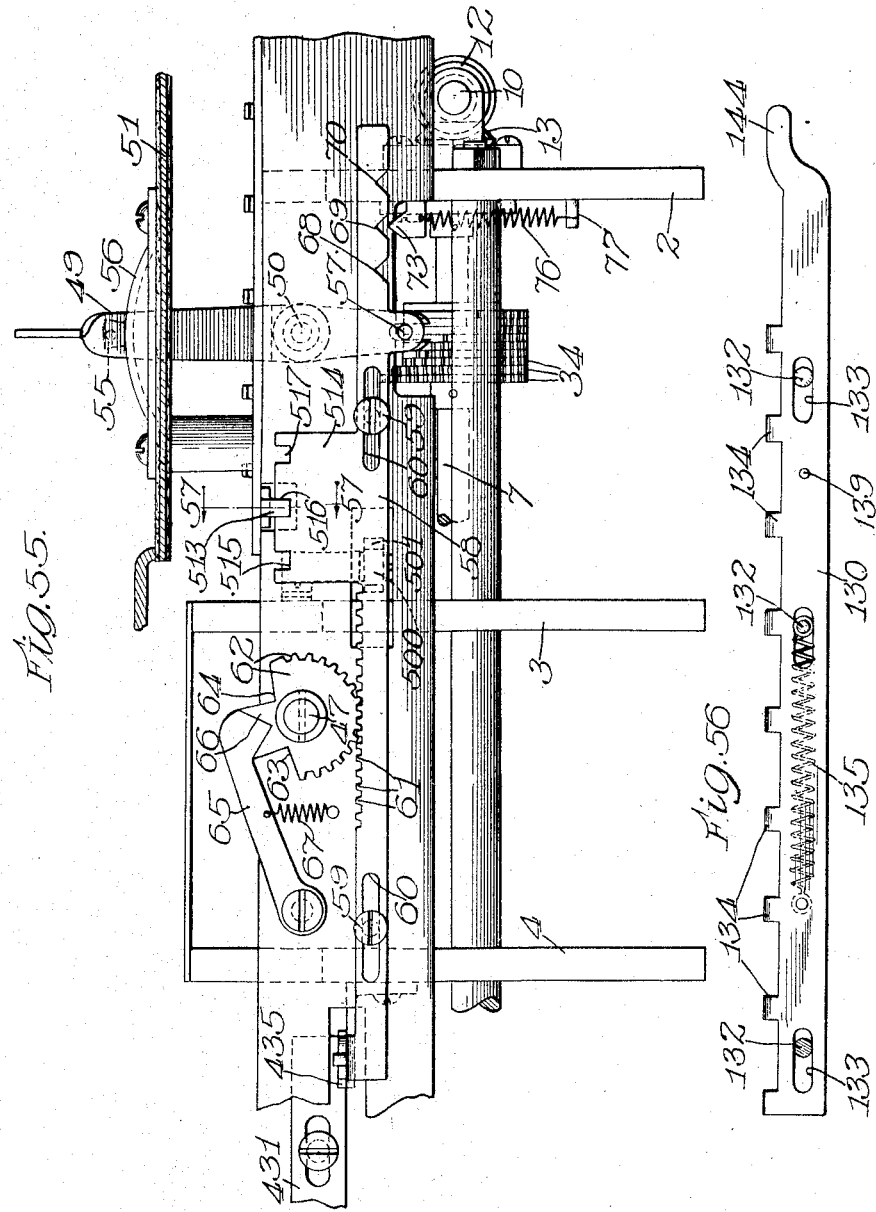

UNITED STATES PATENT OFFICE.

PAUL H. BERGER, OF CHICAGO, ILLINOIS, ASSIGNOR TO CARLIN CALCULATOR COMPANY, OF CHICAGO, ILLINOIS, A CORPORATION OF ILLINOIS.

CALCULATING-MACHINE.

1,208,271.   Specification of Letters Patent.   Patented Dec. 12, 1916.

Application filed April 13, 1911. Serial No. 620,826.

*To all whom it may concern:*

Be it known that I, PAUL H. BERGER, a citizen of the United States, residing at Chicago, in the county of Cook and State of Illinois, have invented certain new and useful Improvements in Calculating-Machines, of which the following is a specification.

This invention relates to calculating machines of the listing, single totalizer type and consists in substantially the construction hereinafter described, illustrated in the drawings, and particularly pointed out in the claims.

To the attainment of these ends and the accomplishment of other new and useful objects, as will appear, the invention consists substantially in the features of novelty hereinafter more fully described and claimed, and shown in the accompanying drawings exemplifying the invention, and in which—

Figure 46:
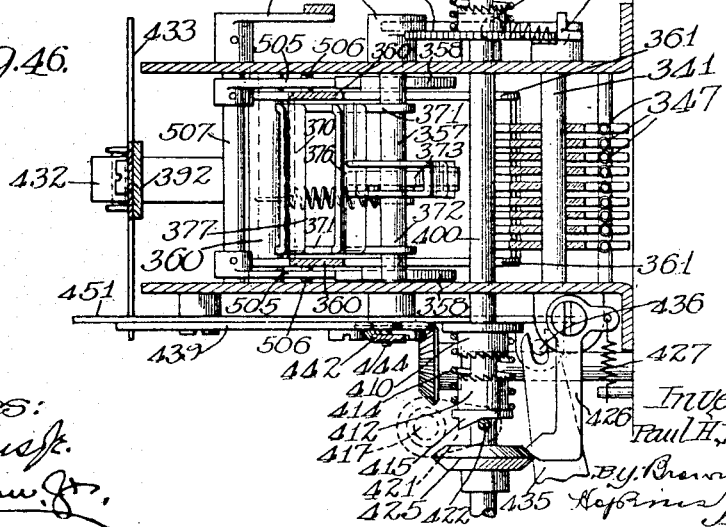

Figure 1 is a top plan view of an improved machine of this class constructed in accordance with the principles of the invention. Fig. 2 is a vertical sectional view on line 2—2, Fig. 1. Fig. 3 is a vertical sectional view on line 3—3, Fig. 1. Fig. 4 is a detail sectional view on line 4—4, Fig. 3. Fig. 5 is a detail sectional view on line 5—5, Fig. 3; Fig. 6 is a sectional view on line 6—6, Fig. 3; Fig. 7 is a horizontal sectional view on line 7—7, Fig. 3; Fig. 8 is a horizontal sectional view on line 8—8, Fig. 3; Fig. 9 is a horizontal sectional view on line 9—9, Fig. 3; Fig. 10 is a vertical, sectional view taken on lines 10—10, Figs. 7 and 8, looking in the direction of the arrows. Fig. 11 is a sectional view on lines 11—11, Figs. 3 and 10. Fig. 12 is a sectional view taken on lines 12—12, Figs. 3 and 10. Fig. 13 is a sectional view taken on lines 13—13, Figs. 3 and 10. Fig. 14 is a sectional view taken on line 14—14, Fig. 3. Fig. 15 is a top plan view of Fig. 16. Fig. 16 is a detail sectional view taken on line 16—16, Fig. 8. Fig. 16ᵃ is an elevation partly in section of the unlocking dog for the coupling between the main driving and driven shafts. Fig. 17 is a detail elevation of one of the operating keys. Fig. 18 is a detail perspective view of one of the dogs for controlling the operation of the shafts. Fig. 19 is a detail perspective view of one of the selecting mechanism slides. Fig. 20 is a detail perspective view of the dog which controls the operation of the dog shown in Fig. 18. Fig. 21 is a detail perspective view of the dog which is controlled by the error key for returning the keys which have been actuated by mistake. Fig. 22 is a diagrammatic view, partly in section, and is taken on line 22—22, Fig. 23. Fig. 23 is a detail sectional view on line 23—23, Fig. 3. Fig. 24 is a detail perspective view of the oscillating member which is actuated by the repeat and the repeat releasing keys for shifting the slide bar or member that controls the addition of a digit to the number bearing members after the completion of the calculation. Fig. 25 is an enlarged detail sectional view on line 25—25, Fig. 11. Fig. 26 is a sectional view on line 26—26, Fig. 25. Fig. 27 is a sectional view on line 27—27, Fig. 25. Fig. 28 is a detail perspective view of a portion of one of the shafts which is actuated by the keys for releasing the respective selecting mechanism slides. Fig. 29 is a detail perspective view of one of the members which forms an operative connection between the key and the releasing shaft for the selecting mechanism slide. Fig. 30 is a detail view, partly in elevation and partly in section, of the shifting indicator or shield and the mechanism controlled thereby. Fig. 31 is a perspective view of the locking dog for the shifting indicator or shield. Fig. 32 is a detail perspective view of the slide or member which is actuated by the shifting indicator or shield for correcting or adding an additional digit to the number bearing members when the indicator or shield is shifted from debit to credit, or vice versa. Fig. 33 is a detail perspective view of the dog for locking, during the operation of the machine the slide which controls the direction of rotation of the register. Fig. 34 is a detail sectional view on line 34—34, Fig. 3. Fig. 35 is a detail sectional view on line 35—35, Fig. 7. Fig. 36 is a sectional view on line 36—36, Fig. 8. Fig. 37 is a view taken on line 37—37, Fig. 41, illustrating the ribbon frisket or vibrator. Fig. 38 is a sectional view taken on line 38—38, Fig. 2. showing the printing mechanism and carriage control. Fig. 38ᵃ is a detail sectional view of a locking pawl on line 38ᵃ—38ᵃ, Fig. 38. Fig. 39 is a horizontal sectional view taken on line 39—39, Fig. 2. Fig. 40 is a vertical sectional view taken on line 40—40, Fig. 2, with parts omitted and parts broken away for the purpose of clear illustration of the carriage control. Fig. 41 is a sectional view taken on line 41—41, Fig. 38, illustrating in detail the printing mechanism and arrangement of the type segments and hammers. Fig. 42 is a detail sectional view taken on line 42—42, Fig. 41. Fig. 43 is a detail perspective view of one of the dogs or members which controls the printing of the zeros or ciphers. Fig. 44 is a plan view of the type segments and platen illustrated in Fig. 41. Fig. 45 is a sectional view on line 45—45, Fig. 41. Fig. 46 is a sectional view on line 46—46, Fig. 41. Fig. 47 is a detail sectional view on line 47—47, Fig. 2, illustrating the carriage control and paper feed. Fig. 48 is a sectional view on line 48—48, Fig. 40. Fig. 49 is a detail sectional view on line 49—49, Fig. 47, illustrating the regulating shaft for the carriage spacing mechanism. Fig. 50 is a view, partly in elevation, partly in diagram and partly in section, showing the mechanism for returning the carriage. Fig. 51 is a side elevation of the spring drum for returning the recording sheet support. Fig. 52 is a sectional view on line 52—52, Fig. 51. Fig. 53 is a sectional view on line 53—53, Fig. 38, illustrating the ribbon feed. Fig. 54 is a sectional view on line 54—54, Fig. 38. Fig. 55 is a sectional view on line 55—55, Fig. 1, showing in detail the mechanism coöperating with the lever for reversing the totalizer. Fig. 56 is a detail sectional view on line 56—56, Fig. 10, illustrating mechanism for locking the selecting slides. Fig. 57 is a detail sectional view on line 57—57—, of Fig. 55.

The present invention is designed primarily to provide a series of numeral wheels independently rotatable, one numeral wheel for each denominational order, said numeral wheels being each provided on their faces with two series of digits progressing from zero to 9 in opposite directions and arranged in combinations of 9. That is to say, each numeral wheel has two series of digits, one in one color and the other in another color, so relatively arranged with the corresponding digits of the two series when added together make 9. The provision of the series in different colors provides a means whereby the characteristic or algebraic nature of the resultant may be determined. For each denominational order of the totalizer, to-wit: corresponding to each numeral wheel thereof, is provided a series of denominational keys, each key controlling a universal lock which controls a slide under each order of keys. When the locks are released by the action of the keys, the slides operate forwardly under the influence of springs or other suitable mechanism. This movement of the slides causes a traveling pinion to mesh with a coöperating bank of mutilated gears, which through a series of connections impart a varied movement to the totalizer.

In connection with the totalizer means is provided which will control the operation of rotation of the totalizer members by controlling the power transmitted from the mutilated gears to said totalizer members. The gears under the control of the numeral wheels and arranged to be set by the action of the numeral wheels, provide a means whereby an additional movement may be imparted to the numeral wheels for effecting a transfer or carrying operation from one order to another in either direction of rotation.

Coöperating with the totalizer and the keyboard described, is a printing mechanism embodying adjustable type segments which coöperates with a movable carriage having a ribbon mechanism, the latter including an automatic ribbon feed, a reverse and automatic holocrome adjustment.

Reference being had more particularly to the drawings, the preferred form of the present invention will be described, it being understood, however, that changes may be made in the construction and arrangement of parts without departing from the spirit and scope hereof.

The numeral 1 designates a base upon which are mounted spaced upright supports 2, 3, 4, (see Fig. 3) and these supports or uprights form the bearings for the various shafts. A support 5 is provided which is arranged preferably adjacent the front of the machine, (as shown more clearly in Figs. 3 and 10), and which serves as a means for supporting the keys 6 to be hereinafter described.

Journaled in the supports 2, 3 and 4, are a plurality of power shafts 7 (see particularly Fig. 3) preferably nine in number, one for each of the operating shafts 8 (see also Fig. 8). These latter shafts are also journaled in suitable bearings, preferably in the supports 2, 3, 4, and are arranged in a plane above the shafts 7. One of these power and operating shafts 7, 8, is provided for each of the number bearing members 9 of the totalizer. Motion may be imparted to the shafts 7 in any desired or suitable manner, but preferably by means of a shaft 10 journaled in suitable bearings 11, so as to extend transversely across one end of each shaft 7, and this shaft 10 is provided with a plurality of beveled gears 12 (see also Fig. 7), which respectively mesh with similar gears 13 on the adjacent ends of the shafts 7, and through the medium of which meshing gears the shafts 7 will be rotated, preferably in a manner which will now be described.

A shaft 14, which for the sake of convenience will hereinafter be designated as a running shaft, is provided for imparting motion to the shaft 10, and this running shaft 14 derives its motion from any suitable source such as the shaft 15 of a motor (see Fig. 39) and which motor shaft may be connected to the shaft 14 in any desired or suitable manner, preferably by means of intermeshing gears 16, 17, respectively connected with the shafts 14, 15. The shaft 14 is journaled in suitable bearings preferably in the supports 2, 3, 4, so as to extend longitudinally of the machine transversely with respect to the shaft 10, and parallel with the shafts 7.

Mounted loosely upon the shaft 14 is a gear 18 (see also Fig. 12) and secured for rotation with this gear 18 and also mounted loosely upon the shaft 14 is a disk 19 which is provided with a notch 20 in its periphery, into which notch a portion of a dog 21 projects to lock the gear 18 and the disk 19 against overthrow. An elastic member 22 in the form of a spring is provided which tends normally to project the portion of the dog 21 into the notch 20. Secured for rotation with the shaft 14 and adjacent the disk 19 is a star or toothed wheel 23 and a dog 24 is pivotally supported by the disk 19 for locking the disk and the gear 18 to the shaft 14 for rotation therewith. An elastic member 25 controls the dog 24 and tends normally to move the latter in a direction to lock the disk and wheel to the shaft. The gear 18 is provided for the purpose of communicating motion from the shaft 14 to the shafts 7 and this is accomplished through the medium of a shaft 26 (see Figs. 6, 7, 8, 11, 12) on which shaft 26 is keyed a gear 27. This gear 27 meshes with the gear 18 so that when the shaft 14 is rotated and the gear 18 locked thereto, the shaft 26 will be rotated by the gear 27, and this motion of the shaft 26 will be imparted to the shaft 10 through the medium of meshing gears 28, 29, secured respectively to the shafts 26, 10, as shown more clearly in Figs. 6 and 7. It will thus be seen that when the dog 24 locks the gear 18 to the shaft 14, the motion of the shaft 14 will be imparted to the shafts 7.

In order to permit the shafts 7 to make one complete revolution and then stop, mechanism must be provided for unlocking the gear 18 from the shaft 14 at the proper time. Any suitable means may be provided for this purpose but a simple and efficient means for accomplishing this result comprises a dog 30 (see Figs. 10 and 12) which is adapted to engage a shoulder 31 on the dog 24 to move the latter out of engagement with the star or toothed wheel 23 and against the tension of the elastic member 25. This dog 30 is adapted to be operated to release the dog 24 to lock the gear 18 to the shaft 14 in a manner which will be hereinafter described.

The number bearing members or wheels 9 of the totalizer are each provided, in the present exemplification of the invention, with two series of numbers 32, 33, (see Figs. 3 and 8) which progress from zero to nine, and the numbers of the two series are so arranged with respect to each other that they will progress successively in opposite directions so that the sum of the respective adjacent numbers of the series when added together will make nine. One of these series of numbers may be differentiated from the other series in any suitable manner, such as by means of different colors. These number bearing members 9 are adapted to be controlled by the keys 6, of which there are provided nine keys for each number bearing member, and the keys are adapted to control the mechanism whereby a variable movement may be imparted to each of the respective number bearing members according to which of the keys is actuated. In order to accomplish this variable movement of the number bearing members, there is provided a bank of mutilated gears 34, on each of the shafts 7. Each bank of gears operates as a unit and the bank of gears of one shaft 7 is arranged staggeredly with relation to the bank of gears on the next adjacent shaft. The individual gears of each bank progress in the number of teeth thereon from 1 to 9; that is to say, the first gear of each bank is provided with one tooth while the last gear of the same bank is provided with nine teeth.

A traveling gear 35 is mounted upon each of the shafts 8 (reference being now had more particularly to Figs. 3 and 8) and secured for rotation with these shafts and for adjustment longitudinally thereon, in any ordinary and well known manner, each of the gears 35 being arranged upon the shafts in the same relative position as the gears 34 on the shafts 7. These gears 35 are adapted to be moved for any desired distance on the respective shafts 8 so as to be positioned with respect to the gears 34 to engage the latter when the shafts 7 are rotated, and thereby impart a degree of rotation to the shafts 8 corresponding to the number of teeth on the respective gears 34 with which the traveling operating gears 35 coöperate. This variable motion of the shaft 8 is imparted to the number bearing members 9 of the totalizer through the medium of connecting gears, preferably comprising spaced gears 36, 37, secured to the shafts 8 and corresponding to gears 38, 39, mounted loosely upon shafts 40 to which the number bearing members 9 of the totalizer are secured. One of these gears 36, 37, is adapted to rotate the shafts 40 and consequently the respective number bearing members 9 in one direction, while the other of these gears is adapted to rotate the shafts 40 and the number bearing member 9 in the opposite direction. In order to accomplish these different directions of rotation, one of the gears, preferably the gear 36, meshes directly with the gear 38 while the gear 37 imparts its motion to the gear 39 through the medium of an idler gear 41.

In order to lock the gears 38, 39, to the shafts 40, a sleeve or collar designated generally by the reference numeral 42 is provided, which is secured to the shaft 40 for rotation therewith and for longitudinal adjustment thereon. Each of the collars 42 is of a length somewhat less than the length of the space between the gears 38, 39, and is provided with projections 43, 44, extending from the extremities thereof, which projections are adapted to enter apertures 45, provided in the gears 38, 39, and these projections are of such a length that when the collars 42 are shifted to lock one of the gears 38, 39, for rotation with the shaft 40, the projections on the other end of the sleeve or collar will move out of the apertures in the other of the gears 38, 39, to release the latter, and when the collar 42 is adjusted midway of the gears 38, 39, the projections 43, 44, on the ends thereof will be moved out of the apertures in both of the gears 38, 39, so that when in this position both of the gears 38, 39, will be unlocked and may be rotated while the shaft 40 and the number bearing member 9 will remain idle. The direction of rotation, and the rotation of the number bearing members 9, are therefore controlled by the sleeves or collars 42, and the latter may be shifted longitudinally on the shafts 40 by means of a longitudinally serrated or toothed shaft 46 (shown more clearly in Fig. 8), the extremities of which are smooth to form trunnions 47 journaled in suitable supports which shaft extends transversely of the shafts 40. The teeth of this member mesh with serrations or teeth 48 on the sleeves or collars 42. It will therefore be manifest that when the shaft 46 is rocked, the sleeves or collars 42 will be correspondingly shifted.

Any suitable mechanism may be provided for rocking the shaft 46 for shifting the sleeves or collars 42 so as to render it possible to perform addition or subtraction or to cause the machine to indicate debits or credits, and also to position the sleeves or collar 42 intermediately and out of connection with the gears 38, 39. Suitable and efficient means for accomplishing this purpose will now be described, reference being had more particularly to Figs. 1, 8, 9, 11 and 55. Arranged in any convenient position for the operator, preferably adjacent the keys 6, is an operating lever 49 which is pivotally mounted intermediate its ends as at 50 to any suitable support, such as a bracket or the like. One extremity of this lever 49 projects above the top 51 of the machine and is shaped to form a hand-hold and also extends through a guide 52 at one extremity of which guide is provided an indication 53 while at the other end of the guide is provided another indication 54. The lever 49 is adapted to coöperate with these indications 53, 54, to designate a credit or a debit or that the clutch or sleeve 42 is set to perform addition or subtraction. If desired, another indication may be provided midway of the indications 53, 54, and so located that when the lever 49 is adjacent this indication, the sleeves or clutches 42 will assume the intermediate position above referred to. An element 55 may be provided on the lever 49 which coöperates with a surface 56 and serves as a means for retaining the lever in any of its adjusted positions. The other extremity of the lever 49 extends for any desired distance below the pivot 50 and has a pivotal connection 57 with a slide 58, the latter being held in position for a sliding movement in any desired or suitable manner, such as by means of a pin and slot connection 59, 60, with any fixed support. This slide 58 is provided with spaced teeth 61 (see particularly Fig. 55) which mesh with a toothed member 62 carried by one of the trunnions 47 of the toothed rock shaft 46 so that when the lever 49 is rocked about its point of pivotal support 50 in one direction or the other, the slide 58 will correspondingly rock the shaft 46. In order to retain the sleeve or collar 42 in its adjusted positions so as to maintain the projections 43, 44, in engagement with the respective gears 38, 39, the toothed member 62 is provided with notched portions 63, 64, into which a portion of a spring controlled dog 65 is adapted to project, when one or the other of the notched portions 63 is adjacent the dog. In order to maintain the sleeves or collar 42 in an intermediate position so that neither of the gears 38, 39, will be locked to the shaft 40, the member 62 is provided with an intermediate notched portion 66 with which the dog 65 also coöperates. These notches 63, 64, 66, and the coöperating portion of the dog 65 are so shaped that the tension of the elastic member 67 will hold the members 62 and 46 against oscillation under ordinary conditions but when pressure is brought to bear upon the member 62 by the operation of the lever 49, the dog 65 will yield sufficiently to permit the rock shaft 46 to be rocked in the manner already set forth. After the clutches or sleeves 42 have been thus adjusted, it will be manifest that they will remain in their adjusted positions until the lever 49 is again actuated and when once set the machine may be set in operation and rotation imparted to the shafts 7, the rotation of which latter will control the rotation of the number bearing members 9 as has already been described, the direction of rotation of which number bearing members is controlled by the position of the clutches or sleeves 42.

The shafts 7 are adapted to make one complete rotation, and then stop, in a manner as will be hereinafter set forth. It will be manifest, therefore, that the sleeves or clutches 42 might be shifted by some one after the shafts 7 have started to rotate, and, in this event, considerable damage might be occasioned. In order, therefore, to prevent the shifting of the sleeves or collars 42 after the shafts 7 have continued to rotate, it is advisable to provide additional and positive locking means for locking the slide 58 against operation by the lever 49. Any suitable mechanism may be provided for this purpose but a simple and efficient means will now be described, reference being had particularly to Figs. 3, 8, 33, 34 and 55. The slide 58 is provided in one of its faces with a series of notches 68, 69, 70, which are preferably located adjacent one of the supports such as the support 2. A dog 71 is pivotally mounted as at 72, preferably upon the support 2 and is provided with a projection 73 arranged beneath the slide 58. This dog 71 is provided with an arm or depending portion 74 adapted to coöperate with a cam 75 carried by one of the shafts 7 upon which the mutilated gears are mounted. An elastic member 76 is also provided, one extremity of which is connected with the dog 71 and the other extremity is anchored to a suitable fixed support 77 and tends normally to move the projection 73 away from the slide 58 and to hold the arm or depending portion 74 against the periphery of the cam 75. The notches 68, 69, 70 in the slide 58 are provided and arranged in such a manner that when the sleeves or clutches 42 are in either one of its adjusted positions, one of the notches will be disposed above the projection 73 on the dog 71. It will thus be manifest that after the slide 58 has been adjusted in the manner already described, one of these notches being in a position above the projection 73 on the dog 71, the projection will be moved into the notch when the dog is rocked, and as soon as the shaft 7 begins to rotate, the cam 75 will rock the dog 71 to move the projection 73 into the notch, and against the tension of the elastic member 76. When the dog 71 is thus adjusted, the slide 58 will be positively locked against movement until the low portion of the cam is presented to the arm or depending portion 74, at which time the tension of the elastic member 76 will move the projection 73 out of the notch to free the slide 58.

As has already been stated, the degree of rotation of the number bearing members 9 of the totalizer is controlled by the actuation of the keys 6, which latter are adapted to control this rotation, by the degree of adjustment of the traveling gears 35 with respect to the gears 34. The selecting mechanism as disclosed in the present invention and by means of which this relative degree of adjustment of the gears 35 with respect to the gears 34 may be accomplished will now be described, reference being now had more particularly to Figs. 3, 9, 11, 12, 17 and 19. A selecting member or slide 78 is provided, one for each of the gears 35. As the construction and operation of each of the selecting mechanisms are the same, the description of one will apply equally as well to them all. The selecting slide 78 is provided with a series of apertures 79, 80. These apertures vary in length and extend longitudinally of the slide, thereby creating varied intervening spaces 81 between the adjacent terminii of said apertures, for the purposes hereinafter to be described. Each of the apertures 79 is provided with a recess 82 which communicates with the respective apertures and are arranged preferably on one side of the respective apertures. The aperture 80 is provided with a plurality of recesses 83, 84, corresponding with the recesses 82. The selecting member 78 is mounted for sliding movement beneath the extremities of the respective series of keys 6 in any desired or suitable manner, preferably by means of brackets or supports 85, 86, and each of these brackets or supports is provided with a depending arm or projection 87, which latter is connected with the respective gear 35 on the shaft 8 in any suitable manner, preferably by means of a lateral projection or pin 88 extending into a circumferential groove 89 in the hub of the gear.

The keys may be constructed in any desired or suitable manner but preferably are formed from a strip of flat sheet material and each is provided with a projection 89 (see Fig. 17). The apertures 79, 80, in the slide or member 78 are so arranged that when the gear 35 is out of mesh with the gear 34, one of the apertures will stand beneath the lower extremity of the stem of each of the keys 6 so that when one of the keys is operated it will project into the respective apertures, as shown more clearly in Figs. 11 and 12. When the gear 35 is in the position shown in Fig. 3, with respect to the gear 34, one of the recesses 82, 83, 84 will be in a position directly below the respective projection 89 on the keys 6, so that when one of the keys is depressed the lower extremity of the stem of the key will not only project through the respective apertures 79, 80, but the projection 89 will pass through the respective recesses 82, 83, 84, and to such a distance that the top of the projection will pass beneath the selecting member or slide 78. The slide or member is adapted to be held normally in a position that one of the recesses 82, 83, 84, will stand beneath the respective projection 89 on the keys 6 and in order to move the slide to this position there is provided a member 90 (see particularly Fig. 3) which is pivotally supported preferably by means of arms 91 connected to a rock shaft 92 journaled in suitable supports and is so positioned that when the shaft 92 is rocked in one direction the member 90 will engage a depending portion or extension 93 on the slide or member 78 so as to move the member against the tension of an elastic member 94, which latter is provided for the purpose of shifting the member 78 longitudinally to move the gear 35 into mesh with the gears 34 when the member is released in a manner to be presently described. This elastic member 94 is preferably connected to the depending portion 93 and also to a fixed support.

The slide is normally held in a position to cause the gear 35 to be moved out of mesh with the gears 34 and in order that the selecting mechanism may quickly adjust the gear 35 into proper position with respect to the gears 34, the elastic member 94 is provided and tends normally to move the slide in that direction. The movement of the slide or member 78 under the tension of this elastic member 94 is arrested by the spaces 81 between the apertures 79, and also under certain conditions, by an ear or projection 95 on the slide or member which engages the support 85, as will be presently described. When the slide or member 78 is adjusted by the member 90, it will be moved in a direction to create a tension on the elastic member 94 and the degree of movement of this slide is controlled by the stem of the keys 6. When one of the keys is depressed, its stem will project through the respective apertures 79, 80, and when the slide is released the elastic member 94 will move it until the respective spaces 81 strike the key stem. The key which has been actuated will be held in this depressed position by a portion of the slide which passes over the projection 89 when the latter passes through the respective recesses 82, 83, 84, and inasmuch as the movement of the slide under the tension of the elastic member 94 will move the respective recesses 82, 83, 84, from beneath the projections 89 on the remaining keys of the series, these keys will be locked against actuation while the actuated key will be locked in its depressed position.

The aperture 80 is somewhat longer than the remaining apertures and permits the slide when the units key is depressed to move to such an extent that the gear 35 will mesh with the gear 34 having one tooth of the respective bank. In order to permit the longer movement of the slide 78 without materially increasing the length of the slide, the projection 95 is provided which will act in the same capacity as the spaces 81 when the first key of the series is actuated, that is, when this first key is actuated, the projection 95 will strike the support 85 and the movement of the gear 35 will be arrested.

As has already been stated when the selecting member or slide 78 is adjusted so as to position the recesses 82, 83, 84, under the extensions 89 on the keys, a tension will be created on the elastic member 94 and the slide may be locked in this position by means of an arm 96 (reference being now had more particularly to Figs. 3 and 6). This arm is secured to a rock shaft 97 journaled in suitable bearings 98 adjacent and above the slide or member 78, so as to extend longitudinally thereof and transversely with respect to the stems of the keys 41.

An elastic member 99 is provided which tends normally to rock the shaft 97 in a direction to project the arm 96 into the path of movement of one extremity of the slide or member 78 when the latter is acted upon by the tension of the elastic member 94. In order therefore to release the slide 78 to permit the elastic member 94 to adjust the slide and thereby position the gear 35 with respect to the gears 34 by the actuation of the keys 6, it is necessary to first rock the shaft 97 to move the arm 96 and thereby release the slide. This movement of the shaft 97 may be accomplished in any desired or suitable manner and a simple and efficient means will now be described, reference being had particularly to Figs. 25 to 29. The shaft 97 is arranged in close proximity to the stem of the keys 6 of the respective series and loosely mounted on the shaft are a series of yokes designated generally by the reference numeral 100, the sides 101 of which are provided with key-hole-shaped openings 102. One of these yokes 100 is provided for each of the keys 6 and the larger portions of the openings 102 are of such a size as to permit the shaft 97 to pass loosely therethrough. Projecting laterally from the shaft 97 are a plurality of lugs or projections 103 which are adapted to pass through the smaller portions of the openings 102 to permit the yokes 100 to be sleeved upon the shaft 97. These yokes 100 are of a length that when all of them are assembled on the shaft, the adjacent ends will abut and one will act as a means for preventing displacement of the other. The yoke on one end of the series may be held against displacement in any suitable manner, preferably by means of the bearing 98 and a pin 104 (see Fig. 3) may be provided which coöperates with the yoke on the other end of the series and when in position these yokes are adapted to move independently with respect to each other about the shaft 97. Each of these yokes is provided with a depending lip or projection 105 intermediate the portions 101 and one of these projections 105 is disposed above one of the projections 103 on the shaft 97 and is of such a length that when the keys 6 are in their normal or inactive position, they will be spaced above the respective projections 103. One of the portions 101 of the yoke 100 is provided with an arm or extension 106 adapted to coöperate with a shoulder 107 on the stem of the keys 6, and an elastic member 108 is provided, one end of which is connected with the yoke 100 and the other end is anchored to a suitable fixed support and tends normally to elevate or raise the keys 6 to their normal or inactive positions and also to move the projection 105 away from the respective projections 103 on the shaft 97.

The stem of the keys may be provided with a slot 109 through which a bar or rod 110 passes and this bar or rod and slots 109 serve as a means for limiting the return movement of the keys 6 under the influence of the eslastic member 108. A stop 111 may also be provided on the key stems which coöperates with the support 5 through which the key stems pass and serves as a means for limiting the movement of the keys when the latter are actuated.

From the construction just described, it will be manifest that when one of the keys 6 is actuated, the first tendency will be to rock the respective yokes 100 about the shaft 97 through the medium of the shoulder 107 on the key stem and the arm or extension 106 on the yoke. This independent rocking movement of the yoke with respect to the shaft 7 will continue until the extremity of the key stem passes through the respective apertures 79, 80, in the selecting slide 78 and until the shoulder or extension 89 on the key stem passes beneath the slide 78 thereby rendering it possible to position the key stem with respect to the slide 78 to arrest the movement of the latter so that the gear 35 will be properly positioned with respect to the gear 36 according to which of the keys 6 is actuated. By the time the shoulder or extension 89 passes beneath the slide 78, the respective yoke 100 will have been rocked a sufficient distance to cause the projection 105 thereon to engage the projection 103 on the shaft 97 and a further movement of the key in the same direction will cause the yoke 100 to rock the shaft 97 which will in turn rock the arm 96 and move it out of the path of movement of the slide 78. Thus released, the tension exerted by the elastic member 94 will cause the slide to be adjusted until its movement is arrested by the engagement of the respective spaces 81 engaging the key stem or by the projection 95 engaging the support 85, according to which of the keys is actuated. As has already been stated, this adjustment of the slide or member 78 will lock the remaining keys of the series against actuation and will also lock the actuated key in its depressed position. At the same time the yoke 100 will be held under the tension of the elastic member 108, inasmuch as a tension is created upon this elastic member during the rocking movement of the yoke by the key.

When the slides or members 78 have been returned to their normal positions in a manner which will be hereinafter described, all of the keys which have been locked against actuation will be released and the actuated key will also be released. When thus released, the tension of the elastic member 108 exerted upon the yoke 100 will rock the latter about the shaft 97 and will force the actuated key back to its normal position. At the same time the tension which has been created upon the spring 99 when the shaft 97 was rocked will operate to move the shaft in the opposite direction and the arm 96 into the path of movement of the slide or member 78. After the desired number of gears 35 have thus been set, it will be manifest that when the connection already described between the running shaft 14 and the shaft 26 has been established, motion will be imparted to all of the various shafts 7 and the number bearing members corresponding to the keys depressed. In order to establish this connection between the shafts a motor bar 112 is provided (see particularly Figs. 1, 6, 11 and 12) which for the sake of convenience will be hereinafter designated as a controlling bar or key inasmuch as it controls the connection which renders the various shafts active and establishes operative communication between the running shaft and the other shafts. This controlling bar or key 112 is arranged in any convenient position for the operator and is preferably of a length to extend adjacent each series of keys, as shown more clearly in Fig. 1 so that after the operator has actuated any of the keys of any of the series, he may readily actuate the controlling bar or key by touching the same at a point adjacent the key last actuated. This controlling bar or key 112 is adapted to impart motion to the dog 30 which latter is secured to a rock shaft 113 to move therewith, (see also Figs. 7, 8, 15 and 16); this shaft 113 being mounted in suitable supports or bearings.

Loosely supported by the shaft 113 for movement therewith and independently with respect thereto is a member designated generally by the reference numeral 114, preferably in the form of a yoke, the arms of which are provided with suitable apertures through which the shaft passes. This yoke is preferably of a length substantially equal to the length of the controlling bar or key 112 and is connected with the latter in any desired or suitable manner, preferably by means of links or stems 115, which latter are pivotally connected to the member 114 and extend upwardly through the top 51 of the casing. One of the arms of the yoke 114 is located adjacent an extension 116 of the dog 30, which latter is provided with a shoulder 117 and pivotally supported by the yoke or member 114 is another dog 118, which latter coöperates with the shoulder 117 of the dog 30. An elastic member 119 is provided, one extremity of which is connected with the dog 118 and the other extremity to any suitable support, and tends normally to hold the dog 118 within the path of movement of the shoulder 117 of the dog 30 so that when the controlling bar or key 112 is depressed or actuated, the yoke or member 114 will be rocked about the shaft 113 and the dog 118 carried by the member 114, having engagement with the shoulder 117, will rock the dog 30 so as to move it out of engagement with the shoulder 31 of the dog 24 to allow the elastic member 25 to move the dog 24 into engagement with the star or toothed wheel 23 in the manner as has already been described. An elastic member 120 is provided and tends normally to move the dog 30 in a direction to project into the path of movement of the shoulder 31 on the dog 24 to unlock the gear 18 with respect to the shaft 14. It will therefore be manifest that when the controlling bar or key 112 is actuated, the dog 30 will be tripped and the mechanism will be set itno operation from the running shaft 14. Unless mechanism is provided for automatically releasing the dog 30 to permit it to assume a position to unlock or trip the dog 24, after the shaft has made one complete revolution, the shafts will continue to rotate so long as the controlling bar or key 112 is held depressed. Therefore in order to release the shafts so that they will stop after they have made one complete revolution and even though the controlling bar or key 112 is held depressed, the dog 118 is provided, and mechanism for automatically tripping this dog to move it out of engagement with the shoulder 117 of the dog 30 will now be described.

Pivotally mounted upon a shaft 121 arranged adjacent the shaft 113 is a tripping member designated generally by the reference numeral 122 which is preferably in the form of a yoke having an arm or extension 123 projecting in a direction toward the shaft 14. This arm 123 is adapted to be engaged by a pin or projection 124 carried by a cam 125 (which cam is provided for a purpose to be hereinafter set forth) which is secured for rotation with the gear 18 so as to rock the member 122 against the tension of the elastic member 126 and thereby move a pin or projection 127 which is carried by the member 122, into engagement with the dog 118 to move the latter out of engagement with the shoulder 117 on the dog 30, and against the tension of the elastic member 119. When the dog 30 is thus released, the elastic member 120 will move the dog into the path of movement of the shoulder 31 on the dog 24 to trip the latter just at the completion of the revolution of the shaft 14 and thereby unlock the gear 18 in a manner as has already been described. When the dog 30 has been thus released, and the controlling bar or key 112 is released, the member 114 will be returned to its normal position by means of an elastic member 128 and as the dog 118 passes the extremity of the dog 30 on which the shoulder 117 is located, the dog 118 will yield against the tension of the elastic member 119 so as to pass the shoulder 117. After passing the shoulder 117 the dog will be returned to its normal or active position, that is, to a position when the controller bar 112 is again depressed, that it will strike the shoulder 117 and again trip the dog 30. The movement of the dog 118 so as to position the latter with respect to the shoulder 117 will be limited by means of a suitable stop 129 provided for this purpose.

In order to prevent injury to the machine which might be caused by the actuation of one of the keys 6 after the controlling bar or key 112 has been actuated to set the mechanism in motion and before the completion of a complete cycle of movement of the parts, it is advisable to lock all of the keys 6 of the respective series in which one of the actuated keys is arranged and locked against actuation by the shifting of the respective slides or members 87. This locking mechanism, which will now be described, is particularly designed for the purpose of locking the keys of the series which have not been used, and to prevent actuation of the keys of this series, which actuation would tend to adjust the respective gears 35 and thereby cause considerable damage such as the stripping of the teeth of the gears, etc.

Referring now more particularly to Figs. 3, 6 and 56, the numeral 130 designates a member mounted for sliding movement upon a suitable support 131, located adjacent the front of the machine and is mounted for sliding movement in any desired or suitable manner, preferably by means of fastening devices 132 which pass through suitable slots or apertures 133 in the member and into the support. This member 130 is of a length to extend transversely across the front ends of the shafts 97 and is provided with a plurality of spaced projecting portions 134, one of which latter projecting portions is provided for each of the members 78. These projecting portions 134 are of a length so that they will not interfere with the movement of the free extremities of the arms or projections 96 on the shafts 97 and an elastic member 135 (shown more clearly in Figs. 6 and 56) is provided, one end of which is secured to the member 130 and the other end is anchored to a suitable fixed support and tends normally to move the member 130 to cause the projecting portions 134 to extend into the path of movement of a lug or projection 136 carried by the selecting members or slides 78 and thereby lock these members against movement under the tension of the elastic members 94, as shown more clearly in Fig. 3. In this position, it will be manifest that although the keys 6 may be actuated, the selecting members or slides 78 will be locked against actuation. The member or slide 130 is held against actuation by the elastic member 135 in any desired or suitable manner and normally in the position shown in Fig. 6 so that the selecting members or slides 78 will be normally unlocked and to permit these members to be adjusted to properly position the gears 35 when one of the keys 6 of the respective series is actuated. After the proper keys in the various series have been actuated, motion is imparted to the shafts 7 in the manner already set forth by the actuation of the controlling bar or key 112. It is after the actuation of this controlling bar or key 112 and after the proper keys 6 have been actuated that it is advisable to lock the keys of the remaining series or the series in which no key has been actuated, against actuation. In order to accomplish this, therefore, it is advisable to provide mechanism which is controlled by the actuation of this controlling bar or key 112 to release the member 130. Suitable and efficient mechanism for this purpose will now be described. Pivotally mounted upon the suitable support 137 (see particularly Figs. 6 and 7) is a dog 138, one arm of which is adapted to be projected into the path of movement of a lug or projection 139 carried by the member 130 (see also Fig. 56) and an elastic member 140$^a$ is provided and which is connected with the dog 138 and a fixed support, which member tends normally to move the end of the arm 138 into the position shown in Fig. 6 to lock the member 130 against movement under the influence of the elastic member 135. The other arm 140 of the dog projects into the path of movement of the arm 141 carried by the shaft 113. It will therefore be manifest that when the shaft 113 is rocked in the manner already described by the controlling bar or key 112, the arm 141 will move the arm 140 of the dog 138 to move the latter out of the path of movement of the pin or projection 139 and when thus released the member 130 will be automatically shifted by the elastic member 135 for the purpose just set forth.

After the completion of the calculation, and before another calculation can be made, it is necessary as has been stated, to return the slides 78 to release the keys in the series containing an actuated key. This is accomplished by means of the rocking member 91 in the manner which has already been set forth. Before this member 91 can return the slides or members 78, it is necessary that the member 130 be shifted or returned to its normal position against the tension of the elastic member 135 so as to move the extensions 134 on the member 130 out of the path of the return movement of the members 78. This may be accomplished by means of a crank or cam 142 secured to a rock shaft 143 which latter is adapted to be given a rocking movement in a manner which will be presently described. This crank or arm 142 is adapted to engage the extremity 144 of the member 130 and shift the latter to its normal position against the tension of the elastic member 135. After the pin or projection 139 passes the dog 138 on this return movement, the elastic member 140$^a$ will move the dog 138 into the path of movement of the pin or projection 139 in the opposite direction and thereby lock the member 130 in the position shown in Fig. 6. This locking of the keys 6 should be accomplished before the dog 24 is released to connect the gear 18 with the shaft 14 or before the shafts 7 are rendered active, and in order to accomplish this, the portion of the dog 138 which stands within the path of movement of the pin or projection 139 on the member 130 should be so proportioned with respect to that portion of the dog 30 which engages the shoulder 31 on the dog 24 (see Figs. 6 and 16) that the dog 138 will move out of the path of movement of the pin or projection 139 before the dog 30 moves out of engagement with the shoulder 31 on the dog 24.

When the shaft 143 is rocked in a manner to be hereinafter described, to return the member 130, the rocking movement of this shaft will be imparted to the shaft 92 (see particularly Figs. 3, 6, 7 and 10) to move the member 90 into engagement with the projection 93 on the slides 78. This movement of the shaft 92 may be accomplished in any desired or suitable manner, such as by means of an arm or cam 145 secured to the shaft 143 and which arm engages an arm 146 pivotally mounted as at 147 to a fixed support and connected with this arm 147 is a gear or segment 148. Connected with the shaft 92 for rotation therewith is another gear or segment 149 with which the gear or segment 148 meshes. It will thus be apparent that when the shaft 143 is rocked, the arm 145 will engage the arm 146 to raise the latter, and as this arm 146 is raised the gear or segment 148 will be rocked, which rocking movement will be imparted to the gear or segment 149 and then to the shaft 92 and consequently the arms 91 and member 90 to move the latter so that it will engage the projections 93 on the slides or members 78 to move the latter against the tension of the member 94. The member 90 is itself provided with elastic members 150 connected therewith and anchored to a suitable fixed support in such a manner as to normally exert their tension in a direction to move the member 90 away from the projections 93, so that when the member 90 is rocked in the manner just described, a tension will be created upon these elastic members 150 to return the member 90 and the shaft 92.

In order to maintain the dog 30 in an inoperating position during the calculation and to prevent it from returning to a position which would trip the dog 24 before the completion of a calculation, the cam 125 is provided on the shaft 113 (see particularly Figs. 7, 8, 12, 15, and 16) which coöperates with an arm 151 and the cam and arm are so arranged with respect to each other that when the controlling bar or key 112 is actuated, the dog 24 released and the member 130 shifted, the high portion of the cam will coöperate with the extremity of the arm to lock the member against return during calculation but allows it to return as soon as the carrying commences.

Motion is imparted to the shaft 143 so as to raise the arm 145 to rock the arm 146 in any desired or suitable manner, preferably by means of a cam 152 (see particularly Figs. 8 and 10), secured to and for rotation with the shaft 26 and above which shaft 26 a shaft 143 is located (see also Fig. 11). An arm or crank 153 is secured to and depends from the shaft 143 in a position to be engaged by the cam 152 and rocked thereby to impart a rocking movement to the shaft 143. If desired, an anti-friction roll 154 may be provided on the arm 153 with which the cam 152 engages, to reduce friction (see also Fig. 10). The cam 152 is so located on the shaft 26 with respect to the arm 153 that just at the completion of the cycle of movement of the running shaft 14, after the calculation has been completed, its high portion will contact with the arm to rock the shaft 143 and consequently the shaft 92 to shift the slides or members 78 and the gears 35 to their normal positions, thereby releasing all of the actuated mechanisms.

When the high portion of the cam 152 passes out of engagement with the arm 153, the shaft 143 and the shaft 92 will be moved in the opposite direction or returned to their normal positions by means of the elastic members 150. As the shaft 92 is returned, the arm 146 will engage the arm 145, and thereby move the shaft 143 to its normal position. The arm 153 is secured to the shaft 143, so as to be longitudinally adjusted thereon to be moved into a position to be engaged by the cam 152 and also to be moved into a position so that it will not be engaged by the cam 152 for a purpose which will be hereinafter set forth.

The above described operations may be repeated as often as desired, and in order that the digits may be carried from one of the number bearing members 9 to the next number bearing member of a higher denomination, suitable carrying mechanism is provided which will now be described, reference being had more particularly to Figs. 3, 8, and 13. Secured to each of the shafts 8 for rotation therewith and for longitudinal adjustment thereon is a gear 155, each of which gears is provided with a hub or collar 156, of a diameter somewhat larger than the diameter of the shaft to form a shoulder 157. As the construction and operation of all of the carrying mechanisms is the same, the specific description of one will apply equally as well to them all. Secured to each of the shafts 7 and in close proximity to the gear 155 is a one-toothed gear 158 and these gears 158 are fixed upon the shafts, while the gear 155 is adapted to be longitudinally adjusted on the shaft 8 and laterally with respect to the gear 158 so as to be moved into a position to be engaged by the one tooth of the gear 158 and also into a position so that it will not be engaged by the gear 158 when the shaft 7 is rotated. An elastic member 159 is provided which is preferably supported by the shaft 8 and is disposed between the gear 155 and the bottom of the recess 160 which is provided in the end of the hub 161, which latter connects the gears 36, 37, (see particularly Fig. 5) and this elastic member tends normally to move the gear 155 into a position where the gear 158 will mesh therewith, and when in this latter position and the shaft 7 is rotated, one step of rotation will be imparted to the shaft 8 and the gears 36, 37, as well as the gears 38, 39, and consequently one step of rotation to the number bearing member 9 in either direction or the other according to which of the gears 38, 39 is locked to the shaft 40 by means of the clutch or sleeve 42, as has already been described. The gear 155 is normally held out of engagement with the gear 158 or in a position out of mesh therewith, by means of a dog 162 (see also Fig. 14), which is pivotally supported as at 163 adjacent one end of the number bearing member 9 and in such a position that when the arm 164 of the dog is behind the sleeve or hub 156 of the gear 155 and in engagement with the shoulder 157 thereof, the elastic member 159 will be held under tension and the gear 155 will be held out of mesh with the gear 158. An elastic member 165 tends normally to move the arm 164 in a direction to pass behind the shoulder 157. It will therefore be apparent that when the arm 164 is rocked to be moved out of engagement with the shoulder 157, the elastic member 159 will shift the gear 155 so as to be engaged by the gear 158. These dogs 162 are adapted to be rocked to release the gears 155 as the number bearing members 9 approach the zero point, and in order to automatically accomplish this operation there is provided on the number bearing member a tooth or projection 166 which is adapted to engage a projection 167 on the dog 162 and thereby rock the dog against the tension of the elastic member 165 to move the arm 164 out of engagement with the shoulder 157. Thus released, the gears 155 will automatically assume a position to permit a digit to be carried from one of the number bearing members to the next adjacent number bearing member. This operation of carrying from one of the number bearing members to another is accomplished after the calculation has taken place and before the shafts 7 have completed their revolution. After the digit has been carried and in order to render the carrying mechanism inactive, so that other amounts may be registered on the number bearing members, it is necessary to laterally displace the gear 155 with respect to the gear 156. This may be accomplished in any suitable manner but a simple and efficient means comprises a rock shaft 168 (see particularly Figs. 3, 8, 13 and 14), journaled in suitable supports and extending transversely with respect to the shafts 8 and located preferably below these shafts. This shaft 168 is provided with a plurality of arms or projections 169, one of which is located adjacent the shoulder 157 of each of the sleeves 156, and an elastic member 170 is provided for moving the shaft 168 in a direction to cause the arms or projections 169 to be moved out of engagement with the shoulders 157 of the sleeves of the gears 155, when the gears are held in an inoperating position or in the position shown in Fig. 3. When the arms 164 of the dogs 162 are shifted to permit the elastic members 159 to adjust the gears 155, the shoulders 157 of the sleeves 156 of the gears 155 will be moved into close proximity to the arms 169 on the shaft 168.

After the carrying operation the shaft 168 is rocked by means of a cam 171 which is connected for rotation with the mutilated gear shaft 7 of the highest denomination, and is so arranged on the shaft that just before the completion of a complete revolution of this shaft, the cam 171 will engage an anti-friction roller 172 on the shaft 168 to rock the latter against the tension of the elastic member 170. After the arms 164 have been shifted to release the gears 155 and the latter have assumed their proper positions with respect to the gears 158, the elastic members 165 will cause the arms 164 to rest upon the upper surfaces of the sleeves 156, so that when the gears 155 are shifted into inoperating positions by the shaft 168, the elastic members 165 will cause the arms 164 to move into positions behind the shoulders 157 of the sleeves 156 and lock the latter in their adjusted positions.

It is thought that the operation of this portion of the mechanism will be clearly understood from the above description but briefly stated it is as follows: Assuming the parts to be in the position shown in Fig. 3 and it is desired to register amounts on the number bearing members 9, it is first necessary to actuate the lever 49 (see Fig. 55) to adjust the sleeve or clutch 42 to lock one of the gears 38, 39, for rotation with the shafts 40 according to the nature of the amount to be registered, that is, whether the amount to be registered is to be added or subtracted or whether it denotes debits or credits. With the parts thus adjusted, the operator then actuates the desired key 6 in the respective series according to the amounts to be registered, it being understood that the shaft 14, designated as the running shaft, is continuously operated from the motor or any suitable source of power. As the respective keys 6 are actuated, the selecting slide or member 78 will be first released by rocking the shaft 97 (reference being still had to Fig. 3) to move the arm 96 out of the path of movement of the slide or member under the tension of the elastic member 94. Thus released, the slide 78 will move until its movement is arrested by the engagement of one of the spaces 81 with the stem of the actuated key or the engagement of the projection 95 with the support 85, so that the gear 35 will be properly positioned with respect to the mutilated gears 34 in accordance with the actuated key. After one key 6 of each series or of the desired series has been actuated, the parts are then in position to communicate or impart the desired number of steps of rotation to the number bearing members 9, and all that is then necessary in order to impart motion to the shafts 7 is to render the coupling between the running shaft 14 and the shaft 26 active. This is accomplished by the actuation of the controlling bar or key 112, the actuation of which latter will rock the dog 30 to trip the dog 24 to lock the gear 18 for rotation with the shaft 14 (see Figs. 7, 8 and 12). As the gear 18 meshes with the gear 27 on the shaft 26, the shaft 26 will be rotated and this rotary motion will be imparted to the shaft 10 through the medium of the gear 29 on the latter which meshes with the gear 28 on the shaft 26. This shaft 10 will impart rotation to the shafts 7 through the medium of the gears 12 on the shaft 10 meshing with the gears 13 on the respective shafts 7. As these latter shafts are rotated, the gears 35 will be rotated a number of steps equal to the number of teeth on the mutilated gear 34 above which the gear 35 is located, and the corresponding number of steps of rotation imparted to the shafts 8 will be imparted to the number bearing members 9 through the medium of the intermeshing gears 36, 38, or 37, 41, 39 according to which train of gears is rendered active.

The shafts 8 may be locked against overthrow by means of dogs 173 (see Figs. 3 and
12) arranged between the shafts 8 and the respective shafts 7. These dogs 173 are pivotally mounted on any suitable support, preferably the support 3, and are provided with a projecting portion 174 adapted to enter the notches in a star or toothed wheel 175, secured to the respective shafts 8. Secured to each of the shafts 7 is a cam 176, each of which is provided with a high portion and a low portion, the high portion being adapted to engage a projecting portion 177 on the respective dogs 173, to move the projecting portions 174 into the notches in the star or toothed wheels and the low portions of the cams are adapted to receive the projecting portions 177 of the respective dogs 173, to permit the projecting portions 174 to move out of the notches in the star or toothed wheels and thereby release the shafts 8 so that they may be freely rotated.
The cams 176 are so arranged with respect to each other that the high portions will operate successively on the respective dogs 173, so as to permit the carrying to be effected from one of the number bearing members 9 to the other, as will be understood.

The keys of all of the series in which the actuated keys are located will be locked against actuation by the slides 78, owing to the fact that the respective recesses 82, 83, 84, will move out of alinement with the shoulder or projection 89 on the extremity of the remaining key stems, and in order to lock all of the keys of the series which are not employed or actuated to register amounts on the number bearing members 9, the locking member or slide 130 is provided. This locking member or slide is adjusted to lock these keys just as the controlling bar or key 112 starts to actuate, that is to say, during the first portion of the rocking movement of the dog 30 and before the dog passes out of engagement with the shoulder 31 on the dog 24. This rocking movement of the shaft 113 which supports the dog 30 will cause the arm 141 on the shaft to rock the dog 138 to release the slide or member 130 and thereby permit the latter to move under the influence of the elastic member 135 to position the projections or extensions 134 on the member in the path of movement of the projections 136 on the slides 78. By the time this slide or member 130 has reached its locking position, a further rocking movement of the shaft 113 and dog 30 will effect a tripping of the dog 24 to permit the latter to engage with the star or toothed wheel 23 and thereby lock the gear 18 for rotation with the running shaft 14.

As the number bearing members 9 rotate, the carrying from one to another will be effected through the medium of the dogs 162 (see Figs. 3, 13, 14 and 23) and the projections or cams 166 on the number bearing members 9, which projections rock the respective dogs 162 to release the respective gears 155 to permit the latter through the medium of the elastic members 159 to assume positions in the path of movement of the one-toothed gears 158 on the shafts 7. These cams or projections 166 on the number bearing members 9 are so located that they will operate on the respective dogs 162 just at the completion of the calculation and before the shafts 7 have made a complete revolution. The carrying mechanism is also rendered inactive by shifting the gears 155 laterally to move them out of the path of the one-tooth of the respective gears 158 before the shafts 7 have made a complete revolution, but this operation is effected after the carrying has been completed, and is accomplished by means of the cam 171 (reference being had now more particularly to Figs. 3 and 14) which cam engages the anti-friction roller 172 on the shaft 168 to rock the latter and thereby move the arms or projections 169 into engagement with the shoulders 157 of the gears 155 to shift the latter against the tension of the elastic members 159 and to permit the arms 164 of the dogs 162 to assume positions behind the shoulders 157 and thereby lock the gears 155 in inoperating positions.

After the completion of the calculation and the carrying operations, the dog 30 of the coupling mechanism between the running shaft 14 and the shaft 26 (reference being now had more particularly to Figs. 12, 15 and 16), will be automatically released and the cam 125 will be in such a position with respect to the arm 151 as to permit the shaft 113 to be rocked in the opposite direction under the influence of the elastic member 120. During the latter portion of the revolution of the shaft 14, the cam 152 on the shaft 26 (see Figs. 8 and 11) will move into engagement with the anti-friction roll 154 on the arm 153 of the shaft 143 to rock the latter and thereby cause the arm 145 on the shaft 143 to move into engagement with and shift the arm 146 on the shaft 92 to rock the latter. As this shaft 92 is rocked under the influence of the arm 145 the member 90 carried by the shaft 92 will move into engagement with the projections 93 on the slides 78 and move the latter to the position shown in Fig. 3 so as to release the actuated keys 6 and shift the gears 35 into such positions that they will not be engaged by any of the gears 34 on the respective shafts 7. At the same time the keys 6 are released, the extremities of the member 78 will be moved into such position that the arms 96 on the shafts 97, after they have been released by the member 130, will move into the path of movement of the ends of the respective slides or members 78 to lock the latter in the position shown in Fig. 3.

It sometimes happens that one or more of the keys 6 is actuated by mistake and unless returned or restored to their normal positions after being actuated, the result of the calculation indicated on the number bearing members 9 will not be correct. Therefore, in order to obviate this danger suitable mechanism is provided for automatically restoring the parts which have been actuated by mistake, and comprises what might be termed an error key 178 (see Figs. 1, 6, 7, 8, 9, 10 and 11) which is located in a convenient position for the operator and preferably adjacent the controlling bar or key 112, as shown more clearly in Fig. 1. This error key should therefore control the movement of the shaft 143, inasmuch as the shaft must be actuated to rock the shaft 92 to return the slides 78 which have been adjusted by the actuation of the improper key, and inasmuch as the shaft 143 is rocked through the medium of the cam 152 which receives its motion from the shaft 14 when the controlling bar or key 112 is actuated, it is apparent that if such movement is derived by the actuation of the controlling bar or key 112, the entire mechanism would be actuated and the improper amount would be registered on the number bearing members 9. Therefore, in order to overcome this objection and to provide means whereby the shaft 143 may be actuated from the running shaft 14 without actuating the mutilated gear shafts 7, a separate and normally inoperative connection is provided between the shaft 14 and the shaft 143 and comprises a cam 179 (shown more clearly in Figs. 8 and 10) which is mounted loosely upon the shaft 26. Secured to the cam 179 for rotation therewith and also loosely mounted upon the shaft 26 is a gear 180 which meshes with a gear 181 mounted loosely on the running shaft 14 (shown more clearly in Figs. 10 and 11).

A normally inactive coupling similar to the coupling between the gear 18 and the shaft 14 (shown more clearly in Fig. 11) is provided between the gear 181 and the shaft 14 and comprises a disk 182 on which is pivotally mounted a dog 183, similar to the dog 24. This dog 183 coöperates with a star or toothed wheel 184 similar to the star or toothed wheel 23, and this star or toothed wheel 184 is secured to the shaft 14 for rotation therewith. A yoke-shaped member 185 is pivotally supported upon a suitable support, preferably the shaft 113. One arm of the yoke-shaped member is shaped to form a dog 186 (see particularly Fig. 11) which is adapted to coöperate with the dog 183 to move and hold the latter out of engagement with the star or toothed wheel 184, and thereby render the gear 181 inactive. The other arm of the yoke-shaped member 185 is formed to project in a direction opposite to that in which the dog 186 projects and to this projecting portion 187 the stem of the error key 178 is pivotally connected so that when the error key is actuated or depressed, the yoke-shaped member will be rocked against the tension of the elastic member 188 to release the dog 183 and thereby lock the gear 181 to the shaft 14. When thus released, the gear 180 and the cam 179 will be rotated (see Figs. 8, 10 and 11) and when so rotated the cam 179 will engage the anti-friction roller 154 on the arm 153 to rock the shaft 143 to cause the arm 145 to engage and move the arm 146 and consequently rock the shaft 92, the rocking movement of which latter will move the members 78 to their normal positions to release the actuated keys 6 in the manner as already set forth. Thus it will be seen that the key which has been actuated by mistake may be returned without imparting motion to the shafts 7. In order to lock the error key (in a manner to be set forth) when the controlling bar or key 112 is actuated, there is provided on the shaft 14 a cam 190 (see Figs. 8, 10 and 11) which is secured to the gear 181 so as to rotate with the gear when the latter is locked to the shaft. The cam 190 coöperates with an arm 191 carried by the dog 186 and projects therebeyond and into a position that the high portion of the cam 190 will engage the arm after the dog 183 has been tripped and will hold this dog as well as the yoke 185, and the error key 178 in their adjusted positions. After the keys have been restored, the low portion of the cam 190 will be moved into position adjacent the arm 191 and the elastic member 188 will tend to move the yoke 185 in the opposite direction and the arm 191 into engagement with a low portion of the cam as well as move the dog 186 into a position that it will trip the dog 183. This movement of the yoke-shaped member will also return the error key to a normal position. After the keys 6 have been restored to their normal positions, all the parts will be at rest except the running shaft 14 and then the proper key 6 may be actuated to adjust the gears 35. The gear 181 may be locked against overthrow by means of a dog 192 pivotally supported upon a suitable support 193 (see Fig. 11) which dog engages a notch in the periphery of the disk 194 and an elastic member 195 tends normally to hold the dog in a position to enter the notch in the disk.

As has already been explained, this mechanism is adapted for what might be termed addition and subtraction, that is to say, the number bearing members 9 may be adjusted to be rotated in one direction to add to the amounts already registered thereon, and the mechanism may also be adjusted to be rotated in the opposite direction to subtract an amount from the amount already registered thereon. It has also been explained that two series of numbers 32, 33, under number bearing members 9 are differentiated from each other, one of the series indicating debits and the other series indicating credits. These numbers on the number bearing members are exposed through a suitable opening in the casing which incloses all of the mechanism, and which opening is provided with a transparent closure 196 (see Figs. 3 and 10). In order to indicate or direct the attention of the operator to the series of numbers which is to be read, a shiftable shield or indicator 197 is provided (see Figs. 3, 10, 13, 14 and 30) and this indicator or shield is itself provided with two series of apertures or openings 198, 199, one in each series for each of the number bearing members 9 and these apertures or openings 198, 199 are preferably arranged in a staggered relation with respect to each other. The indicator or shield is mounted in any suitable manner so as to be adjusted longitudinally, preferably by means of bolts or fastening devices 200 which pass through elongated slots or openings 201 in the indicator or shield and into a fixed support. The shield is adapted to be automatically shifted so as to conceal or expose one or the other series of numbers on the number bearing members in any suitable manner but preferably from the shaft 40 of the number bearing member 9 of the highest denomination. On this shaft there is provided a lug or projection 202 (see particularly Fig. 14) which is preferably formed on a portion of the number bearing member 9. Pivotally mounted upon the indicator or shield 197 and spaced from each other are dogs 203, 204, each of which is adapted to yield when the projection 202 engages the same during the rotation of the shaft 40 in one direction, and to form an abutment or rigid projection in the path of movement of the projection 202 when the shaft 40 is rotated in the opposite direction, so that when the shaft is rotated in one direction to shift the indicator or shield 197 in one direction, the projection 202 will pass one of the dogs 203, 204, and engage the extremity of the other to shift the indicator. When the shaft is rotated in the opposite direction, the projection 207 will engage the other dog 203, 204 and move the indicator in the opposite direction.

Owing to the mechanical construction and the relation of the numbers of the two series on the number bearing members with respect to each other, the amount registered on the number bearing members will be incorrect to the extent of one cent, and when the shield or indicator 197 is shifted from one of the series of numbers to the other, as this shifting movement takes place just as the number bearing member of the highest denomination crosses the zero point in either direction. In order, therefore, to indicate a correct amount on the number bearing members, it is necessary to supply this additional digit, and mechanism for automatically accomplishing this result when the indicator or shield is shifted will now be described, reference being had now more particularly to Figs. 8 and 13. This additional digit is supplied to the units-number-bearing member 9 and for this purpose one of the gears 155 is arranged on the shaft 8 of the units number bearing member 9 and one of the dogs 162 is pivotally supported adjacent the units number bearing member 9 so that the arm 164 may pass behind the shoulder on the gear 155 and lock the latter in an inoperating position in the same manner as the remaining gears 155. The indicator or shield 197 is provided with notches 205 into which the nose or extremity 206 of a pivotally supported dog 207 projects and this dog 207 is provided with an arm 208 to which is connected one extremity of an elastic member 209. The other extremity of the elastic member is anchored to a fixed support and tends normally to move the extremity 206 of the dog into the notches. The elastic member is of sufficient tension to hold the extremity of the dog seated but will yield when pressure is exerted upon the indicator or slide so as to permit the extremity 206 of the dog to pass out of one of the notches 205 into the other. The dog 162 of the units number bearing member 9 is adapted to be tripped by means of an arm 210 (see Figs. 8, 13 and 14) carried by a rock shaft 211, journaled in suitable supports and which shaft is adapted to be rocked by means of an arm 212 secured thereto with which a cam 213 on the shaft 14 coöperates (see Fig. 13). The cam 213 is loosely mounted on the shaft 14 and is carried by a disk 214 also loosely mounted on the shaft 14. A dog 215 is pivotally supported by the disk and coöperates with a star or toothed wheel 216 carried by the shafts 14. The dog 215 is provided with a shoulder 217 with which a dog 218 coöperates for moving the dog 215 out of engagement with the star or toothed wheel 216. The dog 212 is pivotally mounted to a fixed support preferably loosely upon the rock shaft 211 and an arm 219 is formed integral with the dog 212 and projects for some distance beyond the shaft 211. This arm 219 is provided with an inclined portion 220 and an elastic member 221 is connected to a portion of the arm 219 and to a fixed support and tends normally to move the dog 218 into a position to engage the shoulder 217 of the dog 215 to move the latter out of engagement with the star or toothed wheel 216 and thereby unlock the disk 214 and cam 213 with respect to the shaft 14. A dog 222 coöperates with a notched portion in the periphery of the disk 214 to lock the disk and the cam 213 against overthrow and an elastic member 223 is provided for controlling the dog 222.

A member 224 (see particularly Fig. 8) for a purpose to be hereinafter set forth is slidingly mounted upon a fixed support by means of fastening devices 225 passing through slots 226 in the member, and this member is provided with a projecting portion 227 to which is pivoted intermediate its ends a member 228 (see also Figs. 30 and 32). One extremity of this member 228 projects beyond the arm 208 of the dog 207 and the inclined portion 220 of the arm 219, and an elastic member 229 is connected by one extremity with the member 228 and by its other extremity to the member 224, and tends normally to move the member 228 away from the inclined portion 220 of the arm 219 and toward the arm 208 of the dog 207. This member 228 projects through an elongated opening or slot 230 in the support 3. Thus it will be seen that with the parts in the position shown in Figs. 8, 13 and 30, when the shield or indicator 197 is shifted the dog 207 will be rocked about its point of pivotal support and this will force the arm 208 into engagement with the extremity of the member 228, and the latter will be rocked about its point of pivotal connection with the member 224 and will be forced into engagement with the inclined portion 220 of the arm 219 to rock the latter about the shaft 211 against the tension of the elastic member 221. When the arm 219 is thus rocked, the dog 215, which is integrally connected therewith, will also be rocked to be moved out of engagement with the shoulder 217 on the dog 215 and this will release the latter to lock the disk 214 and the cam 213 for rotation with the shaft 14. As the shaft 14 rotates the cam 213 will engage and elevate the arm 212 to raise the arm 210 so that the dog which controls the gear 155 of the units number bearing member 9 will be tripped to release the gear 155, and thereby permit the latter to move into a position to be engaged by the toothed gear 158 on the shaft 7 which is located beneath the units number bearing member 9 to impart one step of rotation to the units number bearing member, when the machine is set in operation. After the dog 218 has been thus rocked, the nose or extremity of the dog 207 will pass into another of the notches 205 in the indicator or shield 197 (see particularly Fig. 30) which will permit the arm 208 to be moved in a direction away from the inclined portion 220 of the arm 219, to permit the elastic member 229 to act upon the member 228 so that the latter will also move away from the inclined portion to permit the elastic member 221 to move the arm 219 in the opposite direction and to position the dog 218 to trip the dog 215 and thereby release the disk 214 and the cam 213 with respect to the shaft 14.

In order to impart rotation to the number bearing members 9 so that the latter may be actuated to add an additional digit after the gear 155 under the units number bearing member 9 has been adjusted into operating position, the shaft 26 which imparts movement to the shaft 7 must be rotated and therefore in the present exemplification of the invention it is necessary to trip or render active the normally inactive coupling or connection between the running shaft 14 and the shaft 26, which coupling comprises the meshing gears 18, 27, (see particularly Figs. 8 and 12), the disk 19, the dog 24, and the star or toothed wheel 23. This operation might be accomplished by actuating the controlling bar or key 112 after the parts have been adjusted, as just described; but in order to automatically render this coupling or connection active suitable mechanism is provided whereby the dog 24 will be released by the actuation of the shaft 211. For this purpose there is provided on this shaft 211 an arm 231 (see Figs. 8, 10, 12, 15 and 16). This arm 231 is provided with a laterally projecting pin or projection 232 which projects beneath a pin or extension 233 on the shaft 113 so that when the controlling bar or key 112 is actuated to set the mechanism in motion, the pin or projection 232 on the arm 231 will not interfere with the movement of the pin or projection 233, but when the shaft 211 is rocked by the cam 213 (see particularly Figs. 12, 13 and 16), the pin or projection 232 on the arm 231 will engage the projection 233 on the shaft 113 to rock the latter and consequently the dog 30 and thereby release the dog 24 to couple the gear 18 with the shaft 14, without actuating the controlling key or gear 112. This automatic tripping of the dog 30 by the arm 231, will be effected just after the arm 210 on the shaft 211 (see also Figs. 8, 13 and 14) has tripped the dog 162 which controls the gear 155 beneath the units number bearing member 9. After a complete cycle of movement of the parts, the dog 30 will be automatically tripped again to uncouple the gear 18 with respect to the shaft 14 and the shaft 211 with the arm 231 will be returned to their normal positions by the tension of the elastic member 165, which latter returns the dog 162 of the units number bearing member gear 155 and which elastic member acts on the shaft 211 through the medium of the dog 162 and the arm 210. It will thus be seen that when the indicator or shield 197 is shifted in either direction, the units number bearing member 9 will be automatically rotated one step to add the necessary digit thereto and thereby correct or indicate the proper amount on the number bearing members.

In order to avoid damage to the machine, mechanism should be provided for locking the controlling bar or key 112 when the error key 178 is being actuated, and likewise locking the error key when the controlling bar or key 112 is being actuated, and suitable mechanism for accomplishing this will now be described, reference being had more particularly to Figs. 7, 9, 10 and 35. Pivotally supported upon any suitable fixed support and adjacent the yoke-shaped member 185 on the shaft 113 is a dog 234 which is provided with a shouldered extremity 235, adapted to be moved into a position within the path of movement of the body portion of the yoke 185 when the shaft 113 is actuated or rocked by the controlling bar or key 112 to lock the yoke 185 against actuation. When the error key 178 is actuated, the yoke 185 will be operated in the manner already set forth and when thus operated, the yoke 185 will be moved into the path of movement of the shoulder 135 to lock the shaft 113 against rocking movement. In order to accomplish these movements of the dog 234 and the yoke 185 with respect to each other, any suitable connection may be provided between the dog and the shaft 113. A simple and efficient connection comprises a pin or projection 236 carried by the dog 234 which projects into a bifurcated portion 237 of an arm or extension 238 carried by the shaft 113 (see particularly Figs. 7 and 35). When the shaft 113 is rocked by the controlling bar or key 112, the arm or extension 238 will move the dog 234 about its pivot 239 to draw the shoulder 235 into the path of movement of the yoke 185. When the shaft 113 is returned to its normal position the shoulder 235 will be moved out of the path of movement of the yoke 185 and the latter may be then actuated. If, on the other hand, the error key 178 is actuated, the yoke 185 will first be moved about the shaft 113 so that the body portion of the yoke will pass under the shoulder 235 of the dog and thereby lock the shaft 113 against rotation. When the parts are released to assume their normal positions, the yoke 185 will be moved to the position shown in Fig. 35, with respect to the dog 234, by the elastic member 188 as already described (see Fig. 6), so that the dog 234 will be free to move when the arm 238 is moved by the actuation of the shaft 113.

In the present exemplification of the invention the operation of multiplication may be effected by the repeated addition of the amounts to be registered and the operation of division may be effected by the repeated subtraction of the amounts.

As has already been described, when the keys 6 have been actuated to register a specified amount and the machine set into operation by the actuation of the controlling bar or key 112, the shafts which impart a variable movement or rotation to the number bearing members 9 will make one complete revolution and then all of the parts will be automatically released and restored to their normal positions. In order, therefore, to add a similar amount to the number bearing members of the totalizer under these conditions it would be necessary for the operator to again actuate the same keys and repeat this operation until the amount has been registered the desired number of times to complete the multiplication. In order, therefore, to prevent the parts or mechanisms which impart the variable movements to the respective number bearing members 9 from being restored to their normal positions after the amount has once been registered and to maintain these parts in this position to repeatedly add the same amount to the number bearing members, suitable mechanism must be provided for preventing the parts from being shifted or returned to their normal positions after the completion of one cycle of movement of the operating shafts and such mechanism will now be described.

As has already been stated, the arm 153 (see now more particularly Figs. 8, 10 and 11) is mounted for adjustment longitudinally on the shaft 143 and in its operation previously described, it is arranged within the path of movement of the cam 152, which is fastened for rotation with the shaft 26. Upon every revolution of the shaft the cam will engage the arm 153 to rock the shaft 143 and thereby restore all of the keys 6 which have been actuated, to their normal positions in the manner already set forth. In order, therefore, to prevent this cam 152 from engaging the arm 153 during the multiplication operation, the arm 153 is shifted longitudinally on the shaft 143 so that it will assume a position out of the path of movement of the cam 152, and in this position it will be apparent that the shaft 26 may rotate any desired number of times without restoring the keys 6 as long as the arm 153 is maintained in this latter position. In order, therefore, to shift the arm 153 on the shaft 143, the member 224, (see also Fig. 32), which is slidably mounted on its support, is provided with a depending arm or projection 240 which latter is provided with a laterally projecting pin or lug 241 extending into a circumferential groove 242 in a portion of the arm 153. When this member 224, therefore, is adjusted so as to slide in one direction or the other, it will be apparent that the arm 153 and the anti-friction roller 154 will likewise be adjusted longitudinally on the shaft 143 and can, therefore, be moved into or out of the path of movement of the cam 152. This sliding movement of the arm 153 and the slide 224 may be accomplished in any desired or suitable manner, but preferably by means of a key 243, which for the sake of convenience will hereinafter be designated as a "repeat" key (see Fig. 1) indicating that it is to be operated when it is desired to repeat the additions without throwing the mechanisms out of actuation. This repeat key is located in any convenient position for the operator, preferably adjacent the controlling bar or key 112 and is connected in any suitable manner to one end of a lever 244 pivotally mounted as at 245 (see particularly Fig. 10) to any fixed support. This lever is provided with a depending bifurcated portion 246 which latter is adapted to stand astride of a laterally projecting pin 247 (see also Fig. 32) on a depending portion 248 of the slide 224 and an elastic member 249 (see Fig. 10) is provided which is connected to one extremity of the lever and tends normally to move the slide 224 in a direction to shift the anti-friction roller 154 on the arm 153 into the path of movement of the cam 152. It will, therefore, be seen that when the key 243 is actuated or depressed, the lever 244 will be rocked about its point of pivotal support 245 against the tension of the elastic member 249 to swing the bifurcated depending portion 246 in a direction to shift the member 224, and thereby move the arm 153 longitudinally on the shaft 143 out of the path of movement of the cam 152. The arm 153, in the present exemplification of the invention, is held in its adjusted positions either within or out of the path of movement of the cam 152 by means of the elastic member 149 which is connected to the lever 244 in such a manner that when the latter is shifted to the position shown in Fig. 10, its point of connection with the lever 244 will pass above the point of pivotal support 245 or over the center and thus hold the parts in this position. When the lever is rocked in the opposite direction to return the arm 153 so as to be engaged by the cam 152, the point of connection of the elastic member with the lever will pass on the other side of the point of pivotal support 245 to retain the parts in this position. In order to thus shift the lever 244 in the opposite direction to return the arm 153 to a position to be engaged by the cam 152, an additional key 250 (see Figs. 1, 9, 10 and 11) and is arranged preferably adjacent the key 243. This key is provided with a pin or projection 251 adapted to engage the other extremity of the lever 244 on the side of the point of pivotal support 245 opposite to that on which the key 243 is located for rocking the lever in a direction opposite to that in which it was rocked by the key 243.

The anti-friction roll 154 (see particularly Fig. 10) is of such a length that a portion thereof will always stand within the path of movement of the cam 179, which latter is loosely mounted on the shaft 26 so that after the arm 153 has been adjusted by the "repeat" key 243, the mechanism may be set into operation by the actuation of the controlling bar or key 112, the actuation of which will cause the gear 18 to be locked to the shaft 14 and thereby impart motion to the gear 27 on the shaft 26, and consequently the mechanism controlled by this latter gear (see Fig. 12). The shafts 7 may be caused to repeat their rotation any desired number of times at the will of the operator, and may be effected when the parts are adjusted, as just described by a repeated depression or actuation of the controlling bar or key 112 until the amount has been registered the desired number of times. This repeated actuation of the controlling bar or key is necessary owing to the fact that the dog 118 must return to a position above the shoulder 117 on the dog 30 (see Fig. 16) before the latter can be actuated again to trip the dog 24. It will be apparent that it is also necessary to prevent the actuation of the dog 218 (see particularly Figs. 8 and 13) by the shifting of the indicator or shield 197 during the operation of multiplication or the repeated addition of amounts to the number bearing members 9, and inasmuch as the dog 218 will be actuated by the shifting of this indicator or shield by forcing the member 228 (see also Fig. 30) against the inclined portion 220 of the arm 219, it is necessary to withdraw this member 228 to a position where it will not be engaged by the arm 208 of the dog 207, which engagement would force it into engagement with the inclined portion 220 of the arm 219. For this reason, therefore, this member 228 is supported by the member 224 so that when the latter is shifted by the "repeat" key 243, to shift the arm 153 out of the path of movement of the cam 152, the member 228 will be withdrawn to a position so that it will not be forced into engagement with the inclined portion 220 of the arm 219 when the indicator or shield 197 is shifted during the operation of multiplication. After this operation has been completed, the mechanisms are returned to their normal positions, and this may be effected by the actuation of the "repeat release" key 250 (see Fig. 1) which shifts the lever 244 and the member 224 in the manner already set forth. The operation of this key will set some of the parts so that they may be returned to their normal positions, but the keys of the series 6, which have been actuated, will not be returned to their normal positions, and, therefore, it is necessary that motion be imparted to the shaft 113. If this motion should at this time be imparted to the shaft 113 by the actuation of the controlling bar or key 112, the number bearing members 9 would be actuated and the amounts indicated by the actuated keys 6 would be again registered. In order, therefore, to return the keys 6 without actuating the number bearing members 9, the shaft 113 may be set in motion when the "repeat release" key 250 is actuated, by actuating the coupling or connection between the running shaft 14 and the cap 179 (see particularly Figs. 8, 10 and 11) and preferably comprises an arm or projection 252 on the dog 186 which extends toward the stem of the key 250 and this arm or projection 252 is itself provided with a laterally projecting pin 253 (see also Figs. 7 and 8) which extends beneath the extremity of the stem of the key 250 so that when the key 250 is actuated the extremity of its stem engaging the projecting pin 253 on the arm 252 connected with the dog 186, will actuate the latter to release the dog 183 thereby coupling the gear 181 with the shaft 14 and when thus coupled the gear 180 which is connected for rotation with the cam 179 will impart the desired motion to the latter to rock the shaft 143. This rocking movement of the shaft 143 will raise the arm 145 and cause the latter to rock the arm 146 which in turn will rock the shaft 92 to move the member 90 into engagement with the projections 93 on the slides 78 to shift the latter and thereby release the keys 6 in the manner as has already been fully explained. The controlling bar or key 112 will be held in its elevated position by the elastic member or spring 128 (see particularly Figs. 12 and 16). Mechanism is also provided whereby a record may be obtained of the amounts registered on the number bearing members 9 and this recording mechanism consists primarily of a paper or record sheet support which is adapted to be intermittently advanced and to be returned to its normal position and printing mechanism whereby the amounts may be printed upon the sheets. This printing mechanism is adapted to be operated in unison with the registering mechanism and is also adapted to be operated independently with respect to the number bearing members 9 of the registering mechanism. Suitable mechanism whereby these operations may be performed will now be described.

Arranged adjacent the rear of the machine and mounted to move in suitable guide ways 253 (reference being had now more particularly to Figs. 2, 40, 47 and 50) is a carriage or support designated by the reference numeral 254 and upon which carriage is mounted a platen 255 which serves as a support for the record sheets. This carriage or support is preferably arranged in a plane above the number bearing members 9 so that the record sheets are always visible. The carriage or support is provided with the usual rack teeth 256 and the platen is provided with the usual handle or knob 257 by means of which it may be readily rotated. Mounted upon any suitable fixed support, preferably a portion of the frame work of the machine, is a spring drum 258 of any ordinary and well known construction (see now more particularly Figs. 50, 51 and 52), around the periphery of which drum a flexible member 259 is adapted to be wound. The free end of the flexible member is connected in any suitable manner as at 260 with the carriage or support 254 and the drum is so arranged with relation to the movement of the carriage that it tends normally to advance the carriage in the usual manner. After the carriage has been thus advanced, and it has reached the limit of its advancing movement it may be returned to its original or starting position in the manner which will be presently described. Meshing with the rack 256 of the carriage or support 254 is a gear 261 which latter is secured for rotation on upright shaft 262 and to this shaft is connected a bevel gear 263 (see more particularly Figs. 2, 39, 40 and 47). The gear 263 meshes with a gear 264 secured to and for rotation with a horizontal shaft 265. This shaft 265 is journaled in suitable bearings or supports 266, and connected to the shaft, preferably to one end thereof, is a gear 267. Another shaft 268 is mounted in suitable bearings and is arranged transversely with respect to the shaft 265. This shaft 268 is provided with a gear 269 which meshes with the gear 267 on the shaft 265. It will thus be manifest that when the spring of the drum 258 exerts its tension upon the carriage 255, the shafts 262, 265 and 268 will be rotated through the medium of the rack 256 and the gear 261. In order, therefore, to hold the carriage against the tension of this elastic member by holding the shaft 268 against rotation, suitable mechanism is provided which is adapted to be actuated to intermittently release the shaft 268 and thereby permit the carriage or record sheet support to advance one step under the tension of the elastic member. A simple and efficient means for accomplishing this result will now be described, reference being now had more particularly to Figs. 2, 38 and 39. Mounted loosely upon the shaft 268 is a disk 269 and also a disk 270. These two disks are connected for rotation together and one of the disks, preferably the disk 269, is provided with a plurality of laterally projecting pins or lugs 271. A spring controlled dog 272 is pivotally mounted as at 273 and coöperates with the lugs or projections 271 to arrest the movement of the disks 269, 270. Another disk 274 is secured to the shaft 268 for rotation therewith and pivotally mounted upon this disk 274 is a yielding dog 275, the spring 276 of which tends normally to move the extremity of the dog 275 into a position to engage one of the shoulders of the disk 270. An additional yielding dog 277 is provided which coöperates with the notched disk 270 to hold the latter against rotation.

Pivotally mounted upon any fixed support 278 is a rocking member designated generally by the reference numeral 279. This member is provided with an enlarged portion 280, the periphery of which is provided with a notch or recess 281 adapted to receive the pins or projections 271 of the disk 269. This member 279 is adapted to engage a stop 282 to limit its movement in one direction under the influence of the elastic member 283 and so as to position the portion 284 of the member within the path of movement of the pins or projections 271 and thereby arrest the movement of the disks 269, 270 and inasmuch as these disks 269, 270, are connected with the shaft 268 through the medium of the dog 275 and disk 274, it will be apparent that the shaft 268 will be held against rotation under the tension of the spring drum 258.

In order to release the shaft 268 to permit the record sheet support 255 to be spaced one step under the tension of the spring drum, it is necessary to rock the member 279 about its point of pivotal support to position the recess 281 to receive one of the pins or projections 271. When thus positioned the pin or projection will enter the recess and the tension of the spring drum will rock the member 279 to cause it to engage the stop 282 and move the portion 284 of the member into the path of the advancing movement of the next adjacent pin 271. At the same time the recess 281 will be in a position to permit the pin or projection resting therein to pass out of the recess. The dog 272 is provided for holding the disk 269 against retrograde movement.

The rocking movement of the member 279 may be accomplished either manually or automatically and the means whereby it may be accomplished manually will now be described, (reference being had more particularly to Figs. 1, 38 and 39). A key 285 is provided and arranged in a convenient position for the operator. The stem 286 of this key projects through the top of the casing of the machine and is also provided with a lateral projecting portion 287. This lateral projecting portion is located in close proximity to the member 279 and extends over a pin or projection 288 on the member and in such a position that when the key 285 is actuated or depressed against the tension of the elastic member 289 the laterally projecting portion 287 will engage the pin 288 and rock the member 279 against the tension of the elastic member 283, to position the recess 281 to receive one of the pins or projections 271. When the key 285 is released, it will be returned to its normal position and the member 279 will be rocked in the manner already set forth to permit the paper or record leaf support to escape or advance one step. This escapement or advancing movement of the paper or record sheet support may be accomplished automatically in the following manner. Mounted upon one of the shafts 7 for rotation therewith and for longitudinal adjustment thereon is a cam 290 (see particularly Figs. 2 and 38) and which cam is adapted to be shifted on the shaft to a position to engage a lug or projection 291 on the member 279, and also into a position where it will not engage the lug or projection. When adjusted into a position where it will engage the lug or projection 291, it will be apparent that when the shaft 7 is rotated in the direction indicated by the arrow in Fig. 38, the member 279 will be rocked in the manner just described, and against the tension of the elastic member 283 to permit the record sheet support to escape one step. This automatic escapement will be effected each time the shaft 7 is rotated, when the cam 290 is adjusted into an operating position. Any suitable means may be provided for shifting the cam 290 longitudinally on the shaft and for this purpose a key 292 is provided which is arranged in a convenient position for the operator and the stem 293 thereof is connected with the crank arm 294 on a rock shaft 295, which latter is preferably journaled in bearings mounted upon the base of the machine, and extends transversely with respect to the shaft 268 and beneath the same. An arm 296 is connected with the shaft 295 (see also Fig. 2) and is provided with a lateral projecting lug 297 which extends into a peripheral groove 298 in the hub of the cam 290. It will therefore be manifest that when the key 292 is depressed or actuated, the cam 290 will be shifted longitudinally on the shaft into position with respect to the projecting lug 291 on the member 279. The shaft 295 may be rocked in the opposite direction to return the key 292 and shift the cam 290 into a position where it will not engage the projection 291 in a manner as will be presently set forth.

In order to maintain the shaft 295 as well as the cam 290 in their adjusted positions, any suitable mechanism may be provided such as a notched member 299 which is secured to the shaft 295 and with which a spring controlled dog 300 coöperates. The tension of the dog 300 is such that it will hold the parts in their adjusted positions under ordinary conditions but when power is applied to the shaft 295 it will yield to permit the shaft to be adjusted. Mechanism is also provided for automatically spacing the record sheets by imparting one step of rotation to the platen of the support. This automatic spacing of the record sheets should be effected just after the completion of the printing or recording operation and at the completion of the revolution of the shafts 7 and for this purpose there is provided on one of the shafts 7 a one-toothed gear 301 (see particularly Figs. 38 and 39) which is adapted to coöperate with a gear 302 mounted upon and to rotate with a shaft 303 which latter is journaled in suitable bearings and is arranged below the respective shafts 7. This shaft 303 is arranged parallel with the shaft 268 and has secured thereto for rotation therewith a gear 304 which meshes with a gear 305 on a shaft 306 which latter is preferably journaled in the bearings 266 adjacent and parallel with the shaft 265. The gear 302 is secured to the shaft 303 for longitudinal adjustment thereon and for adjustment laterally with respect to the one-toothed gear 301 so that the gear 302 may be moved into a position to mesh with the gear 301 or into a position where it will not mesh with a gear 301. This adjustment of the gear 302 may be accomplished in any suitable manner, but preferably by means of an arm 307 which is connected with the shaft 295. The arm is provided with a lateral projection 308 which extends into a circumferential groove 309 in the hub of the gear 302. A key 309 is arranged in a convenient position for the operator and the stem 310 of this key is connected with an arm 311 on the shaft 295, (see particularly Fig. 39). This arm 311 is disposed in a direction opposite to the arm 294 which is controlled by the key 292 and the gear 303 is disposed in such a position with respect to the cam 290 that when the key 292 is actuated to shift the cam 290 into a position where it will engage the projection 291 on the member 279 (see also Fig. 38), the gear 302 will be shifted into a position that it will not be engaged by the one-toothed gear 301, and when the key 309 is actuated to rock the shaft 295 in the opposite direction, the cam 290 will be shifted into a position where it will not engage the projection 291 on the member 279 while the gear 302 will be shifted into a position where it will mesh with the one-toothed gear 301. The operation of the key 309 to effect this adjustment of the cam 290 and the gear 302 will return the key 292. Likewise the operation of the key 292 will return the key 309. These keys 292, 309, are preferably arranged on opposite sides of the machine as shown. It will therefore be manifest that when the mechanism is set to automatically advance the paper or record sheet support, the automatic spacing mechanism of the record sheets will be rendered inactive and this spacing must then be effected in a different manner, which will presently be described, and it will also be manifest that when the mechanism is set to automatically space the record sheets, the mechanism for automatically advancing the record sheet support will be rendered inactive and the support must then be spaced manually in the manner as already described by the actuation of the key 285.

The automatic spacing of the record sheets will be effected from the shaft 303 when the latter is given rotation in the manner already set forth through the shaft 306 to which is secured a gear 312 which meshes with a gear 313 (see also Figs. 2 and 40) secured to and for rotation with an upright shaft 314 which latter is journaled in suitable bearings. This shaft 314 extends preferably for some distance above the guide ways 253 of the record sheet support and secured to the shaft, preferably its upper end, is a gear 315 which meshes with a gear 316 secured to and for rotation with a shaft 317 and which shaft is journaled in suitable bearings 318. Connected with the gear 316 and for rotation therewith is a gear 319 which latter meshes with a gear 320 mounted upon and for rotation with a shaft 321. This gear 320 is also connected with the shaft 321 in such a manner that the shaft may be shifted longitudinally with respect to the gear and the gear is held against lateral adjustment so that it will remain in mesh with the fixed gear 319 in any desired or suitable manner, preferably by means of spaced arms 322 arranged on opposite sides of the gear. The shaft 321 is connected with the record sheet support for longitudinal movement therewith and as the support is advanced or retracted, the shaft 321 will slide through the gear 320. It will be manifest that when the shaft 314 is rotated, the shaft 321 will be correspondingly rotated through the medium of the inter-meshing gears and in order to impart the rotary motion of the shaft 321 to the record sheet support, there is provided on the shaft 321 a gear 322 (see also Fig. 1) which meshes with a gear 323 secured for rotation with the platen of the record sheet support. It will therefore be manifest that the platen may be spaced by the operation of the shaft 314 as well as by means of the knob or handle 257 which is connected with the platen.

When the mechanism for automatically advancing the record sheet support is rendered active and the mechanism for automatically spacing the record sheets is rendered inactive, mechanism should be provided whereby the record sheets may be spaced, and when the record sheet support is returned to its original starting position, preferably just at the time when it reaches this position. Suitable mechanism for accomplishing this will now be described. As has already been stated the spacing or rotary movement of the platen of the record sheet support is accomplished through the actuation of the shaft 314 and in order that this shaft may be employed for the spacing of the record sheets just as the support is returned to its original or starting position, there is provided on this shaft a ratchet gear 324, reference being had now more particularly to Figs. 2, 40 and 47. A spring controlled dog or pawl 325 is mounted upon a member 326, which latter is pivotally supported as at 327 by means of a fixed support 328. The dog 325 normally engages one of the teeth of the ratchet 324 and a stop 329 is provided for limiting the movement of the member 326 in both directions. The support or carriage 254 of the record sheet support is provided with an arm or extension 330 so arranged in the present exemplification of the invention that just as the record sheet support reaches its initial or starting position, the arm will engage the face 331 of the support 326 and rock the latter against the tension of the elastic member 332 to move the dog 325 in a direction to impart one step of rotation to the ratchet wheel 324 and a similar movement to the shaft 314. As the record sheet support advances from its original or starting position the arm 330 will move out of engagement with the face 331 of the member 326 to permit the latter to move under the tension of the elastic member 332 into a position that the dog 325 will engage the next notch of the ratchet wheel 324 to impart another step of rotation to the ratchet wheel 324 and shaft 314 when the record sheet support is again returned to its original or starting position. The ratchet wheel 324 and the dog 325 are so arranged that the rotation of the shaft 314 by means of the shaft 303 will not be interfered with when operated by the shaft 303.

In order to obtain a record upon the record sheets, recording mechanism which consists primarily of a series of printing elements 333 is provided (see particularly Figs. 2, 41, and 44). These printing elements are arranged preferably in advance of the platen and one is provided for each of the keys of the series 6. These printing elements comprise a segmental-shaped member, each of which is pivotally mounted as at 334 upon an arm 335 and these arms are in turn pivotally mounted upon a support 336 which latter extends transversely with respect to the elements 333 and the arms are adapted to be rocked about their points of pivotal support 336 to move the printing elements toward or away from the platen 256. The printing elements are each provided with a face 337 upon which are arranged printing characters 338 and elastic members 339 are provided, one end of each of which is connected with one of the arms or supports 335 and the other ends are anchored to any suitable fixed support and are so arranged that the normal tendency of the elastic members is to move the printing elements away from the platen.

A member 340 is provided for each of the printing elements 333 and is mounted for sliding movement transversely with respect to the pivots 334 of the members in any suitable manner, preferably by means of bolts or fastening devices 341 passing through elongated slots 342 in the member. As the controlling mechanism for each of these members 340 is the same the specific description of one will apply equally as well to them all. The member is provided with a laterally projecting portion 343 which has a pin and slot connection 344, 345, with the extremity 346 of the printing element and which extremity projects beyond the pivot 334. An elastic member 347 is connected by one extremity to the member 340 and is anchored by its other extremity to a fixed support, and tends normally to move the member 340 in a direction to rock the printing element 333 about its pivot so as to position one of the printing characters 338 in a printing position with respect to the record sheet.

The degree of movement of the printing element 333 and consequently the positioning of the characters 338 is controlled by the degree of movement of the member 340 and inasmuch as it is desirable to print or record the same character upon the record sheets which is indicated by the degree of movement of the respective number bearing members 9, suitable mechanism is provided whereby the degree of movement of the member 340 will be controlled automatically by the actuation of the respective keys of the series 6. A simple and efficient means for accomplishing this result will now be described, reference being had more particularly to Fig. 3. A member 346 is mounted for sliding movement in suitable bearings and is provided with an enlarged portion 347 arranged adjacent the extremity 348 of the member 340 and this enlarged portion 347 is provided with a plurality of stepped portions 349, 350, adapted to be moved beneath the extremity 348 of the member 340. This member 346 preferably projects toward and terminates adjacent the forward portion of the machine and connected to the forward end of this member is one extremity of an arm 351 which latter is pivoted intermediate its ends as at 352 to a fixed support. The other extremity of the arm is pivotally connected to the respective slides 78, preferably to the projecting portion 95. In order to permit of the proper movements of these parts, the connections between the arm 351 and the member 346 and slide 78 are preferably in the form of pin and slot connections (see also Fig. 7). In order to arrange the printing elements 333 compactly while at the same time connect the members 346 with the respective selecting members or slides 78, the portions of the arms 351 which are connected with the members 346 are offset or deflected toward the center of the machine, as shown more clearly in Fig. 7.

As has already been stated the degree of movement of the selecting members or slides 78 is controlled by the keys 6 and as the characters 338 are arranged upon the face 337 of the printing element 333 to correspond with the respective keys 6, it will be manifest that the printing element 333 would be so adjusted by the actuation of the slide or member 78 that when the gear 35 is in a position to mesh with the respective gears 34, the character of the printing element 333, corresponding with the key which is actuated, would be positioned with respect to the record sheet so as to be imprinted thereon. This adjustment is accomplished by means of the stepped portions 349 of the member 346. One of the portions 349 is provided for each of the keys 6 so that when the respective keys are actuated the member 346 will be adjusted, and the corresponding stepped portion 349 will be positioned beneath the extremity 348 of the member 340 and when the latter is released in a manner which will be hereinafter described, the elastic member 347 will actuate it and thereby adjust the printing element 333. The movement of the member 340 will be arrested by the stepped or shouldered portion 349 which is arranged within the path of movement of the extremity 348 and when this extremity engages the shoulder portion the printing element will be properly positioned. If no key of one of the series is actuated, the shoulder 350 of the member 346, which is normally within the path of movement of the extremity 348 of the member 340, will remain in this position and when this extremity engages the shoulder 350 the movement of the member 340 will be arrested. This shoulder is so arranged that the zero character will be presented in a printing position. The member 346, after the printing operation has been completed, is returned to its normal position by the movement of the slide or member 78 under the influence of the elastic member 94 as described. After the printing elements have been adjusted about their pivots 334, it is necessary to impart a bodily movement thereto so as to move the character which is in a printing position to effect the printing operation. This may be accomplished in any suitable manner but preferably by what might be termed a hammer 352 preferably in the form of a lever pivoted intermediate its ends as at 353, the head 354 of which is adapted to strike the face 355 of the extremity 346 of the member 333, when the hammer is released. In order to effect this striking action an elastic member 356 is provided, one extremity of which is connected with the hammer and the other extremity is anchored to a fixed support. When the hammer is in an inoperating position the elastic member 356 is held under tension but when the hammer is released the tension of the elastic member will move the latter about its point of pivotal support to throw the head 354 into engagement with the face 355 of the printing element. When thus struck, the printing element will be bodily moved into engagement with the record sheet, and this bodily movement is effected by the movement of the supporting arm 335 about its pivot 336. In order to permit this bodily movement of the printing element the latter is adapted to move independently with respect to the member 340 and this independent movement is permitted by means of the pin and slot connection 344, 345. When the hammer is moved into an inoperating position, the printing element will drop or move into such a position that none of the characters will be in a printing position.

In order to move and retain the hammer 352 in an inoperating position, there is provided a shaft 357 (see also Figs. 39, 45 and 46) which is mounted in any suitable fixed support and extends in a direction parallel with the axis of the pivots of the hammers. This shaft 357 is provided preferably with a pair of cams 358 adapted to engage and rock a member designated generally by the reference numeral 359 in Fig. 45 and which member is preferably in the form of a yoke, the sides of which are shaped to form arms 360, 361. If desired, anti-friction rollers 362 may be provided with which the cams engage. This shaft 357 is adapted to be rorated preferably from one of the shafts 7 (see Fig. 39) and upon which shaft is provided a gear 363 which meshes with a gear 364 on the shaft 357, thereby imparting to the shaft 357 one complete revolution upon every revolution of the respective shaft 7. The arms 360, 361 are preferably and respectively connected by means of cross bars or rods 365, 366, and the connecting bar or rod 366 of the arms 361 coöperate with shoulders 367 on the members 340 so as to engage these shoulders to return the members 340 against the tension of the elastic member 347 when the member 359 is rocked about its point of pivotal support 368 by the cams 358. The other bar or rod 365 is adapted to engage the extensions 369 of the hammers 352 to move the latter to their inoperating positions against the tension of the elastic members 356 and into the position shown in Fig. 41.

When the hammers 352 have been returned to the position shown in Fig. 41 it is necessary to maintain them in this position against the tension of the elastic members 356 and in order to accomplish this result, locking means must be provided. In the present exemplification of this invention, this locking means comprises a pivotally supported member preferably comprising a portion 370 having arms 371 pivotally supported as at 372 and is arranged in such a position that it may be moved into the path of movement of the extension 369 of the hammer 352 and out of the path of such movement. When this member extends within the path of movement of the extension 369 of the hammer, the latter will be locked against actuation but when moved out of the path of movement of such extension the elastic member 356 will actuate the hammer in the manner already described. The member 370 is preferably rocked in one direction about its point of pivotal support 372 by means of a cam 373 on the shaft 357 which engages an anti-friction roller 374 on an arm 375. This arm 375 is connected to the member 370 in any suitable manner but preferably to a cross bar 376 between the arms 371. This cam is provided for moving the member 370 out of the path of movement of the extensions 369 of the hammers and an elastic member 377 is provided for moving the member 370 into the path of movement of the extensions 369. The cam 373 is so arranged with respect to the cams 358 that by the time the latter have moved the hammers 352 into their inoperating positions and the members 340 back to their normal positions, the tension of the elastic member will be exerted upon the arm 375 to cause the extremity of the latter to follow the low portion of the cam 373 and to move the member 370 into the path of movement of the extensions 369.

Inasmuch as the member 370 extends within the path of movement of all of the extensions 369 of the hammers 352 it will be apparent that when moved out of engagement with these extensions all of the hammers would be operated by the respective elastic members 356. It sometimes happens that all of the series of keys 6 are not employed and it is therefore advisable that the movement of the hammers 352 corresponding to the series in which no key has been actuated should be arrested before it strikes the face 355 of the respective printing element 323. This may be automatically accomplished in any suitable manner, such as by means of a member 379 which is pivotally supported intermediate its ends as at 380. This member 379 is provided with a shouldered portion 381 adapted to coöperate with a shoulder 382 on the member 340. An elastic member 382 tends normally to move the shoulder 381 of the member 379 in a direction to engage the shoulder 382 of the member 340 but the shoulder 381 is held out of engagement with the shoulder 382 and against the tension of the elastic member 383 by means of the portion 384 of the hammer which engages the extremity 385 of the member 379 when the hammer is rocked about its point of pivotal support 353 by the arm 360 as has already been described. The extremity 385 of the member 379 is also provided with a shoulder 386 adapted to coöperate with a shoulder 387 on the hammer 352. When the parts are in the position shown in Fig. 41, and after the completion of the revolution of the shaft 357, the low portion of the cams 358 will be in such positions as to permit the arms 360, 361 to move the bars or rods 360, 366 respectively away from the extensions 369 of the hammers and the shoulder 367 of the members 340. It has already been described how the adjustment of the members 346 will permit the members 340 to move under the influence of the elastic members 347. When the member 340 moves under the influence of the elastic member 347 the shoulder 382 will be lowered with respect to the shoulder 381 of the member 379 and will cause the face or portion 388 of the member 340 to move into such a position with respect to the shouldered extremity 381 of the member 379 as to prevent the latter from rocking about its point of pivotal support when the hammer 352 is moved by the elastic member 356 and this hammer will therefore be freed when the member 370 is moved as described. In the event that the movement of the member 340 under the tension of the elastic member 347 is prevented by means of the shoulder 350 on the member 346 being positioned under the extremity 348, it will be apparent that the hammer 352 will nevertheless be released when the member 370 is moved and the hammers thus released would all strike the respective printing elements 333. In order therefore to prevent this, the member 379 is provided and when the member 370 releases the hammer, it will move under the influence of the elastic member 356, and at the same time the member 379 will be moved about its point of pivotal support 373 causing the extremity 385 to follow the portion 384 of the hammer and to move the shoulder 386 into engagement with the shoulder 387 on the hammer which will lock the latter against movement and will arrest its movement before it strikes the printing element 333. This movement of the member 379 will also cause the shoulder 381 to pass beneath the shoulder 382 on the member 340 and will likewise lock the latter against movement.

After the printing operation and when the hammers 352 are returned to their initial position in the manner already described, that is, by means of the arms 360, the portion 384 of the hammer engaging the extremity 385 of the member 379 will rock the latter about its point of pivotal support to move the shoulder 381 out of engagement with the shoulder 382 and thereby release the member 340. Inasmuch as the zero characters normally assume printing positions, and in order to permit the zeros on the right of the amount to be recorded, it is necessary to prevent the actuation of the respective members 379 from locking the respective hammers 352 against actuation. In order, therefore, to accomplish this so that the zeros on the right may be printed, each of the members 379 is provided with a laterally projecting lip or extension 389 (see particularly Figs. 42 and 43) and these extensions project to the left of the members and over a laterally projecting lug 90 of the next adjacent member 379 and which lugs project from the side of the member opposite to the side beyond which the extensions 389 project. Thus it will be manifest that, assuming for instance it is desired to record the amount 53,000, the "5" key in the series representing tens-thousands and the "3" key in the series representing thousands will be actuated while no key will be actuated in the series representing units, tens and hundreds. Unless the hammers 352 are released and permitted to strike the respective printing elements 333 in these last three mentioned columns, no amount will be recorded but by the provision of the lips or extensions 389 and the extensions 390, the hammers on the right will be held released by means of the extension 390 engaging the projection 389 on the next adjacent member at the right which will hold the respective members 379 against movement under the tension of the elastic spring members 383 and also the shoulders 386 on the respective members 379 against movement into engagement with the shoulders 387 on the respective hammers 352.

An impression is obtained from the printing characters 338 by means of a ribbon 391 which is arranged between the platen and the printing characters and is supported by a frame or support designated generally by the reference numeral 392 in Fig. 37 and which frame or support is provided with guides 393 within which the ribbon travels. Arranged preferably on opposite sides of the machine are spools 394, 395, (see particularly Figs. 1 and 38) upon which the ribbon is wound and motion is imparted to the spools for intermittently winding the ribbon from one spool to another and for re-winding the ribbon upon the other spool, which mechanism will now be described. Connected respectively with the spools 394, 395, are upright shafts 396, 397, which are journaled in suitable supports and secured respectively to these shafts for rotation therewith are gears 398, 399, (see particularly Figs. 2 and 38). Mounted in suitable bearings is a shaft 400 and extends transversely with respect to the shafts 396, 397, and mounted upon this shaft 400 are gears 401, 402, which are adapted to respectively mesh with the gears 398, 399. The shaft 400 is of a length less than the distance between the gears 398, 399, and the shaft is adapted to be shifted longitudinally in its bearings so that when one of the gears 401, 402, is in mesh with the respective gears 398, 399, the other gears will be out of mesh. This shaft 400 is adapted to be intermittently rotated in any suitable manner but preferably by means of a ratchet gear 403 which is connected to the shaft 400 for rotation therewith and so that the shaft may be adjusted longitudinally with respect to the ratchet, (see also Fig. 53). A yielding dog or pawl 404 is mounted upon a pivoted support 405 which latter moves about the pivot 406 to cause the dog 404 to space the ratchet wheel 403 one step and consequently impart a similar rotation to the shaft 404, which motion will be imparted to one or the other of the spools 394, 395, according to which one is connected with the shaft 400 for rotation thereby. The support 405 is rocked about its pivot 406 by means of a cam 407 which is secured to the shaft 357 for rotation therewith and this cam 407 engages an arm or extension 408 of the member 405. Thus it will be apparent that upon each complete revolution of the shaft 357, the ratchet wheel 403 will be moved in the manner just described. A retaining dog 409 is provided which coöperates with a ratchet 403 to lock the latter against retrograde movement. The shaft 400 is adapted to be automatically shifted longitudinally in its bearings by means of the variation in the diameter of the spools 394, 395, caused by the winding of the ribbon upon the respective spools, and in order to accomplish this result there is provided oppositely disposed clutch elements 410, 411, which are fixed upon the shaft 400. Slidable clutch elements 412, 413, are also provided on the shaft 400 and coöperate respectively with the clutch elements 410, 411, and elastic members 414 are provided between the respective clutch elements which tend normally to hold the elements separated, as shown more clearly in Fig. 46. The clutch element 412 is provided with a cam face 415 and the clutch element 413 is provided with a cam face 416 for a purpose to be set forth. A pair of upright shafts 417, 418, is provided, one adjacent each of the spools 394, 395, and connected with these shafts 417, 418, are arms 419, 420, which respectively coöperate with the spools 394, 395. Secured to the lower extremity of the shaft 417 is a crank arm 421 provided with a pin or projection 422 which coöperates with the clutch element 412 and the cam face 415 thereon. A similar crank arm 423 is provided on the shaft 418 and is provided with a pin or projection 424 which coöperates with the clutch element 414 and the cam face 416 thereon.

Assuming the parts to be in the position shown in Fig. 38 which is the position they will assume when all of the ribbon has been wound on the spool 395, the operation of the winding or feeding of the ribbon to the spool 394 will be as follows: As the diameter of the spool 394 increases by the ribbon being wound thereon, the arm 419 will be moved to rock the shaft 417 and during this movement of the shaft 417 the pin 422 on the crank arm 421 will shift the clutch element 412 on the shaft 400 toward the clutch element 410, and against the tension of the elastic member 414. By the time the clutch elements are brought into engagement, the cam face 415 on the element 412 will start to rotate with the shaft 400 and a further rotation of the clutch element 412 when locked with the clutch element 410 will cause the cam face 415 to ride over the pin 412 and thereby shift the shaft 400 longitudinally so as to move the gear 401 out of mesh with the gear 398 and the gear 402 into mesh with the gear 399. This longitudinal movement of the shaft 400 will move the clutch element 410 away from the clutch element 412 and the elastic member 414 will also tend to move the clutch element 412 away from the clutch element 410 to separate the two. This longitudinal movement of the shaft 400 will cause it to slide through the ratchet 403. After all of the ribbon has been wound upon the spool 395, the operation will be reversed, that is, the arm 420 will rock the shaft 418 to cause the clutch elements 411, 413, to operate in a similar manner to shift the shaft 400 so that the gear 401 will mesh with the gear 398. The parts are shown in Fig. 38 in the position they will assume just after the shaft 400 has been shifted by the ribbon on the spool 395.

In order to maintain the shaft 400 in either of its adjusted positions, a disk 425 having a double beveled face is provided which is secured to the shaft and a spring controlled dog 426 coöperates with the disk and engages one of the beveled faces when the gears 401, 398, are in mesh and engages the other face when the gears 402, 399, are in mesh. The tension of the elastic member 429 which controls the dog 426 is such that normally it will hold the dog against yielding movement with respect to the disk 425 but when pressure is brought to bear upon the disk 425 by shifting the shaft 400 longitudinally, it will yield to permit the shaft to be shifted. Thus it will be seen that the ribbon will automatically feed from one spool to the other and after it has been completely wound upon one spool, the feeding mechanism will be reversed and automatically, and the ribbon will then be wound from the full spool to the empty one. This ribbon is of the multi-color type and is adapted to be shifted automatically to change from one color to the other so that the characters may be printed upon the record sheets in the color according to the nature of the amount recorded, and also corresponding to the series of figures on the number bearing members 9 in which the amount is indicated. The ribbon frame or support 392 is mounted for sliding movement upon any fixed support, preferably by means of pin and slot connection 428, 429, with the support 430.

A simple and efficient means for shifting the frame or support and consequently the ribbon will now be described, reference being had more particularly to Figs. 2, 8, 12, 37, 41 and 55. Mounted for free movement upon a suitable support is a slide 431 which is provided with a reduced extremity 432. This slide is so arranged that it may be projected within the path of movement of a shoulder 433 on the ribbon frame or support 392, and elastic members 434 are provided which tend normally to move the shoulder 433 into engagement with the slide. When the reduced portion 432 of the slide is arranged to be engaged by the shoulder 433, the ribbon will be shifted to a position that the red portion thereof will be in a position to be engaged by the printing surfaces of the printing elements 333 but when the portion 435 is moved into a position to be engaged by the shoulder 433 on the ribbon frame or support, the black portion of the ribbon will be in position to produce a record. The movement of the slide 431, in the present exemplification of this invention, is controlled by the shifting movement of the lever 49 (see Fig. 5) when the sleeve or clutch 42 is shifted for causing the number bearing members 9 to rotate in one direction or the other, through the medium of a pivotally supported arm or lever 435 which is connected by one extremity as at 436 (see Fig. 44) to the slide 431 and by its other extremity to the slide 58 (see Fig. 5) so that when the lever 49 is rocked in one direction or the other, the slide 431 will be correspondingly moved. When the lever 49 is adjusted into the position to cause the amount to be registered (say, for instance, in black) on the number bearing members 9, the slide 431 will be adjusted to a position that the portion 435 thereof will be arranged within the path of movement of the shoulder 433 on the ribbon supporting frame 392 and when the lever 49 is adjusted so that the number bearing members will rotate in a direction to register in red, the reduced portion 432 will be positioned to be engaged by the shoulder 433 on the ribbon supporting frame.

After the amounts have been recorded in red, the ribbon supporting frame 392 is shifted in the opposite direction against the tension of the elastic members 434, to move the black portion of the ribbon in a printing position, in any suitable manner, preferably by means of an arm or extension 437 (see Figs. 2, 37 and 41) which is connected with the member 359 and engages a portion 438 to move the ribbon frame or support in this direction, when the member 359 is rocked by the cams 358 on the shaft 357.

It is sometimes desirable to record an amount upon the record sheets in a color opposite to the color in which the amount is indicated on the number bearing members 9; say, for instance, that the amounts being registered on the number bearing members are registered in the black series. Under ordinary conditions the slide 431 would be positioned to record in black, in the manner already described. In order, therefore, to permit the ribbon 391 to be shifted to position the red portion thereof in a printing position without shifting the sleeve or clutch 42 (Fig. 3) the portion 435 of the slide 431 with which the shoulder 433 engages is formed on a supplemental slide 439 mounted for movement with and independently with respect to the slide 431. An elastic member 440 is provided which tends normally to hold the portion 435 into the path of movement of the shoulder 433 and under ordinary conditions when the slide 431 is shifted to permit the red portion of the ribbon to move to a printing position, this portion 435 of the supplemental slide 439 will move with the slide 431. The slide 431, however, is shifted only when the clutch element 432 is shifted by the operation of the lever 49 (see Fig. 55). Therefore in order to shift this portion 435 independently with respect to the slide 431 an additional key 441 (see also Figs. 1, 44, 45 and 46) is provided, the stem 442 of which is provided with an inclined or beveled face 443 adapted to engage a lug or projection 444 on the supplemental slide 439 and move the latter independently with respect to the slide 431, against the tension of the elastic member 440 when the key 441 is actuated. When the key 441 is released, it will be returned to its normal position by means of the elastic member 445 and the supplemental slide 439 will also be released so as to be actuated by the spring 440.

After the record sheet support or carriage 254 has reached the limit of its advancing movement, it may be returned to its original or starting position either manually by shifting the support to its starting position with the hand or it may be returned automatically, and suitable mechanism for automatically returning the same will now be described, reference being had more particularly to Figs. 2, 38, 39, 40, 47 and 48. Secured to the shaft 262 for rotation therewith is a gear 447 which has connection through the medium of a train of gears 448 with a gear 449 mounted loosely on an upright shaft 450. Secured to the shaft 450 and for rotation therewith is a gear 451 and this latter gear is preferably spaced above the gear 449. The gear 451 meshes with a gear 452 secured for rotation with a shaft 453 and a gear 454 on the shaft 453 meshes with a gear 455 on a shaft 456. This shaft 456 is in turn provided with a gear 457 which meshes with the gear 17 on the shaft 15 (see particularly Figs. 38 and 39). Thus it will be manifest that inasmuch as the shaft 15 is the motor shaft and is continuously rotated, the shaft 456 will be continuously rotated as well as the shaft 453, gears 452 and 451 and the shaft 450, the latter being rotated in a direction to return the record sheet support to its original or starting position through the medium of the gear 449 when the latter is locked to the shaft 450 for rotation therewith. Connected with the gear 449 for rotation therewith and mounted loosely upon the shaft 450 is a cam or shouldered member 458. A disk 459 is also loosely mounted upon the shaft 450 and carried by this disk is a dog 460 which is pivotally secured thereto. An elastic member 461 is provided which tends normally to move the extremity 462 of the dog 460 into a position to engage the shoulder of the shouldered cam 458. A second disk 463 is mounted loosely upon the shaft 450 and is connected with the disk 459 for rotation therewith and pivotally supported by this second disk 463 is a dog 464 which latter coöperates with a star or toothed wheel 465 secured for rotation with the shaft 450.

An elastic member 466 coöperates with the dog 464 and tends normally to move the end of the latter into engagement with the star or toothed wheel 465 to lock the disks, the shouldered member 58 and the gear 449 for rotation with the shaft 450. A dog 467 is pivotally mounted as at 468 to any fixed support and the extremity 469 thereof is adapted to coöperate with a shoulder 470 on the dog 464 to hold the latter out of engagement with the star or toothed wheel 465 and thereby unlock the gear 449, the shouldered member 458 and the disks 459, 463, with respect to the shaft 450. Inasmuch as the gear 451 is continuously rotated in the manner already set forth, it will be apparent that as the record sheet support is advanced the gear 449 will be rotated but in a direction opposite to the direction of its rotation by the advancement of the record sheet support, and the latter will be returned to its normal position. As the record sheet support is advanced, and as the gear 449 is rotated, the shoulder member 458 which is connected with the gear will also be rotated about the shaft 450 and the shoulder on the member will be moved in a direction toward the extremity 462 of the dog 460 to be engaged by the dog when the disks are rotated and thereby move the shouldered member 458 and the gear 449 in the opposite direction.

The dog 460 is normally held in an inoperating position with respect to the shouldered member 458 preferably by means of a stop 471 which projects into the path of movement of one extremity of the dog and this stop 471 is so located with respect to the movement of the record sheet support that just as the latter reaches its initial or starting position, the dog 460 will be tripped.

The dog 464 is tripped by means of the dog 467 and the latter is moved in such a direction to cause the extremity 469 thereof to engage the shoulder 470 of the dog 464 preferably by means of an elastic member 472, one end of which is connected to a link 473 and the other end is anchored to a suitable fixed support. One end of the link is connected to an arm 474 of a rock shaft 475 which latter is provided with a pin or projection 476 adapted to engage the extremity 477 of the dog 467. The other extremity of the link 473 is connected to a pivoted member 478, preferably by means of a pin and slot connection 479, 480 and an elastic member 481 is provided which is connected with the member 478 and tends normally to move it about its pivot 482 in one direction. When the member 478 is rocked in one direction about its pivot 482 and against the tension of the elastic member 481 the link 473 will be moved against the tension of the elastic member 472 to rock the shaft 475 and thereby cause the pin or projection 476 thereon to engage the extremity 477 of the dog 467 to trip the latter and release the dog 464. When the member 478 is released the elastic member 472 will return the link 473 to rock the shaft 475 in the opposite direction to permit the dog 467 to assume a position to trip the dog 464. The return movement of the link 473 under the influence of the elastic member 472 is limited by means of a stop 473ª which is adapted to be engaged by the crank arm 474.

Any suitable means may be provided for rocking the member 478 automatically as the record sheet support reaches a predetermined point. For this purpose there is provided a rod or shaft 483 which is mounted in suitable bearings and extended longitudinally of the support so as to move therewith. This rod or shaft is provided with radially projecting pins or lugs 484 arranged at different points about the periphery of the shaft or rod and the latter is adapted to be rotated by means of a knob or handle 485 so as to position any desired one of the pins or lugs so that it will engage an extension 486 on the member 478. These pins or lugs 484 correspond to the various columns in which the amounts are recorded on the record sheets and may be so set that when the record sheet or support reaches any predetermined one of these columns, the member 478 will be automatically rocked and the record sheet support returning mechanism thrown into action to return the carriage or support to its original starting position. In order to properly position the pins 484, an indicator 487 may be provided on the end of the shaft or rod 483 preferably adjacent the knob or handle 485 and a spring controlled dog 488 (see Fig. 2) coöperates with this notched indicator, as will be understood. In order to lock the disks 459, 463, and the coöperating mechanism against overthrow, one of the disks, preferably the disk 463, is provided with the notch 489 in its periphery with which the projecting portion 490 of the yielding retaining dog 491 coöperates. It will thus be apparent that as the gear 449 is rotated, the shoulder member 458 will be moved toward the extremity 462 of the dog 460 and when the latter is released, the dog and shouldered member effect a connection between the parts for returning the carriage or support. With this improved construction it is possible to return the record sheet support or carriage to its original or starting position from any point to which it has been advanced regardless of the position of the pins or lugs 484. The latter may be so set that none of the pins or projections will be in a position to engage the extension 486 of the member 478 when the carriage or record sheet support is returned. Under these conditions all that is necessary to return the support or carriage from any point of its advancement is to trip the dog 467 and in order that this may be accomplished at any desired time, a key 492 (see also Fig. 1) is provided, the stem 493 of which is connected to a rocking member 94 (see Figs. 1 and 2) and this member 494 is connected by means of a link 495 with the dog 467, the point of connection of the link 495 with the member 494 being preferably of the pin and slot connection to permit an independent movement of the link 495 with respect to the member 494 when the dog 467 is tripped by the member 478. Thus it will be manifest that whenever the key 492 is actuated, the dog 467 will be tripped and the record sheet or support automatically returned to its original or starting position.

In order to permit the record sheet support to return to its original starting position and to permit the lugs or projections 484 to pass the extension 486 of the member 478, the pin and slot connection 479, 480 between the member 478 and link 473 is provided. With this improved construction it will be apparent that by the actuation of the keys 6 the mechanisms for imparting variable movements to the number bearing members 9 of the totalizer will be set and at the same time the printing elements 333 will be correspondingly set so that when the controlling bar or key 112 is actuated to set in motion the shaft 7, the hammers 352 of the printing mechanism which have been set will be actuated during the rotation of the shafts 7 and the ribbon 391 will be adjusted according to the nature of the amounts indicated on the number bearing members 9 so that the amounts will be printed in a corresponding color on the record sheets. It has also been described how the direction of rotation of the number bearing members 9 may be controlled by the shifting of the sleeve or clutch 42 (see particularly Fig. 3) and also how the adjustment of these sleeves or clutches 42 will determine the color of the ribbon which is presented in the printing position so that the amounts recorded will be printed in the color corresponding to the color of the series of the number bearing members in which the amount is indicated. When the sleeves or clutches 42 are in positions to lock the respective gears 38, 39, for rotation with the shaft 40, the recording mechanism will also be actuated.

It may sometimes be desired to actuate the registering mechanism without actuating the printing or recording mechanism or to actuate the printing or recording mechanism without actuating the registering mechanism. Assuming first that it is desired to render the registering mechanism inactive, that is, so that the number bearing members 9 will not be rotated when the shafts 7 are set in motion, this result may be accomplished in the following manner: It has already been stated that in the intermediate position of the clutch members 42 (see Fig. 3) the gears 38, 39, which are mounted loosely upon the shafts 40 and which control the direction of rotation of these shafts, will be unlocked with respect to the shafts and the shafts will remain idle although the gears may be rotated. The sleeves 42 are therefore first adjusted to this intermediate position and while in this position, the recording or printing mechanism will operate in the manner already described. In order to prevent the shafts 40 from accidentally rotating, which rotary motion may be imparted thereto by the vibration or jar of the various parts, it is advisable to lock these shafts against rotation when the printing or recording mechanism alone is being used. In order to accomplish this result, there is provided on each of the shafts 40 a star or toothed wheel 496 (see particularly Figs. 3, 8 and 36), coöperating with which is a series of dogs or locking members 497. These members are preferably connected for operation in unison, preferably by having an integral connection 498 in the form of a slide or member which is mounted for free movement upon any suitable fixed support, preferably the support 3. This member 498 together with the locking portions 497, is adapted to be moved in one direction preferably the direction to move the locking members out of operating position with respect to the star or toothed wheels 496 by means of an elastic member 499 such as a spring, one extremity of which is connected with the member and the other extremity is anchored to a suitable fixed support. It is advisable to shift this member 498 against the tension of this elastic member 499 to lock the shafts during the adjustment of the sleeves or clutches 42 into their intermediate positions and, in order to accomplish this, the slide 58 (see also Figs. 8, 12 and 55) is provided with a cam or extension 500 adapted to engage an antifriction roller 501 mounted upon the member 498. In order to lock the shafts 8 against accidental movement from the jarring of the machine when the shafts are unlocked, there is provided on each of the shafts a star or toothed wheel 502 (see particularly Figs. 3, 22 and 23) with which dogs 503 coöperate and the movement of these dogs 503 may be controlled by the elastic members or springs 504. The tension of the elastic members 504 is such that it will permit the dogs to yield when power is applied to the shafts.

Should it be desired to actuate the printing or recording mechanism without actuating the registering mechanism, all that is necessary is to lock the member 359 (see particularly Fig. 41) against actuation under the influence of the elastic member 377, inasmuch as it is necessary that the member 359 move about its pivot 368 to move the arm 360 in such a direction that the connecting bar or rod 365 will move out of the path of movement of the extensions 369 on the hammers 352. This locking of the member 359 may be accomplished in any desired or suitable manner but a simple and efficient means comprises a pair of hooks 505 (see also Figs. 45 and 46) which are adapted to engage over lugs or extensions 506 carried by the arms 360. These arms are preferably connected to operate in unison by means of a rock shaft 507 journaled in any suitable fixed support and a crank arm 508 is provided on the shaft with which the stem 509 of a key 510 is connected (see also Fig. 1) so that when the key 510 is depressed or actuated, the hooks 505 will engage over the lugs or projections 506 and lock the member 359 against movement. An elastic member 511 is provided which tends normally to return the key 510 and rock the shaft 507 in the opposite direction to move the hooks 505 out of engagement with the lugs or projections 506 and thereby release member 359 to permit it to be actuated by the elastic member 377. Obviously when the printing or recording mechanism is thus locked against actuation, the registering mechanism may be actuated so as to rotate the number bearing members 9 in one direction or the other without being interfered with.

In order to insure the positive positioning of the sleeves or clutches 42 when the lever 49 is actuated and to prevent the actuation of the controlling bar or key 112 to set the machine in motion before the clutch or sleeve is properly positioned, suitable mechanism is provided and comprises a slide 512 (see Figs. 8, 12, 55 and 57) which is mounted for sliding movement upon any suitable fixed support, to extend transversely with respect to the shaft 113 and preferably entirely across the machine. This slide or bar 512 is provided with a deflected extremity 513 which coöperates with an extension 514 on the member or slide 58. This extension 514 is provided with a series of recesses 515, 516, and 517 opening through the upper edge thereof and are adapted to be positioned by the adjustment of the slide 58 to permit the depending or deflected portion 513 of the bar 512 to pass therethrough. An elastic member 518 is provided, one end of which is connected with a slide and the other end is anchored to a suitable fixed support and tends normally to move the slide 512 in a direction to move the depending portion 513 away from the extension 514. This slide 512 is adapted to be moved against the tension of the elastic member 518 so as to move the depending portion 513 into one of the recesses 515, 516, 517 when they are respectively positioned with respect to the portion 513 and thereby lock the lever 49 and the slide 58 against movement. One of these recesses is provided for each of the positions of the sleeve or clutch 42 and when the latter is in the position shown in Fig. 3, or intermediate position, the recess 516 will be positioned to receive the portion 513 of the slide 512. It will therefore be apparent that when the slide 512 is moved to move this portion 513 into the recess, the slide 58 and consequently the clutch or sleeve 42 will be locked against movement. In the event that one of these recesses is not positioned to receive the extension 513 of the slide 512, the extension will engage the portion 514 on the slide 58 and the slide 512 will therefore be locked or prevented from making its full movement. In order that this slide may control the action of the shaft 113 the latter is provided with a pin or arm 519 which is adapted to engage a flanged portion 520 of the slide. The pin 519 and the portion 520 of the slide 512 are so located with respect to each other that unless one of the recesses 515, 516, 517, is in a position to receive the portion 513 of the slide, the shaft 113 cannot be rocked to set the mechanism in motion.

While in this application the construction and operation of all of the parts and mechanisms have been shown and fully described, in order that a full and clear understanding of the entire machine may be had, it is to be understood that the specific construction and operation of the carriage or paper support mechanism and the ribbon winding and re-winding mechanism form no part of the present invention, but constitute the subjects matter of separate applications.

What is claimed as new is—

1. In a calculating machine, the combination of registering mechanism embodying rotatable number bearing members, actuating means for said members, recording mechanism operatively connected with the actuating means for operation in unison with the registering mechanism and embodying printing elements, selecting mechanism for controlling the degree of actuation of said members and printing elements, means for controlling the direction of actuation of the number bearing members or for rendering the said number-bearing members inactive while the recording mechanism remains active, means individual to the recording mechanism for rendering the latter inactive at will while the registering mechanism remains active.

2. In a calculating machine, the combination of a register embodying a forwardly and rearwardly operating character bearing element, recording mechanism, actuating mechanism operatively connected with the recording mechanism, means for operatively connecting the register with the said actuating mechanism for operation in unison with the recording mechanism, the said means embodying mechanism for controlling the direction of operation of the said element and for disconnecting the latter with respect to the said actuating mechanism, and means whereby the recording mechanism may be disconnected with respect to the said actuating mechanism and independently with respect to the register.

3. In a calculating machine, the combination of a register embodying a forwardly and rearwardly operating character bearing element, recording mechanism, actuating mechanism operatively connected with the recording mechanism, means for operatively connecting the register with the said actuating mechanism for operation in unison with the recording mechanism, the said means embodying mechanism for controlling the direction of operation of the said element and for disconnecting the latter with respect to the said actuating mechanism, means whereby the recording mechanism may be disconnected with respect to the actuating mechanism and independently with respect to the register, and means for controlling the degree of actuation of the recording mechanism and the said element.

4. In a calculating machine, the combination of a register embodying a forwardly and rearwardly operating character bearing element, recording mechanism, actuating mechanism operatively connected with the recording mechanism, means for operatively connecting the register with the said actuating mechanism for operation in unison with the recording mechanism, the said means embodying mechanism for controlling the direction of operation of the said element and for disconnecting the latter with respect to the said actuating mechanism, means whereby the recording mechanism may be disconnected with respect to the actuating mechanism and independently with respect to the register, and selecting mechanism for controlling the degree of actuation of the recording mechanism and the said element.

5. In a calculating machine, the combination of a register embodying a forwardly and rearwardly operating character bearing element, recording mechanism, actuating mechanism operatively connected with the recording mechanism, means for operatively connecting the register with the said actuating mechanism for operation in unison with the recording mechanism, the said means embodying mechanism for controlling the direction of operation of the said element and for disconnecting the latter with respect to the said actuating mechanism, means whereby the recording mechanism may be disconnected with respect to the actuating mechanism and independently with respect to the register, and selecting mechanism for controlling the degree of actuation of the recording mechanism and the said element, said selecting mechanism embodying a plurality of actuating keys.

6. In a calculating machine, the combination of a register embodying a forwardly and rearwardly operating character bearing element, recording mechanism, actuating mechanism operatively connected with the recording mechanism, means operatively connecting the register with the said actuating mechanism for operation in unison with the recording mechanism, the said means embodying mechanism for controlling the direction of operation of the said element and for disconnecting the latter with respect to the said actuating mechanism, means whereby the recording mechanism may be disconnected with respect to the actuating mechanism and independently with respect to the register, selecting mechanism for controlling the degree of actuation of the recording mechanism and the said element, said selecting mechanism embodying a plurality of actuating keys and a traveling gear controlled by the keys.

7. In a calculating machine, the combination of a register embodying forwardly and backwardly rotatable character bearing members, recording mechanism, actuating mechanism operatively connected with the recording mechanism, means connecting said members with the actuating mechanism for operation in unison with the recording mechanism, power mechanism for imparting motion to the said actuating mechanism and embodying a driven shaft, a normally inactive connection between the power mechanism and the said shaft, a key for controlling said connection, and means whereby the said recording mechanism may be disconnected with respect to the said actuating mechanism, the first recited means being adapted to disconnect the said members from the said actuating mechanism and independently with respect to the recording mechanism.

8. In a calculating machine, the combination of a register embodying forwardly and backwardly rotatable character bearing members, recording mechanism, actuating mechanism operatively connected with the recording mechanism, means connecting said members with the actuating mechanism for operation in unison with the recording mechanism, power mechanism for imparting motion to the said actuating mechanism and embodying a driven shaft, a normally inactive connection between the power mechanism and the said shaft, a key for controlling said connection, and means whereby the said recording mechanism may be disconnected with respect to the said actuating mechanism, the first recited means being adapted to control the direction of rotation of the said character bearing members and also to disconnect the said members from the actuating mechanism independently with respect to the recording mechanism.

9. In a calculating machine, the combination of a register embodying forwardly and backwardly rotatable character bearing members, recording mechanism, actuating mechanism operatively connected with the recording mechanism, means connecting said members with the actuating mechanism for operation in unison with the recording mechanism, power mechanism for imparting motion to the said actuating mechanism and embodying a driven shaft, a normally inactive connection between the power mechanism and the said shaft, a key for controlling said connection, and means whereby the said recording mechanism may be disconnected with respect to the said actuating mechanism, the first recited means being adapted to disconnect the said members from the said actuating mechanism and independently with respect to the recording mechanism, the said connection between the power mechanism and the said shaft being adapted to disconnect the shaft from the power mechanism automatically.

10. In a calculating machine, the combination of a register embodying forwardly and backwardly rotatable character bearing members, recording mechanism, actuating mechanism operatively connected with the recording mechanism, means connecting said members with the actuating mechanism for operation in unison with the recording mechanism, power mechanism for imparting motion to the said actuating mechanism and embodying a driven shaft, a normally inactive connection between the power mechanism and the said shaft, a key for controlling said connection, and means whereby the said recording mechanism may be disconnected with respect to the said actuating mechanism, the first recited means being adapted to disconnect the said members from the said actuating mechanism and independently with respect to the recording mechanism, the said connection between the power mechanism and the said shaft being adapted to disconnect the shaft from the power mechanism automatically, and upon the completion of a revolution of the shaft.

11. In a calculating machine, the combination of registering mechanism, recording mechanism, means common to both of said mechanisms for actuating the same and embodying a driven shaft, power mechanism for operating the shaft, a normally inactive connection between the power mechanism and the said shaft, a key for rendering the connection active, the said connection being adapted to disconnect the shaft from the power mechanism automatically and upon the completion of one revolution of the shaft, and means whereby either of the said registering or the recording mechanism may be disconnected from the actuating means independently with respect to the other.

12. In a calculating machine, the combination of registering mechanism, recording mechanism embodying printing elements, means for actuating both of the said mechanisms in unison and embodying mechanism adapted to be set for respectively controlling the degree of actuation of both, keys for controlling the last recited mechanism, means for imparting motion to the said actuating mechanism, and means whereby either the said registering mechanism or the recording mechanism may be disconnected with respect to the actuating mechanism, and independently with respect to each other.

13. In a calculating machine, the combination of registering mechanism, recording mechanism embodying printing elements, means for actuating both of the said mechanisms in unison and embodying mechanism adapted to be set for respectively controlling the degree of actuation of both, keys for controlling the last recited mechanism, means for imparting motion to the said actuating mechanism and embodying a shaft, power mechanism, a normally inactive connection for connecting the shaft and power mechanism, a key for controlling such connection, and means whereby either the said registering mechanism or the recording mechanism may be disconnected with respect to the actuating mechanism and independently with respect to the other.

14. In a calculating machine, the combination of registering mechanism, recording mechanism embodying printing elements, means for actuating both of the said mechanisms in unison and embodying mechanism adapted to be set for respectively controlling the degree of actuation of both, keys for controlling the last recited mechanism, means for imparting motion to the said actuating mechanism and embodying a shaft, power mechanism, a normally inactive connection for connecting the shaft and power mechanism, a key for controlling such connection, and means whereby either the said registering mechanism or the recording mechanism may be disconnected with respect to the actuating mechanism and independently with respect to the other, said connection between the shaft and power mechanism being adapted to disconnect the shaft from the power mechanism automatically.

15. In a calculating machine, the combination of registering mechanism embodying forwardly and backwardly rotatable number bearing members, recording mechanism embodying printing elements, mechanism common to both the registering and the recording mechanisms for actuating them in unison, a plurality of keys, mechanism adapted to be set by the said keys for controlling the degree of actuation of the number bearing members and the said printing elements, mechanism for imparting motion to the said actuating mechanism, means for controlling the motion imparting mechanism, and means for controlling the direction of rotation of the said number bearing members and embodying means whereby the number bearing members may be disconnected with respect to the said actuating mechanism.

16. In a calculating machine, the combination of registering mechanism embodying forwardly and backwardly rotatable number bearing members, recording mechanism embodying printing elements, mechanism common to both the registering and the recording mechanisms for actuating them in unison, a plurality of keys, mechanism adapted to be set by the said keys for controlling the degree of actuation of the number bearing members and the said printing elements, means for controlling the motion imparting mechanism, means for controlling the direction of rotation of the said number bearing members and embodying means whereby the number bearing members may be disconnected with respect to the said actuating mechanism, and means whereby the said recording mechanism may be disconnected with respect to the said actuating mechanism and independently with respect to the registering mechanism.

17. In a calculating machine, the combination of registering mechanism embodying forwardly and backwardly rotatable number bearing members, recording mechanism embodying printing elements, mechanism common to both the registering and the recording mechanisms for actuating them in unison, a plurality of keys, mechanism adapted to be set by the said keys for controlling the degree of actuation of the number bearing members and the said printing elements, mechanism for imparting motion to the said actuating mechanism, means for controlling the motion imparting mechanism, means for controlling the direction of rotation of the said number bearing members and embodying means whereby the number bearing members may be disconnected with respect to the said actuating mechanism, and means for locking the said number bearing members when the latter are disconnected with respect to the actuating mechanism.

18. In a calculating machine, the combination of registering mechanism embodying rotatable number bearing members, recording mechanism, actuating mechanism common to both of the first two said mechanisms for operating them in unison, means whereby either the said registering mechanism or the recording mechanism may be disconnected with respect to the said actuating mechanism while the other is connected therewith, and means for locking the number bearing members, against actuation when they are disconnected with respect to the said actuating mechanism.

19. In a calculating machine, the combination of registering mechanism embodying rotatable number bearing members, recording mechanism, actuating mechanism common to both of the first two said mechanisms for operating them in unison, means whereby either the said registering mechanism or the recording mechanism may be disconnected with respect to the said actuating mechanism while the other is connected therewith, and means for automatically locking the number bearing members against actuation when they are disconnected with respect to the said actuating mechanism.

20. In a calculating machine, the combination of registering mechanism embodying rotatable number bearing members, recording mechanism, actuating mechanism common to both of the first two said mechanisms for operating them in unison, means whereby either the said registering mechanism or the recording mechanism may be disconnected with respect to the said actuating mechanism while the other is connected therewith, means for locking the number bearing members against actuation when they are disconnected with respect to the said actuating mechanism, motion imparting means for the said actuating mechanism and embodying a driven shaft, power mechanism, a normally inactive connection between the power mechanism and the shaft for connecting the shaft therewith, and means for controlling such connection.

21. In a calculating machine, the combination of registering mechanism embodying rotatable number bearing members, recording mechanism, actuating mechanism common to both of the first two said mechanisms for operating them in unison, means whereby either the said registering mechanism or the recording mechanism may be disconnected with respect to the said actuating mechanism while the other is connected therewith, means for locking the number bearing members against actuation when they are disconnected with respect to the said actuating mechanism, motion imparting means for the said actuating mechanism and embodying a driven shaft, power mechanism, a normally inactive connection between the power mechanism and the shaft for connecting the shaft therewith, and means for controlling such connection, the last recited connection being adapted to disconnect the shaft from the power mechanism, automatically.

22. In a calculating machine, the combination of registering mechanism embodying rotatable number bearing members, recording mechanism, actuating mechanism common to both of the first two said mechanisms for operating them in unison, means whereby either the said registering mechanism or the recording mechanism may be disconnected with respect to the said actuating mechanism while the other is connected therewith, means for locking the number bearing members against actuation when they are disconnected with respect to the said actuating mechanism, motion imparting means for the said actuating mechanism and embodying a shaft, continuously operating power mechanism, a normally inactive connection between the power mechanism and the shaft for connecting the shaft therewith, and means for controlling such connection.

23. In a calculating machine, the combination of registering mechanism embodying rotatable number bearing members, recording mechanism, actuating mechanism common to both of the first two said mechanisms for operating them in unison, means whereby either the said registering mechanism or the recording mechanism may be disconnected with respect to the said actuating mechanism while the other is connected therewith, means for locking the number bearing members against actuation when they are disconnected with respect to the said actuating mechanism, motion imparting means for the said actuating mechanism and embodying a shaft, continuously operating power mechanism, a normally inactive connection between the power mechanism and the shaft for connecting the shaft therewith, and key mechanism for controlling such connection at will.

24. In a calculating machine, the combination of registering mechanism embodying rotatable number bearing members, recording mechanism, actuating mechanism common to both of the first two said mechanisms for operating them in unison, means whereby either the said registering mechanism or the recording mechanism may be disconnected with respect to the said actuating mechanism while the other is connected therewith, means for locking the number bearing members against actuation when they are disconnected with respect to the said actuating mechanism, motion imparting means for the said actuating mechanism and embodying a shaft, continuously operating power mechanism, a normally inactive connection between the power mechanism and the shaft for connecting the shaft therewith, and means for controlling such connection, said connection being adapted to disconnect the shaft from the power mechanism, automatically.

25. In a calculating machine, the combination of registering mechanism embodying rotatable number bearing members, recording mechanism, actuating mechanism common to both of the first two said mechanisms for operating them in unison, means whereby either the said registering mechanism or the recording mechanism may be disconnected with respect to the said actuating mechanism while the other is connected therewith, means for locking the number bearing members against actuation when they are disconnected with respect to the said actuating mechanism, motion imparting means for the said actuating mechanism and embodying a shaft, continuously operating power mechanism, a normally inactive connection between the power mechanisms and the shaft for connecting the shaft therewith, and means for controlling such connection, said connection being adapted to disconnect the shaft from the power mechanism automatically and at the completion of the revolution of the shaft.

26. In a calculating machine, the combination of registering mechanism, recording mechanism, actuating mechanism common to both of the first two said mechanisms for simultaneously operating them, a plurality of keys, mechanism adapted to be set by the keys for respectively controlling the degree of actuation of the registering and recording mechanisms, means individual to the registering and the recording mechanisms for disconnecting them from the actuating mechanism independently, power mechanism for imparting motion to the actuating mechanism, means for controlling the power mechanism, and mechanism for restoring the key set mechanism.

27. In a calculating machine, the combination of registering mechanism, recording mechanism, actuating mechanism common to both of the first two said mechanisms for simultaneously operating them, a plurality of keys, mechanism adapted to be set by the keys for respectively controlling the degree of actuation of the registering and recording mechanisms, means individual to the registering and the recording mechanisms for disconnecting them from the actuating mechanism independently, power mechanism for imparting motion to the actuating mechanism, means for controlling the power mechanism, and mechanism for restoring the key set mechanism automatically.

28. In a calculating machine, the combination of registering mechanism, recording mechanism, actuating mechanism common to both of the first two said mechanisms for simultaneously operating them, a plurality of keys, mechanism adapted to be set by the keys for respectively controlling the degree of actuation of the registering and recording mechanisms, power mechanism for imparting motion to the actuating mechanism, means for connecting the power mechanism with the actuating mechanism, embodying means for automatically disconnecting the actuating mechanism from the power mechanism when the actuating mechanism reaches a predetermined point in its operation, means for restoring the key set mechanism, and means whereby the said actuating mechanism may be operated one or more times without actuating the said restoring means.

29. In a calculating machine, the combination of registering mechanism, recording mechanism, actuating mechanism common to both of the first two said mechanisms for simultaneously operating them, a plurality of keys, mechanism adapted to be set by the keys for respectively controlling the degree of actuation of the registering and recording mechanisms, power mechanism for imparting motion to the actuating mechanism, means for connecting the power mechanism with the actuating mechanism, embodying means for automatically disconnecting the actuating mechanism from the power mechanism when the actuating mechanism reaches a predetermined point in its operation, means for restoring the key set mechanism, means whereby the said actuating mechanism may be operated one or more times without actuating the said restoring means, and means for rendering the said restoring means active at will.

30. In a calculating machine, the combination of registering mechanism embodying forwardly and backwardly rotatable number bearing members, actuating mechanism therefor, recording mechanism, means connecting the recording mechanism with the said actuating mechanism for operation in unison with the registering mechanism, a shiftable clutch element, means for positioning the clutch element to lock the number bearing members to cause the forward or backward rotation thereof, and for positioning said element to unlock the said members with respect to the actuating mechanism, and means for locking the said shiftable element in any of its positions.

31. In a calculating machine, the combination of registering mechanism embodying forwardly and backwardly rotatable number bearing members, actuating mechanism therefor, recording mechanism, means connecting the recording mechanism with the said actuating mechanism for operation in unison with the registering mechanism, a shiftable clutch element, means for positioning the clutch element to lock the number bearing members to cause the forward or backward rotation thereof, and for positioning said element to unlock the said members with respect to the actuating mechanism, and yielding means for locking the said shiftable element in any of its positions.

32. In a calculating machine, the combination of registering mechanism embodying forwardly and backwardly rotatable number bearing members, actuating mechanism therefor, recording mechanism, means connecting the recording mechanism with the said actuating mechanism for operation in unison with the registering mechanism, a shiftable clutch element, means for positioning the clutch element to lock the number bearing members to cause the forward or backward rotation thereof, and for positioning said element to unlock the said members with respect to the actuating mechanism, means for locking the shiftable element in any of its positions, and means for locking the number bearing members against rotation when the latter are unlocked with respect to the said actuating mechanism.

33. In a calculating machine, the combination of registering mechanism embodying forwardly and backwardly rotatable number bearing members, actuating mechanism therefor, recording mechanism, means connecting the recording mechanism with the said actuating mechanism for operation in unison with the registering mechanism, a shiftable clutch element, means for positioning the clutch element to lock the number bearing members to cause the forward or backward rotation thereof, and for positioning said element to unlock the said members with respect to the actuating mechanism, means for locking the shiftable element in any of its positions, and means for locking the number bearing members automatically against rotation when the latter are unlocked with respect to the said actuating mechanism.

34. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, a shiftable clutch element, means for positioning the said element at will to lock the said members for forward or backward rotation and for positioning said element to unlock the said members with respect to the actuating mechanism and independently with respect to the recording mechanism, and means for locking the said shiftable element in any of its positions.

35. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, a shiftable clutch element, means for positioning the said element at will to lock the said members for forward or backward rotation and for positioning said element to unlock the said members with respect to the actuating mechanism and independently with respect to the recording mechanism, means for locking the said shiftable element in any of its positions, and means for disconnecting the said recording mechanism with respect to the said actuating mechanism and independently with respect to the registering mechanism.

36. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, means for controlling the direction of rotation of said members and for disconnecting said members with respect to the actuating mechanism independently with respect to the recording mechanism, means for locking the last recited means in any of its positions, and key set mechanism adapted to control the degree of actuation of both the recording mechanism and the said members.

37. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, means for controlling the direction of rotation of said members and for disconnecting said members with respect to the actuating mechanism independently with respect to the recording mechanism, means for locking the last recited means in any of its positions, key set mechanism adapted to control the degree of actuation of both the recording mechanism and the said members, and means whereby the recording mechanism may be disconnected with respect to the said actuating mechanism independently with respect to the registering mechanism.

38. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, means for controlling the direction of rotation of said members and for disconnecting said members with respect to the actuating mechanism independently with respect to the recording mechanism, means for locking the last recited means in any of its positions, key set mechanism adapted to control the degree of actuation of both the recording mechanism and the said members, and means for restoring the said key set mechanism.

39. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, means for controlling the direction of rotation of said members and for disconnecting said members with respect to the actuating mechanism independently with respect to the recording mechanism, means for locking the last recited means in any of its positions, key set mechanism adapted to control the degree of actuation of both the recording mechanism and the said members, and means for restoring the said key set mechanism automatically.

40. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, means for controlling the direction of rotation of said members and for disconnecting said members with respect to the actuating mechanism independently with respect to the recording mechanism, means for locking the last recited means in any of its positions, key set mechanism adapted to control the degree of actuation of both the recording mechanism and the said members, means whereby the recording mechanism may be disconnected with respect to the said actuating mechanism independently with respect to the registering mechanism, means for restoring the said key set mechanism automatically and means for rendering the last recited means inactive at will.

41. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, means for controlling the direction of rotation of said members and for disconnecting said members with respect to the actuating mechanism independently with respect to the recording mechanism, means for locking the last recited means in any of its positions, key set mechanism adapted to control the degree of actuation of both the recording mechanism and the said members, mechanism for restoring the said key set mechanism, and means for rendering the last recited mechanism active upon each cycle of operation of the said actuating mechanism.

42. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, means for controlling the direction of rotation of said members and for disconnecting said members with respect to the actuating mechanism independently with respect to the recording mechanism, means for locking the last recited means in any of its positions, key set mechanism adapted to control the degree of actuation of both the recording mechanism and the said members, mechanism for restoring the said key set mechanism, means for rendering the last recited mechanism active automatically upon each cycle of operation of the said actuating mechanism, and means for causing one or more cycles of operation of the said actuating mechanism without operating the said restoring mechanism.

43. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, means for controlling the direction of rotation of said members and for disconnecting said members with respect to the actuating mechanism independently with respect to the recording mechanism, means for locking the last recited means in any of its positions, key set mechanism adapted to control the degree of actuation of both the recording mechanism and the said members, mechanism for restoring the said key set mechanism, means for rendering the last recited mechanism active automatically upon each cycle of operation of the said actuating mechanism, means for causing one or more cycles of operation of the said actuating mechanism without operating the said restoring mechanism, and manually controlled means for rendering the restoring mechanism active at will.

44. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, means for controlling the direction of rotation of said members and for disconnecting said members with respect to the actuating mechanism independently with respect to the recording mechanism, means for locking the last recited means in any of its positions, key set mechanism adapted to control the degree of actuation of both the recording mechanism and the said members, mechanism for restoring the key set mechanism, means for restoring the key set mechanism, means for rendering the last recited mechanism active automatically upon each cycle of operation of said actuating mechanism, means for disconnecting the recording mechanism with respect to the actuating mechanism independently with respect to the registering mechanism, and means for causing one or more cycles of operation of the said actuating mechanism and without operating the said restoring mechanism.

45. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, means for controlling the direction of rotation of said members and for disconnecting said members with respect to the actuating mechanism independently with respect to the recording mechanism, means for locking the last recited means in any of its positions, key set mechanism adapted to control the degree of actuation of both the recording mechanism and the said members, mechanism for restoring the key set mechanism, means for restoring the key set mechanism, means for rendering the last recited mechanism active automatically upon each cycle of operation of said actuating mechanism, means for disconnecting the recording mechanism with respect to the actuating mechanism independently with respect to the registering mechanism, means for causing one or more cycles of operation of the said actuating mechanism and without operating the said restoring mechanism, and manually controlled means for rendering the restoring mechanism active at will.

46. In a calculating machine, the combination of registering mechanism embodying forwardly and backwardly rotatable number bearing members, actuating mechanism therefor, recording mechanism, means connecting the recording mechanism with the actuating mechanism for operation in unison with the registering mechanism, means for controlling the direction of rotation of said members and for disconnecting said members with respect to the actuating mechanism independently with respect to the recording mechanism, means for locking the last recited means in any of its positions, key set mechanism adapted to control the degree of actuation of both the recording mechanism and the said members, mechanism for restoring the key set mechanism, means for restoring the key set mechanism, means for rendering the last recited mechanism active automatically upon each cycle of operation of said actuating mechanism, means for disconnecting the recording mechanism with respect to the actuating mechanism independently with respect to the registering mechanism, means for causing one or more cycles of operation of the said actuating mechanism and without operating the said restoring mechanism, and key controlled mechanism for rendering the restoring mechanism active at will, said key controlled mechanism being adapted to render the said restoring mechanism inactive automatically.

47. In a calculating machine, the combination of forwardly and backwardly operating registering mechanism, mechanism for actuating the same, means for controlling the direction of operation of the registering mechanism at will, motion imparting means for operating the actuating mechanism and embodying power mechanism, a normally inactive connection between the power and the said actuating mechanisms, a key for controlling the connection to render the latter active, and means controlled by the actuation of the first recited means for locking the said key against actuation during the actuation of the first recited means.

48. In a calculating machine, the combination of recording mechanism, actuating mechanism therefor, registering mechanism, mechanism adapted to be set for connecting the registering mechanism with the said actuating mechanism and for disconnecting the same therefrom at will, motion imparting means for operating the said actuating mechanism and embodying power mechanism, a normally inactive connection between the power and actuating mechanism, manually controlled means for rendering said connection active, and means operatively connected with the fourth recited mechanism for locking the said manually controlled means against actuation during the setting operation of the last recited mechanism and for releasing the said manually controlled means at the completion of the said setting operation.

49. In a calculating machine, the combination of recording mechanism, actuating mechanism therefor, registering mechanism, mechanism adapted to be set for connecting the registering mechanism with the said actuating mechanism and for disconnecting the same therefrom at will, motion imparting means for operating the said actuating mechanism and embodying power mechanism, a normally inactive connection between the power and actuating mechanism, manually controlled means for rendering said connection active, means operatively connected with the fourth recited mechanism for locking the said manually controlled means against actuation during the setting operation of the last recited mechanism, and means for locking the registering mechanism against actuation when disconnected from the said actuating mechanism.

50. In a calculating machine, the combination of a totalizer embodying number bearing members, means for controlling the degree of operation of said members, recording mechanism embodying adjustable printing elements individual to the said members, means for causing the operation of the first said means to be accomplished by a corresponding adjustment of the respective printing elements, spring controlled hammer members individual to the said printing elements and tending normally to impart a blow to the respective elements to take an impression therefrom, means for locking the hammer members against the tension of the actuating means, means for actuating the said locking means to release the said hammer members, and means for automatically locking a portion of the said hammer members against actuation when the first recited locking means is actuated to release the hammer members.

51. In a calculating machine, the combination of a totalizer embodying number bearing members, means for controlling the degree of operation of said members, recording mechanism embodying adjustable printing elements individual to the said members, means whereby the operation of the first said means to be accomplished by a corresponding adjustment of the respective printing elements, spring controlled hammer members individual to the said printing elements and tending normally to impart a blow to the respective elements to take an impression therefrom, means for locking the hammer members against the tension of the actuating means, means for actuating the said locking means to release the said hammer members, means for automatically locking the portion of the said hammer members against actuation when the first recited locking means is actuated to release the hammer members, and means for restoring all of the said hammer members to their normal positions.

52. In a calculating machine, the combination of a totalizer embodying number bearing members, means for controlling the degree of operation of said members, recording mechanism embodying adjustable printing elements individual to the said members, means whereby the operation of the first said means to be accomplished by a corresponding adjustment of the respective printing elements, spring controlled hammer members individual to the said printing elements and tending normally to impart a blow to the respective elements to take an impression therefrom, means for locking the hammer members against the tension of the actuating means, means for actuating the said locking means to release the said hammer members, means for automatically locking a portion of the said hammer members against actuation when the first recited locking means is actuated to release the hammer members, and means for restoring all of the said hammer members to their normal positions automatically.

53. In a calculating machine, the combination of a totalizer embodying number bearing members, means for controlling the degree of operation of said members, recording mechanism embodying adjustable printing elements individual to the said members, means whereby the operation of the first said means to be accomplished by a corresponding adjustment of the respective printing elements, spring controlled hammer members individual to the said printing elements and tending normally to impart a blow to the respective elements to take an impression therefrom, means common to all of the hammer members for normally locking them against the tension of the respective actuating means, means for actuating the said locking means to release the hammer members, and means individual to the hammer members for automatically locking a portion of the said members against actuation when released by the first recited locking means.

54. In a calculating machine, the combination of a totalizer embodying number bearing members, means for controlling the degree of operation of said members, recording mechanism embodying adjustable printing elements individual to the said members, means whereby the operation of the first said means to be accomplished by a corresponding adjustment of the respective printing elements, spring controlled hammer members individual to the said printing elements and tending normally to impart a blow to the respective elements to take an impression therefrom, means common to the said hammer members for locking them against the tension of the respective actuating means, means for actuating the said locking means to release all of the hammer members, and means controlled by the adjusting mechanism of the printing elements for automatically maintaining a portion of the said hammer members against the tension of the respective actuating means when released by the said locking means.

55. In a calculating machine, the combination of a totalizer embodying number bearing members, means for controlling the degree of operation of said members, recording mechanism embodying adjustable printing elements individual to the said members, means for causing the operation of the first said means to be accomplished by a corresponding adjustment of the respective printing elements, spring controlled hammer members individual to the said printing elements and tending normally to impart a blow to the respective elements to take an impression therefrom, means common to said hammer members for locking them against the tension of the respective actuating means, means for releasing said hammer members, and means individual to the last recited members and controlled by the adjusting mechanism of the respective printing elements for maintaining the respective hammer members against actuation when released by the said locking means.

56. In a calculating machine, the combination of a totalizer embodying number bearing members, means for controlling the degree of operation of said members, recording mechanism embodying adjustable printing elements individual to the said members, means for causing the operation of the first said means to be accomplished by a corresponding adjustment of the respective printing elements, spring controlled hammer members individual to the said printing elements and tending normally to impart a blow to the respective elements to take an impression therefrom, means common to said hammer members for locking them against the tension of the respective actuating means, means for releasing said hammer members, means individual to the last recited members and controlled by the adjusting mechanism of the respective printing elements for maintaining the respective hammer members against actuation when released by the said locking means, and means for restoring the actuated parts.

57. In a calculating machine, the combination of a totalizer embodying number bearing elements, selecting mechanism for controlling the degree of actuation of said elements, recording mechanism embodying adjustable printing elements individual to the number bearing elements, means controlled by said selecting mechanism for causing a corresponding adjustment of the respective printing elements, spring controlled members individual to the printing elements for taking an impression from the respective elements when the members are released, means for holding said members normally under tension, and locking members individual to the said members and controlled by the adjustment of the printing elements for locking the said members against actuation.

58. In a calculating machine, the combination of registering mechanism embodying number bearing members having different series of characters thereon, means for actuating the members, recording mechanism operating in unison with the members and embodying printing elements individual to the members, a ribbon provided with a portion corresponding to each of the said series of characters, means for controlling the operation of said members to register in either of the series of characters, means for automatically shifting said ribbon to present the respective portions in printing position, and means individual to the printing elements for taking an impression therefrom through the ribbon.

59. In a calculating machine, the combination of registering mechanism embodying number bearing members having different series of characters thereon, means for actuating the members, recording mechanism operating in unison with the members and embodying printing elements individual to the members, a ribbon provided with a portion corresponding to each of the said series of characters, means for controlling the operation of said members to register in either of the series of characters, means for automatically shifting said ribbon to present the respective portions in printing position, selecting mechanism for controlling the degree of adjustment of the printing elements, means individual to the printing elements for taking an impression therefrom through the ribbon, and means for restoring said printing elements.

60. In a calculating machine, the combination of registering mechanism embodying number bearing members having different series of characters thereon, means for actuating the members, recording mechanism operating in unison with the members and embodying printing elements individual to the members, a ribbon provided with a portion corresponding to each of the said series of characters, means for controlling the operation of said members to register in either of the series of characters, means for automatically shifting said ribbon to present the respective portions in printing position, selecting mechanism for controlling the degree of adjustment of the printing elements, means individual to the printing elements for taking an impression therefrom through the ribbon, means for restoring said printing elements, and means connected with the last said means for shifting the said ribbon.

61. In a calculating machine, the combination of registering mechanism embodying number bearing members having two sets of characters of different indications, means for controlling the operation of said members to register in either of said sets of characters, recording mechanism embodying printing elements individual to the members, means for controlling the actuation of the elements, impression members individual to the elements for taking impressions therefrom, a printing ribbon having different portions corresponding to the respective sets of characters, means for shifting the ribbon in one direction, a stop for controlling the degree of movement of the ribbon, and means for automatically controlling the stop for effecting a movement of the portion of the ribbon into printing position corresponding to the series of characters on the number bearing members in which the amount is registered.

62. In a calculating machine, the combination of registering mechanism embodying number bearing members having two sets of characters of different indications, means for controlling the operation of said members to register in either of said sets of characters, recording mechanism embodying printing elements individual to the members, means for controlling the actuation of the elements, impression members individual to the elements for taking impressions therefrom, a printing ribbon having different portions corresponding to the respective sets of characters, means for shifting the ribbon in one direction, a stop for controlling the degree of movement of the ribbon, means for automatically controlling the stop for effecting a movement of the portion of the ribbon into printing position corresponding to the series of characters on the number bearing members in which the amount is registered, and means for moving the ribbon in the opposite direction.

63. In a calculating machine, the combination of registering mechanism embodying number bearing members having two sets of characters of different indications, means for controlling the operation of said members to register in either of said sets of characters, recording mechanism embodying printing elements individual to the members, means for controlling the actuation of the elements, impression members individual to the elements for taking impressions therefrom, a printing ribbon having different portions corresponding to the respective sets of characters, means for shifting the ribbon in one direction, a stop for controlling the degree of movement of the ribbon, means for automatically controlling the stop for effecting a movement of the portion of the ribbon into printing position corresponding to the series of characters on the number bearing members in which the amount is registered, and means for moving the ribbon in the opposite direction automatically.

64. In a calculating machine, the combination of registering mechanism embodying number bearing members having two sets of characters of different indications, means for controlling the operation of said members to register in either of said sets of characters, recording mechanism embodying printing elements individual to the members, means for controlling the actuation of the elements, impression members individual to the elements for taking impressions therefrom, a printing ribbon having different portions corresponding to the respective sets of characters, means for shifting the ribbon in one direction, a stop for controlling the degree of movement of the ribbon, means for automatically controlling the stop for effecting a movement of the portion of the ribbon into printing position corresponding to the series of characters on the number bearing members in which the amount is registered, means for restoring the printing elements, and means operatively related to the last recited means for moving the ribbon in the opposite direction.

65. In a calculating machine, the combination of registering mechanism embodying number bearing members having two sets of characters of different indications, means for controlling the operation of said members to register in either of said sets of characters, recording mechanism embodying printing elements individual to the members, means for controlling the actuation of the elements, impression members individual to the elements for taking impressions therefrom, a printing ribbon having different portions corresponding to the respective sets of characters, means for shifting the ribbon in one direction, a stop for controlling the degree of movement of the ribbon, means for automatically controlling the stop for effecting a movement of the portion of the ribbon into printing position corresponding to the series of characters on the number bearing members in which the amount is registered, and means for effecting a further shifting of the ribbon to present in printing position a portion of the ribbon other than the portion corresponding to the set of characters on the number bearing members in which the amount is registered.

66. In a calculating machine, the combination of registering mechanism embodying number bearing members having two sets of characters of different indications, means for controlling the operation of said members to register in either of said sets of characters, recording mechanism embodying printing elements individual to the members, means for controlling the actuation of the elements, impression members individual to the elements for taking impressions therefrom, a printing ribbon having different portions corresponding to the respective sets of characters, means for shifting the ribbon in one direction, a stop for controlling the degree of movement of the ribbon, means for automatically controlling the stop for effecting a movement of the portion of the ribbon into printing position corresponding to the series of characters on the number bearing members in which the amount is registered, and means for effecting a further shifting of the ribbon to present in printing position a portion of the ribbon other than the portion corresponding to the set of characters on the number bearing members in which the amount is registered and at will.

67. In a calculating machine, the combination of registering mechanism embodying number bearing members having two sets of characters of different indications, means for controlling the operation of said members to register in either of said sets of characters, recording mechanism embodying printing elements individual to the members, means for controlling the actuation of the elements, impression members individual to the elements for taking impressions therefrom, a printing ribbon having different portions corresponding to the respective sets of characters, means for shifting the ribbon in one direction, a stop for controlling the degree of movement of the ribbon, means for automatically controlling the stop for effecting a movement of the portion of the ribbon into printing position corresponding to the series of characters on the number bearing members in which the amount is registered, and key-controlled means for effecting a further shifting of the ribbon to present in printing position a portion of the ribbon other than the portion corresponding to the set of characters on the number bearing members in which the amount is registered.

68. In a calculating machine, the combination of registering mechanism embodying number bearing members having two sets of characters of different indications, means for controlling the operation of said members to register in either of said sets of characters, recording mechanism embodying printing elements individual to the members, means for controlling the actuation of the elements, impression members individual to the elements for taking impressions therefrom, a printing ribbon having different portions corresponding to the respective sets of characters, means for shifting the ribbon in one direction, a stop for controlling the degree of movement of the ribbon, means for automatically controlling the stop for effecting a movement of the portion of the ribbon into printing position corresponding to the series of characters on the number bearing members in which the amount is registered, and key controlled means operatively connected with the stop for effecting a further shifting of the ribbon to present in printing position a portion of the ribbon other than the portion corresponding to the set of characters on the number bearing members in which the amount is registered.

69. In a calculating machine, the combination of registering mechanism embodying number bearing members having two sets of characters of different indications, means for controlling the operation of said members to register in either sets of characters, recording mechanism connected with the registering mechanism for operation in unison therewith and embodying printing elements, means for taking an impression from said elements, a printing ribbon having portions corresponding to the respective sets of characters, means for shifting the ribbon in one direction, a stop for controlling the degree of movement of the ribbon, means for automatically controlling the stop for effecting a movement of a portion of the ribbon into printing position corresponding to the series of characters on the number bearing members in which the amount is registered, and means for rendering inactive the number bearing members while the remaining mechanism remains active.

70. In a calculating machine, the combination of registering mechanism embodying number bearing members having two sets of characters of different indications, means for controlling the operation of said members to register in either set of characters, recording mechanism connected with the registering mechanism for operation in unison therewith and embodying printing elements, means for taking an impression from said elements, a printing ribbon having portions corresponding to the respective sets of characters, means for shifting the ribbon in one direction, a stop for controlling the degree of movement of the ribbon, means for automatically controlling the stop for effecting a movement of a portion of the ribbon into printing position corresponding to the series of characters on the number bearing members in which the amount is registered, key controlled means for effecting a further shifting of the ribbon to present in printing position a portion of the ribbon other than the portion corresponding to the sets of characters on the number bearing members in which the amount is registered, and means for disconnecting the number bearing members from the remaining mechanism to render said members inactive.

71. In a calculating machine, the combination of registering mechanism embodying number bearing members having two sets of characters of different indications, means for controlling the operation of said members to register in either sets of characters, recording mechanism connected with the registering mechanism for operation in unison therewith and embodying printing elements, means for taking an impression from said elements, a printing ribbon having portions corresponding to the respective sets of characters, means for shifting the ribbon in one direction, a stop for controlling the degree of movement of the ribbon, means for automatically controlling the stop for effecting a movement of a portion of the ribbon into printing position corresponding to the series of characters on the number bearing members in which the amount is registered, key controlled means for effecting a further shifting of the ribbon to present in printing position a portion of the ribbon other than the portion corresponding to the sets of characters on the number bearing members in which the amount is registered, and key-controlled means for disconnecting the number bearing members from the remaining mechanism at will, for rendering the said members inactive.

72. In a calculating machine, the combination of registering mechanism embodying number bearing members having two sets of characters of different indications, means for controlling the operation of said members to register in either sets of characters, recording mechanism connected with the registering mechanism for operation in unison therewith and embodying printing elements, means for taking an impression from said elements, a printing ribbon having portions corresponding to the respective sets of characters, means for shifting the ribbon in one direction, a stop for controlling the degree of movement of the ribbon, means for automatically controlling the stop for effecting a movement of a portion of the ribbon into printing position corresponding to the series of characters on the number bearing members in which the amount is registered, key controlled means for effecting a further shifting of the ribbon to present in printing position a portion of the ribbon other than the portion corresponding to the sets of characters on the number bearing members in which the amount is registered, and key-controlled means for disconnecting the number bearing members from the remaining mechanism at will, for rendering the said members inactive and at will.

In testimony whereof I have signed my name to this specification, in the presence of two subscribing witnesses, on this 8th day of April A. D. 1911.

PAUL H. BERGER.

Witnesses:
J. H. JOCHUM, Jr.,
NINA J. HALSNE.

Copies of this patent may be obtained for five cents each, by addressing the "Commissioner of Patents, Washington, D. C."